(12) United States Patent
Chen et al.

(10) Patent No.: US 10,619,410 B2
(45) Date of Patent: *Apr. 14, 2020

(54) WINDOW BLIND

(71) Applicant: NIEN MADE ENTERPRISE CO., LTD., Taichung (TW)

(72) Inventors: Lin Chen, Taichung (CN); Keng-Hao Nien, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 403 days.

This patent is subject to a terminal disclaimer.

(21) Appl. No.: 15/417,088

(22) Filed: Jan. 26, 2017

(65) Prior Publication Data

US 2017/0218696 A1 Aug. 3, 2017

Related U.S. Application Data

(60) Provisional application No. 62/318,771, filed on Apr. 6, 2016, provisional application No. 62/326,020, filed on Apr. 22, 2016.

(30) Foreign Application Priority Data

Jan. 29, 2016 (CN) ..................... 2016 2 0093383 U

(51) Int. Cl.
*E06B 9/322* (2006.01)
*E06B 9/34* (2006.01)
(Continued)

(52) U.S. Cl.
CPC .............. *E06B 9/322* (2013.01); *E06B 9/304* (2013.01); *E06B 9/307* (2013.01); *E06B 9/34* (2013.01);
(Continued)

(58) Field of Classification Search
CPC . E06B 9/322; E06B 9/34; E06B 9/304; E06B 9/307; E06B 9/388; E06B 2009/807; F16H 19/06; F16H 29/12
See application file for complete search history.

(56) References Cited

U.S. PATENT DOCUMENTS 4,681,279 A 7/1987 Nakamura
5,123,472 A 6/1992 Nagashima et al.
(Continued)

FOREIGN PATENT DOCUMENTS

AU 782302 B2 7/2005
AU 2012370499 A1 9/2014
(Continued)

OTHER PUBLICATIONS

Machine translation of CN 102369334, retrieved from http://translationportal.epo.org/emtp/translate/?ACTION=description-retrieval&COUNTRY=CN&ENGINE=google&FORMAT=docdb&KIND=A&LOCALE=en_EP&NUMBER=102369334&OPS=ops.epo.org/3.2&SRCLANG=zh&TRGLANG=en (Year: 2014).*
(Continued)

*Primary Examiner* — Katherine W Mitchell
*Assistant Examiner* — Abe Massad
(74) *Attorney, Agent, or Firm* — Muncy, Geissler, Olds & Lowe, P.C.

(57) ABSTRACT

A window blind includes an input mechanism adapted to change a location of a bottom rail, an adjustment output mechanism adapted to be motivated when the bottom rail is located at a low position, whereby to tilt slats between two positions, and an output clutch mechanism, which is adapted to be driven by the input mechanism to move the bottom rail toward a high position, and is adapted to be driven by the input mechanism to move the bottom rail toward the low position when it is at the high position. A stroke delay
(Continued)

mechanism is provided on a transmission path from the adjustment output mechanism to the output clutch mechanism, which is adapted to delay an affected time for transmission. Whereby, only one single control module is required to adjust the inclination angle of the slats and to collect and expand the covering material.

20 Claims, 46 Drawing Sheets

(51) Int. Cl.
*F16H 19/06* (2006.01)
*F16H 29/12* (2006.01)
*E06B 9/304* (2006.01)
*E06B 9/307* (2006.01)
*E06B 9/388* (2006.01)
*E06B 9/80* (2006.01)

(52) U.S. Cl.
CPC ............ *F16H 19/06* (2013.01); *F16H 29/12* (2013.01); *E06B 9/388* (2013.01); *E06B 2009/807* (2013.01)

(56) References Cited

U.S. PATENT DOCUMENTS

| | | | |
|---|---|---|---|
| 6,076,587 A * | 6/2000 | Pastor | E06B 9/307 160/115 |
| 6,129,131 A | 10/2000 | Colson | |
| 6,155,328 A | 12/2000 | Welfonder | |
| 6,332,491 B1 | 12/2001 | Rossini | |
| 6,715,528 B2 | 4/2004 | Rossini | |
| 6,948,544 B2 | 9/2005 | Nien | |
| 6,955,207 B2 | 10/2005 | Minder | |
| 7,198,089 B2 | 4/2007 | Hsu | |
| 7,341,091 B2 | 3/2008 | Nien et al. | |
| 7,406,995 B2 | 8/2008 | Huang | |
| 7,578,334 B2 | 8/2009 | Smith et al. | |
| 7,717,154 B2 | 5/2010 | Cheng | |
| 8,230,896 B2 | 7/2012 | Anderson et al. | |
| 8,267,145 B2 | 9/2012 | Fraser et al. | |
| 9,062,492 B2 | 6/2015 | Yu et al. | |
| 9,127,500 B2 | 9/2015 | Huang | |
| 9,284,774 B2 | 3/2016 | Yu et al. | |
| 2009/0120592 A1 | 5/2009 | Lesperance | |
| 2010/0065226 A1 * | 3/2010 | Fraser | E06B 9/307 160/168.1 R |
| 2011/0290429 A1 | 12/2011 | Cheng | |
| 2012/0125543 A1 | 5/2012 | Chambers | |
| 2013/0087415 A1 | 4/2013 | Hsieh | |
| 2013/0180672 A1 * | 7/2013 | Yu | E06B 9/303 160/170 |
| 2014/0014279 A1 | 1/2014 | Defenbaugh | |
| 2014/0131502 A1 | 5/2014 | Zhu | |
| 2014/0291431 A1 | 10/2014 | Huang | |
| 2015/0211296 A1 | 7/2015 | Zhang et al. | |
| 2015/0354275 A1 | 12/2015 | Huang et al. | |
| 2015/0368968 A1 | 12/2015 | Smith | |

FOREIGN PATENT DOCUMENTS

| | | |
|---|---|---|
| CA | 2805798 A1 | 8/2014 |
| CN | 101021139 B | 7/2010 |
| CN | 204941289 U | 1/2016 |
| JP | 0518168 A | 1/1993 |
| JP | H07324572 A | 12/1995 |
| JP | H1030385 A | 2/1998 |
| JP | 2000145328 A | 5/2000 |
| JP | 2000220369 A | 8/2000 |
| JP | 2001271576 A | 10/2001 |
| JP | 3261106 B2 | 2/2002 |
| JP | 3378813 B2 | 2/2003 |
| JP | 3442670 B2 | 9/2003 |
| JP | 3485164 B2 | 1/2004 |
| JP | 2008013950 A | 1/2008 |
| JP | 4074420 B2 | 4/2008 |
| JP | 2013072183 A | 4/2013 |
| JP | 2013072224 A | 4/2013 |
| KR | 20130117539 A | 10/2013 |
| TW | 356795 U | 4/1999 |
| TW | 269349 U | 7/2005 |
| TW | I246415 B | 1/2006 |
| TW | I463961 B | 12/2014 |
| WO | 2010125951 A1 | 11/2010 |

OTHER PUBLICATIONS

Chinese Patent Office. Examination Report, dated Nov. 18, 2018. 8 pages.

* cited by examiner

WINDOW BLIND

BACKGROUND OF THE INVENTION

1. Technical Field

The present disclosure relates generally to a window blind, and more particularly to a window blind which uses one single control module to adjust the inclination angle of the slats and to collect or expand the covering material.

2. Description of Related Art

By raising and lowering the covering material of a conventional window covering, the area to be shielded can be determined. The window coverings can be roughly divided into window blinds, cellular shades, roller shades, and sheer shades by the types or appearances of the covering materials. A window blind has a plurality of horizontally arranged long slats, which are suspended between a headrail and a bottom rail through ladder tapes. The area shielded by the slats can be adjusted by spacing the slats apart from top down or stacking the slats from bottom up. According to most people's habit of using a window covering, the purpose of collecting the covering material is to allow more light to pass through, and the purpose of expanding the covering material is to block light. Generally speaking, the bottom rail is often lowered to the lowest position, and the inclination angle of the slats can be adjusted to adequately change the amount of light passing through the covering material.

Window coverings can be also divided into two types by either a cord is used or not. Each type has its own way of operation. Window blinds having a cord can be further divided into three types: using at least one cord, using a cord loop, and specifically using a single cord. A conventional window covering using at least one cord includes a headrail, a bottom rail, and a covering material provided between the headrail and the bottom rail. An end of the cord is connected to the bottom rail, while another end thereof passes through the covering material and the headrail to be operated by the user. By general definition, the cord segment between the headrail and the bottom rail is a lifting cord, and the cord segment passing through the headrail for operation is an operation cord. By pulling the operation cord, the bottom rail can be operated to move for changing the area shielded by the covering material. If the exposed operation cord is looped, then such cord segment is called a cord loop. The location of the bottom rail can be changed by pulling the front side or the rear side of the looped operation cord. A window covering which uses a cord loop usually has a rotatable shaft tube or shaft provided in the headrail. The covering material can be collected or expanded by pulling the cord loop to drive the shaft tube or the shaft, which rolls up or releases the covering material or the lifting cord. As for the type of using one single cord, there is, apparently, only one operation cord exposed from the headrail. This type of window coverings can be further divided into two types by whether the operation cord is retractable or not. If the operation cord is not retractable, the operation of the window covering using the single cord is similar to those having at least one cord. On the other hand, the covering material of a window covering, which has a retractable operation cord, can be collected by pulling and releasing the operation cord repeatedly.

As mentioned above, the covering material of a conventional window blind can be collected or expanded by operating the operation cord to move the bottom rail upward or downward. In addition, another adjustment mechanism is required to change the inclination angle of the slats. More specifically, a ladder tape includes two warps, and such an adjustment mechanism is capable of moving upward one warp and moving downward the other warp at the same time to adjust the inclination angle. In other words, a conventional window blind has two independent mechanisms, one of which is used for collecting and expanding the covering material, and the other one is used for adjusting the inclination angle of the slats. Such design is very inconvenient to use. Some manufacturers have tried to integrate these two mechanisms into one single control module, as disclosed in Taiwanese Patent Publication No. M269349 and M356795. However, both the disclosed single control modules include a lifting cord passing through all slats, which means the lifting cord is located between two warps. While adjusting the inclination angle of the slats, any two vertically adjacent slats would not be able to tightly abut against each other, leading to the problem of light leakage. Therefore, the window blind which has one single control module still has room for improvements.

BRIEF SUMMARY OF THE INVENTION

In view of the above, the primary objective of the present disclosure is to provide a window blind, which is easy to install and easy to use.

The present disclosure provides a window blind, which includes a headrail, a bottom rail, a plurality of slats, an input mechanism, an adjustment output mechanism, an adjusting shaft, and a lifting shaft. The slats are suspended between the headrail and the bottom rail through a ladder tape, wherein the bottom rail is adapted to be operated by a lifting cord to move between a high position and a low position, whereby to collect or expand the window blind. The input mechanism is adapted to change a location of the bottom rail. The adjustment output mechanism is provided in the headrail, wherein the adjustment output mechanism is adapted to be operated with the input mechanism simultaneously. An end of the adjusting shaft is connected to the adjustment output mechanism, wherein the adjustment output mechanism is adapted to be driven by the input mechanism to rotate the adjusting shaft, whereby to make two warps of the ladder tape have relative movement in a vertical direction, tilting the slats between a first position and a second position. The lifting shaft is adapted to be driven by the input mechanism. When the lifting shaft is continuously driven by the input mechanism to roll up the lifting cord, and the lifting cord moves the bottom rail toward the high position, the slats are located at the second position; when the lifting shaft is continuously driven by the input mechanism to release the lifting cord, the lifting cord moves the bottom rail toward the low position, the slats are located at the first position.

With the aforementioned design, it would require only one single control module to adjust the inclination angle of the slats and to collect or expand the covering material. Furthermore, the slats or the bottom rail of the window blind could be positioned appropriately.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
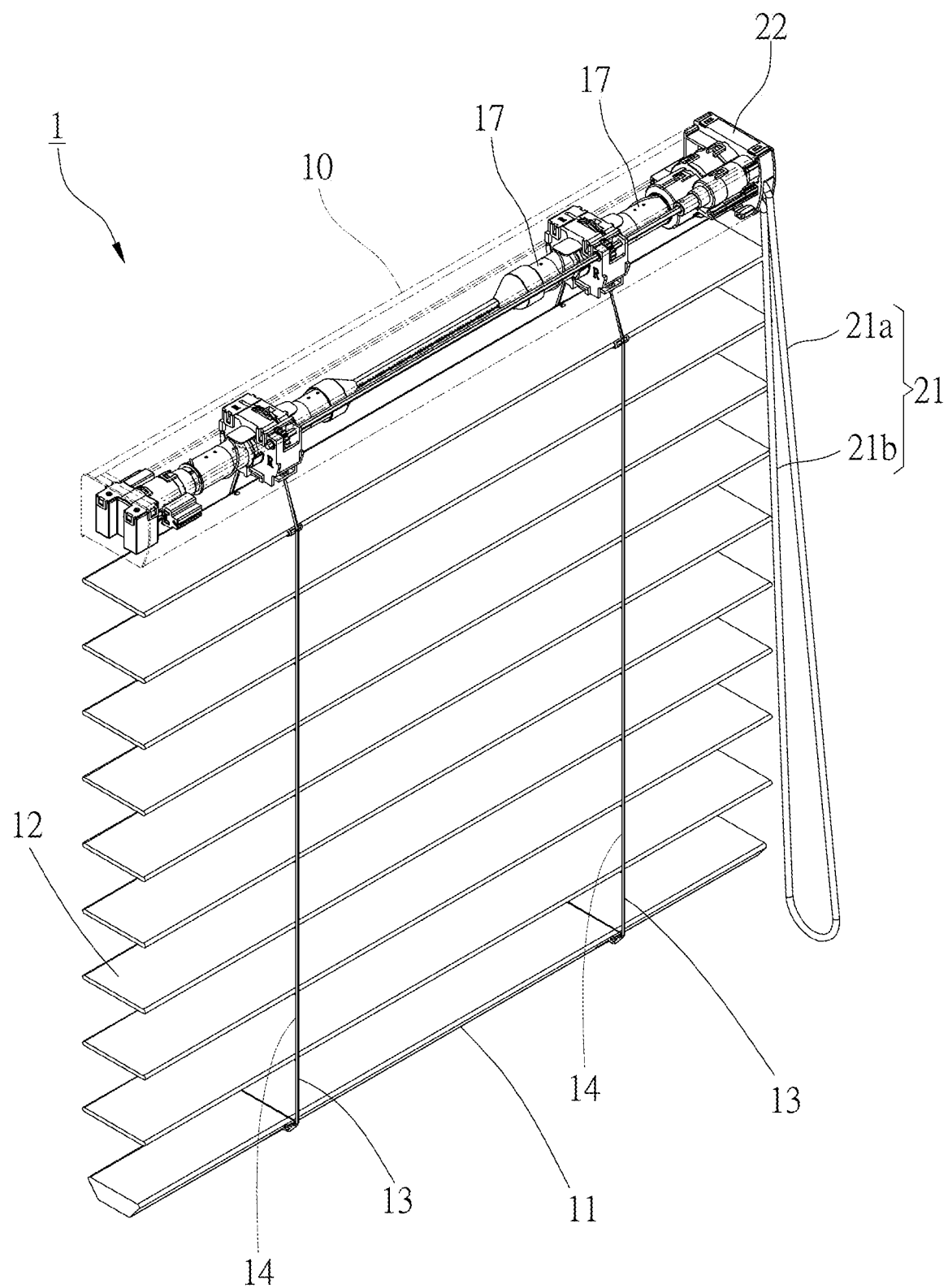
FIG. 1 is a perspective view of a window blind of the embodiment of the present disclosure, showing the window blind is expanded, and the slats are arranged horizontally.
Figure 2:
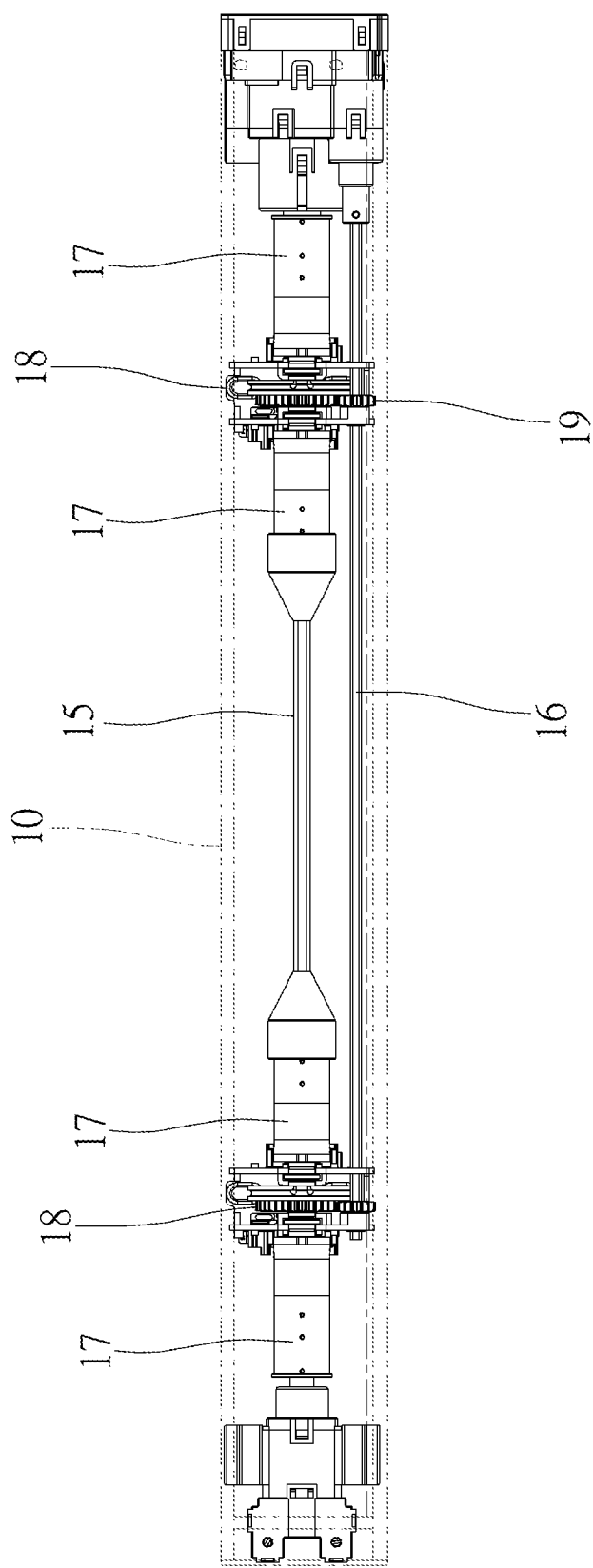
FIG. 2 is a top view of the window blind in FIG. 1.
Figure 3:
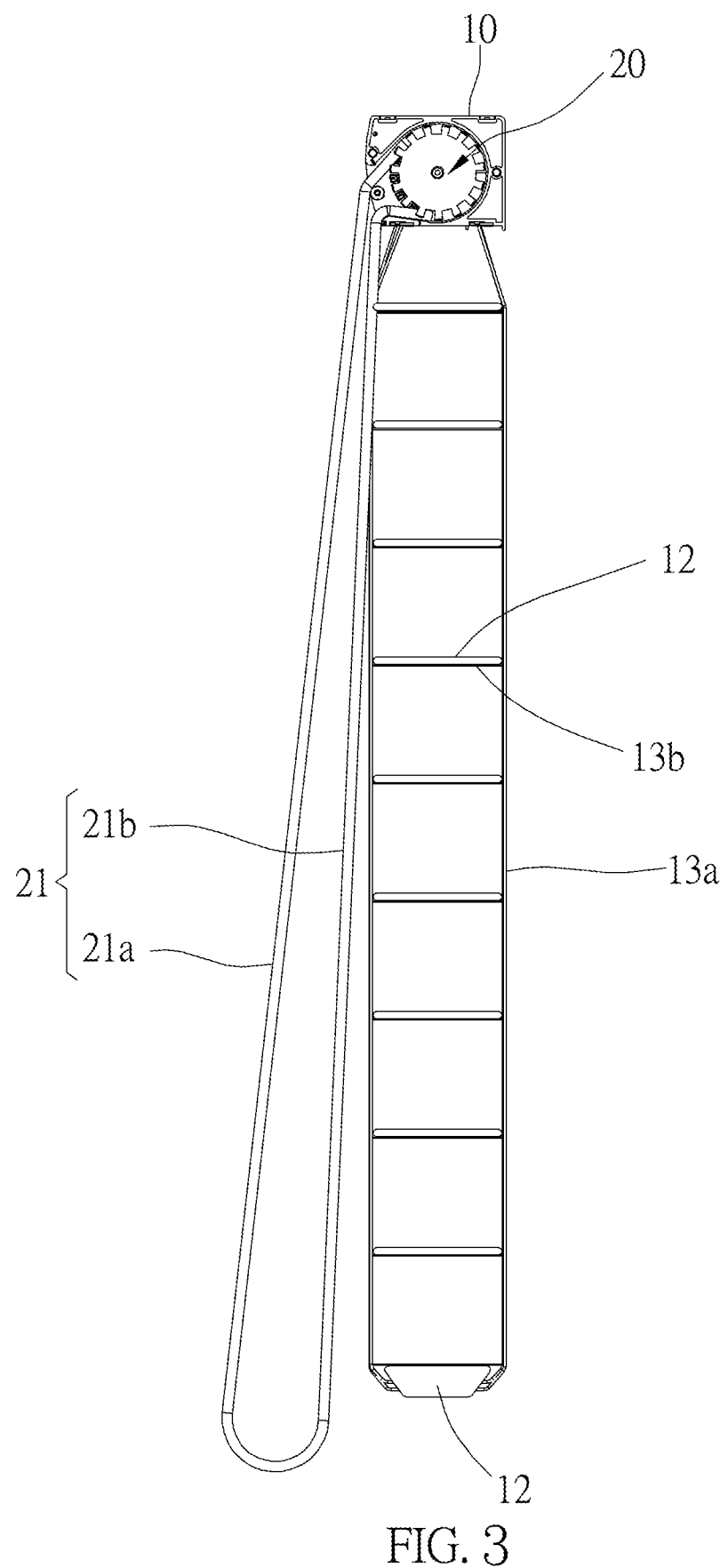
FIG. 3 is a side view of the window blind in FIG. 1.
Figure 4:
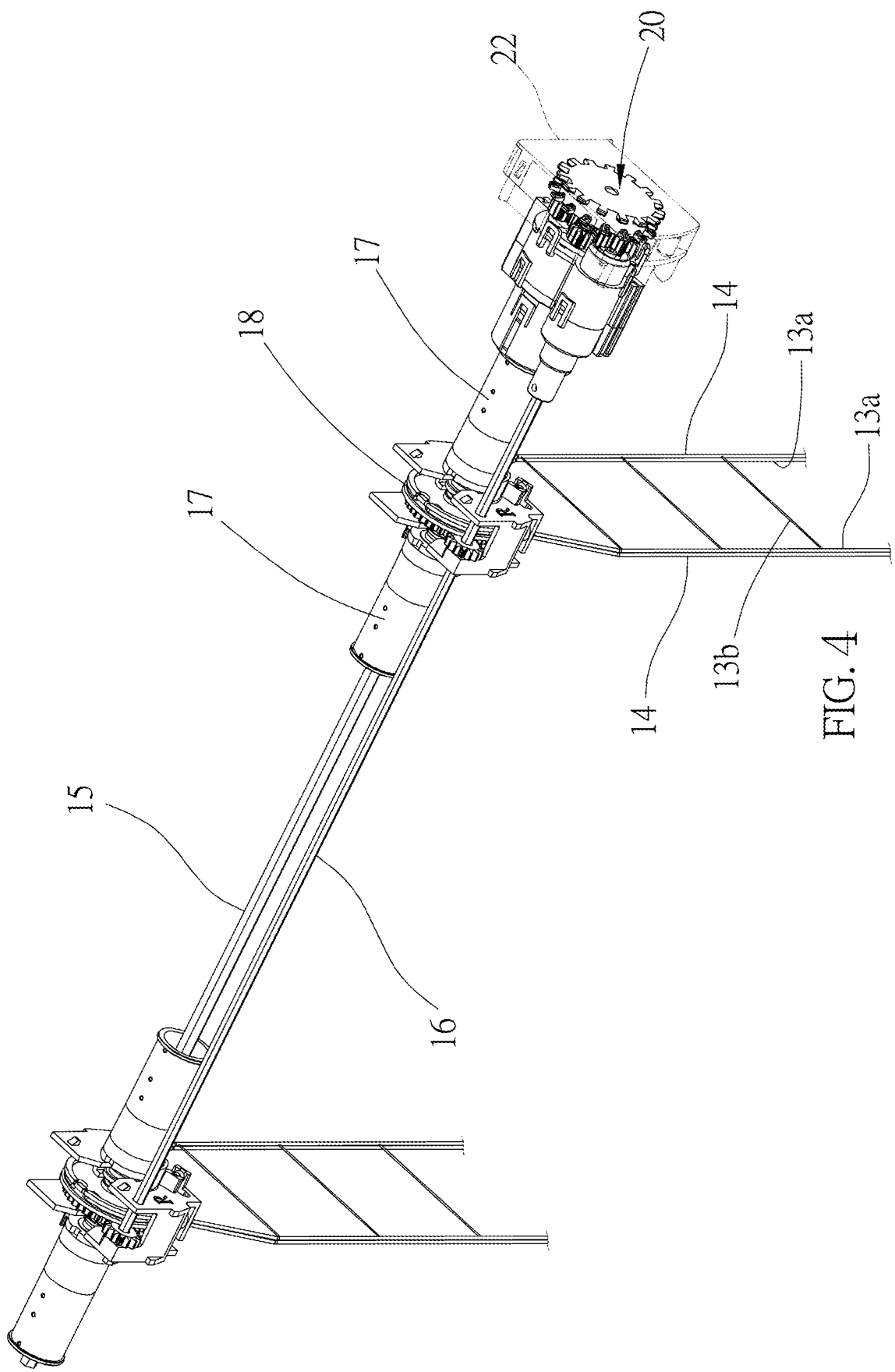
FIG. 4 is a perspective view, showing part of the components of the window blind in the embodiment.

As shown in FIG. 1 to FIG. 4, a window blind 1 of an embodiment of the present disclosure includes a headrail 10, a bottom rail 11, a plurality of slats 12, a plurality of ladder tapes 13, and a plurality of lifting cords 14. Each of the ladder tape 13 includes two warps 13a provided in a direction from the headrail 10 toward the bottom rail 11, and a plurality of wefts 13b connecting the warps 13a, wherein each of the wefts 13b respectively supports one of the slats 12, whereby the slats 12 are suspended between the headrail 10 and the bottom rail 11. Each of the lifting cords 14 is respectively close to one of the warps 13a, and is located at an outside of the slats 12. The lifting cords 14 could be operated to change a released length thereof, whereby the bottom rail 11 could be moved between a high position near the headrail 10 and a low position away from the headrail 10 to collect or expand the window blind 1.

Figure 5:
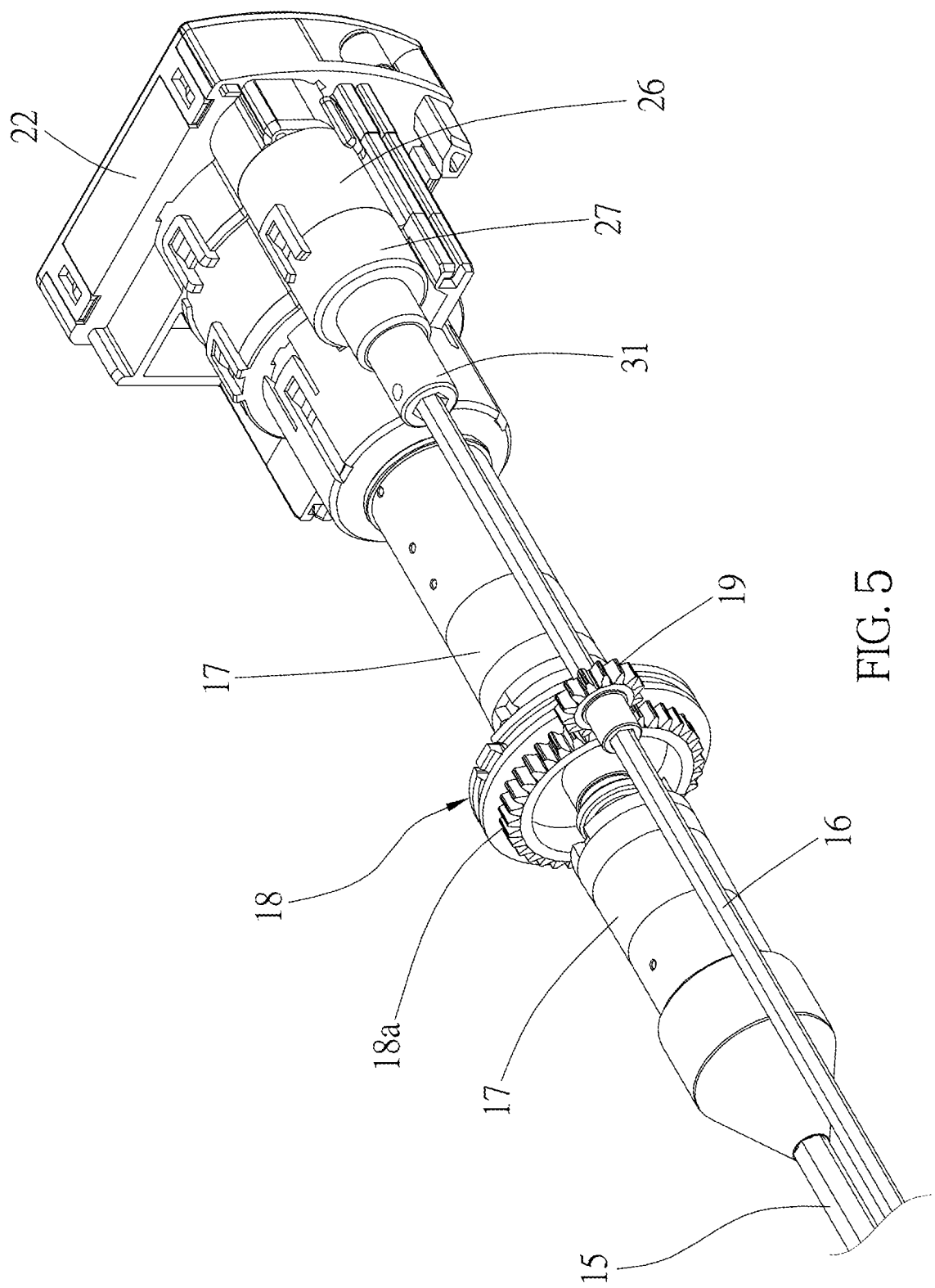
FIG. 5 is a partial enlarged perspective view, showing part of the components of the window blind in the embodiment.
Figure 6:
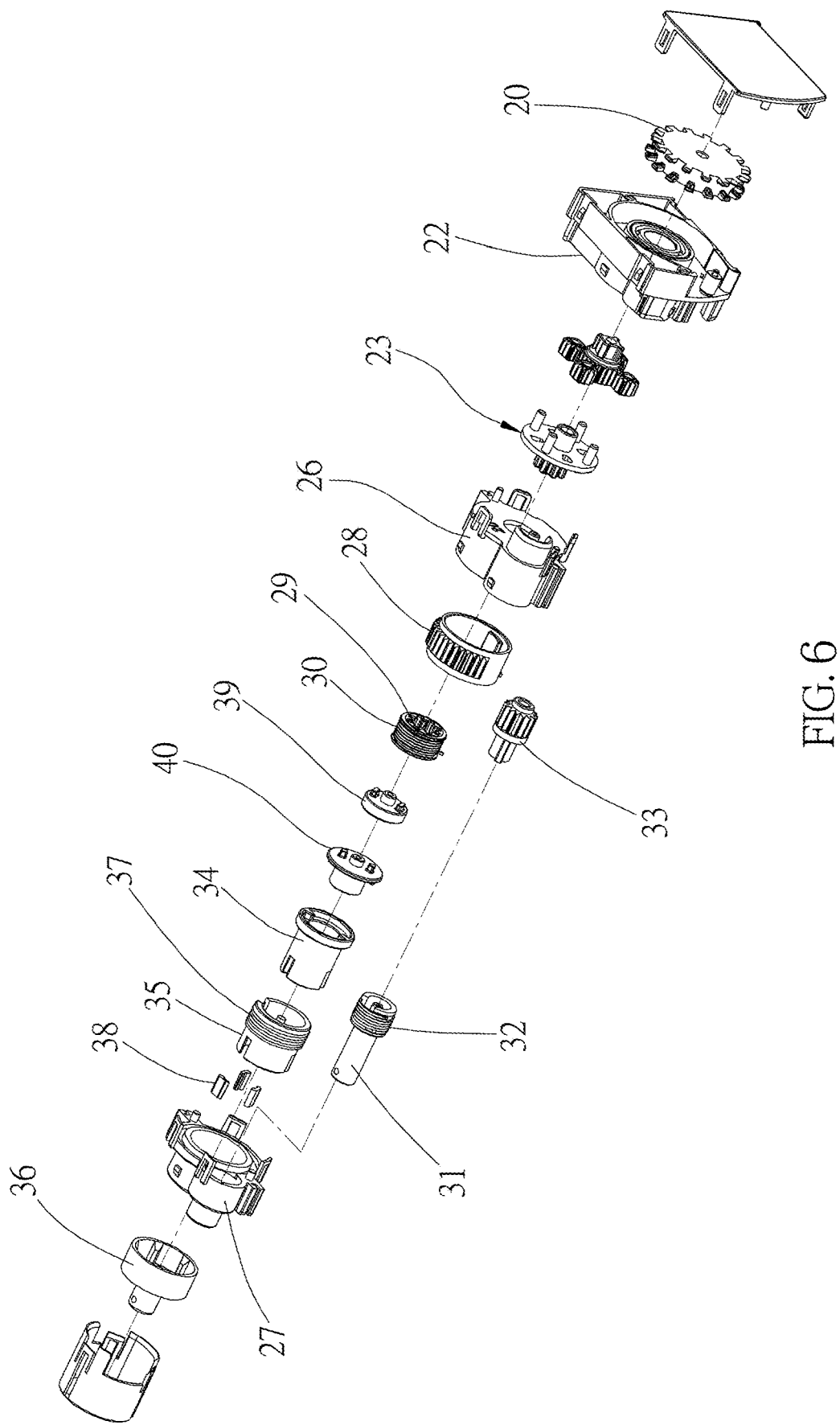
FIG. 6 is a exploded perspective view, showing detailed components in a control mechanism of the window blind of the embodiment of the present disclosure.

A lifting shaft 15 and an adjusting shaft 16 are provided in parallel in the headrail 10, which are rotatable, and a cross section of each is polygonal. Two spools 17 respectively fit around each of two lateral sides of the lifting shaft 15 (i.e., four spools 17 in total), and a disc-like ladder drum 18 fits around the lifting shaft 15 between each two adjacent spools 17 (i.e., two ladder drums in total). Each of the spools 17 has a polygonal hole passed through by the lifting shaft 15, and is rotatable along with the lifting shaft 15. Each of the ladder drums 18 has a round hole passed through by the lifting shaft 15, and is not rotatable along with the lifting shaft 15. Furthermore, each of the spools 17 is fixedly connected to an end of one of the lifting cords 14, while another end thereof is fixedly connected to the bottom rail 11. Each of the ladder drums 18 is connected by an end of two warps 13a of one of the ladder tapes 13, while another end thereof is fixedly connected to the bottom rail 11. As shown in FIG. 5, each of the ladder drum 18 has an outer toothed ring 18a provided on a side thereof, wherein the outer toothed ring 18a meshes with a gear 19 fitting around the adjusting shaft 16, so that the outer toothed ring 18a and the gear 19 could be operated simultaneously. A cross section of said lifting shaft 15 and a cross section of said adjusting shaft 16 are both polygonal, matching the polygonal holes of the components passed by them, whereby each of the shafts 15, 16 would be operated synchronously with those components having the corresponding polygonal hole. However, the shape of the cross sections of said shafts 15, 16 and the holes are not limited to be polygonal; another non-circular shape would also work to provide the same function.

Figure 22A:
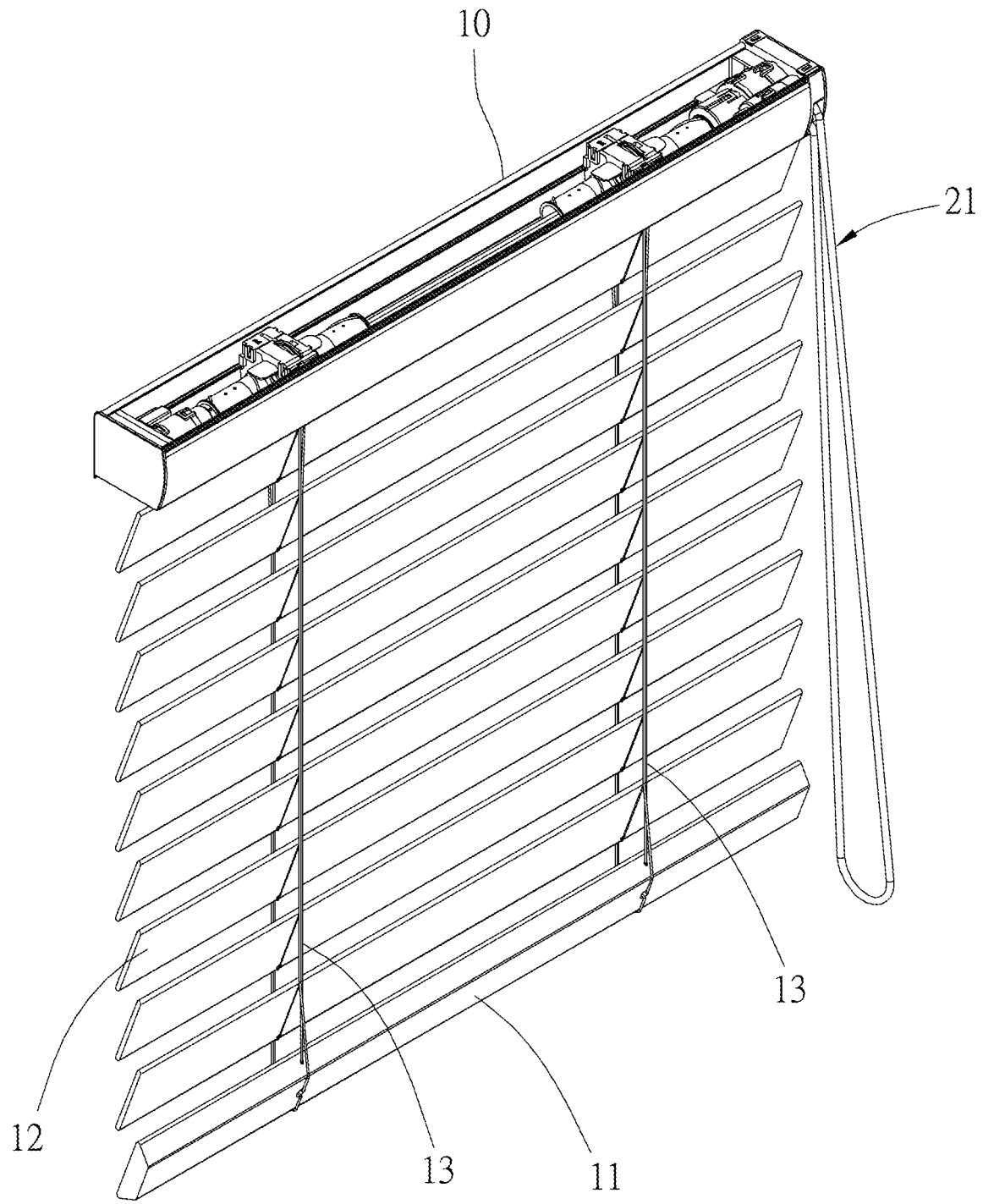
FIG. 22A is a perspective view, showing the window blind of the embodiment of the present disclosure is expanded, and the slats are in the front-high and rear-low state.
Figure 22B:
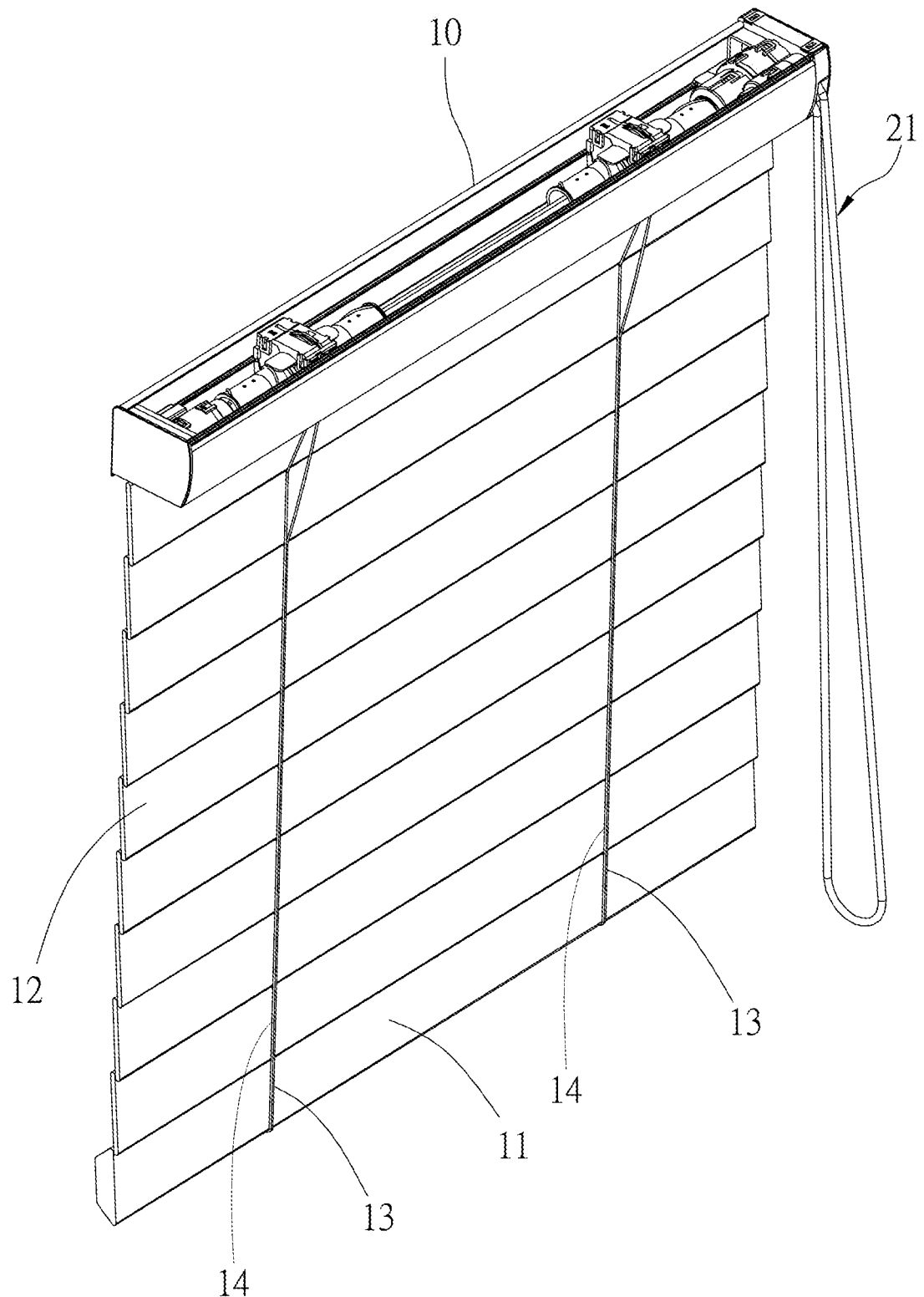
FIG. 22B is a perspective view, showing the window blind of the embodiment of the present disclosure is expanded, and the slats are in the front-low and rear-high state.

An input mechanism, an adjustment output mechanism, an output clutch mechanism, and a stroke delay mechanism are further provided in the headrail 10. The input mechanism is used to change the location of the bottom rail 11. The adjustment output mechanism is connected to an end of the adjusting shaft 16, and is operable when the bottom rail 11 is located at the low position, wherein the adjustment output mechanism is adapted to drive the adjusting shaft 16 to rotate. A rotated adjusting shaft 16 would synchronously rotate the ladder drums 18 through the gears 19 meshing with the outer toothed rims 18a, whereby one of the warps 13a of each of the ladder tape 13 would go up while the other one of the warps 13a is going down. In this way, the slats 12 could be tilted between a first position shown in FIG. 22A, where a front side of the slats 12 is located high and a rear side thereof is located low (i.e., front-high and rear-low) to render a nearly vertical state, and a second position as shown in FIG. 22B, where the front side of the slats 12 is located low and the rear side thereof is located high (i.e., front-low and rear-high) to render a nearly vertical state, whereby the window blind 1 could be operated to allow different amount of light to pass through.

The output clutch mechanism is connected to an end of the lifting shaft 15. When the bottom rail 11 is located at the low position and the slat 12 are tilted to the second position, the output clutch mechanism would be affected by the continuous rotation in a first rotation direction, which is counterclockwise in the current embodiment, of a transmission member, which is a rotary wheel 20 as an example, of the input mechanism, so as to drive the spools 17 to roll up the lifting cords 14, whereby the bottom rail 11 would be moved toward the high position. Or, when the bottom rail 11 is located at the high position and the rotary wheel 20 is rotated in a second rotation direction (i.e., clockwise in the current embodiment) opposite to the first rotation direction, the output clutch mechanism would be affected to rotate the spools 17 in a reversed direction, which would release the lifting cords 14 to move the bottom rail 11 toward the low position. A band 21 fits around said rotary wheel 20, wherein an exposed portion of the band 21 is looped. By pulling a front side 21a of the band 21 downward, the rotary wheel 20 could be driven to rotate in the first rotation direction: by pulling a rear side 21b of the band 21 downward, the rotary wheel 20 could be rotated in the second rotation direction.

The stroke delay mechanism is located on a transmission path between the adjustment output mechanism and the output clutch mechanism, and is adapted to delay an affected time for transmission between the adjustment output mechanism and the output clutch mechanism.

The aforementioned input mechanism, adjustment output mechanism, output clutch mechanism, and stroke delay mechanism can be integrated into one single controller in a modular way, which would be easy to install. For ease of illustration, the mechanism used for adjusting the slats 12 will be illustrated first, and then the mechanism used for collecting the window blind 1; the mechanism used for expanding the window blind 1 and the transmission relations of the mechanisms will be described after that.

Figure 10:
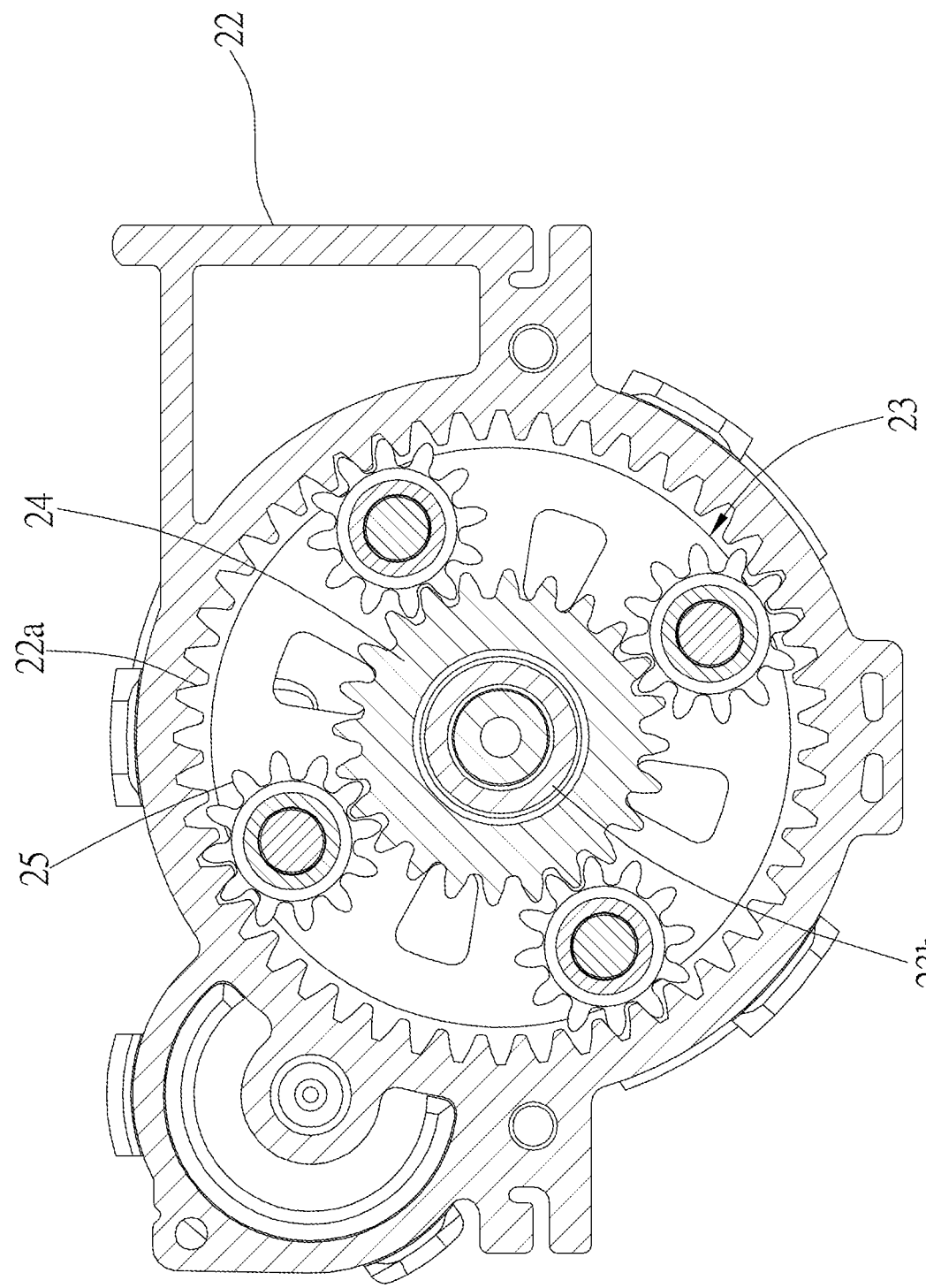
FIG. 10 is a sectional view along the 10-10 line in FIG. 9.

As shown in FIG. 6 to FIG. 9, in addition to the rotary wheel 20 and the band 21, the input mechanism further includes a base case 22, a transmission wheel 23, and an assembly of planet gears. The rotary wheel 20 is received in a side of the base case 22, and a toothed ring 22a is provided on an inner wall of another side of the base case 22. The transmission wheel 23 has a rotary plate 23a, which has a center column 23b and a plurality of posts 23c projected from a same lateral surface of the rotary plate 23a. The assembly of planet gears includes a center gear 24 rotatably fitting around the center column 23b, and a plurality of outer gears 25 disposed around a periphery of the center gear 24, each of the outer gears 25 respectively fits around one of the posts 23c. The rotary wheel 20 has a non-circular first coupling hole 20a at a center thereof, and the center gear 24 further has a first coupling post 24a which projects outward to insert into the first coupling hole 20a. As shown in FIG. 10, a part of each of the outer gears 25 meshes with the center gear 24, and another part thereof meshes with the toothed ring 22a. Whereby, when the band 21 is pulled to rotate the rotary wheel 20, the center gear 24 could be rotated synchronously in the same direction, and the outer gears 25 are driven to rotate by the center gear 24 synchronously. However, since the toothed ring 22a is fixed (i.e., not movable), each of the outer gears 25 would rotate along the toothed ring 22a, and therefore the outer gears 25 would consequently rotate the transmission wheel 23 in the same direction as the rotary wheel 20 rotating. The aforementioned assembly of planet gear would decrease the transmission speed from the rotary wheel 20 to the transmission wheel 23, whereby to provide the effect of deceleration and effort saving.

Figure 11:
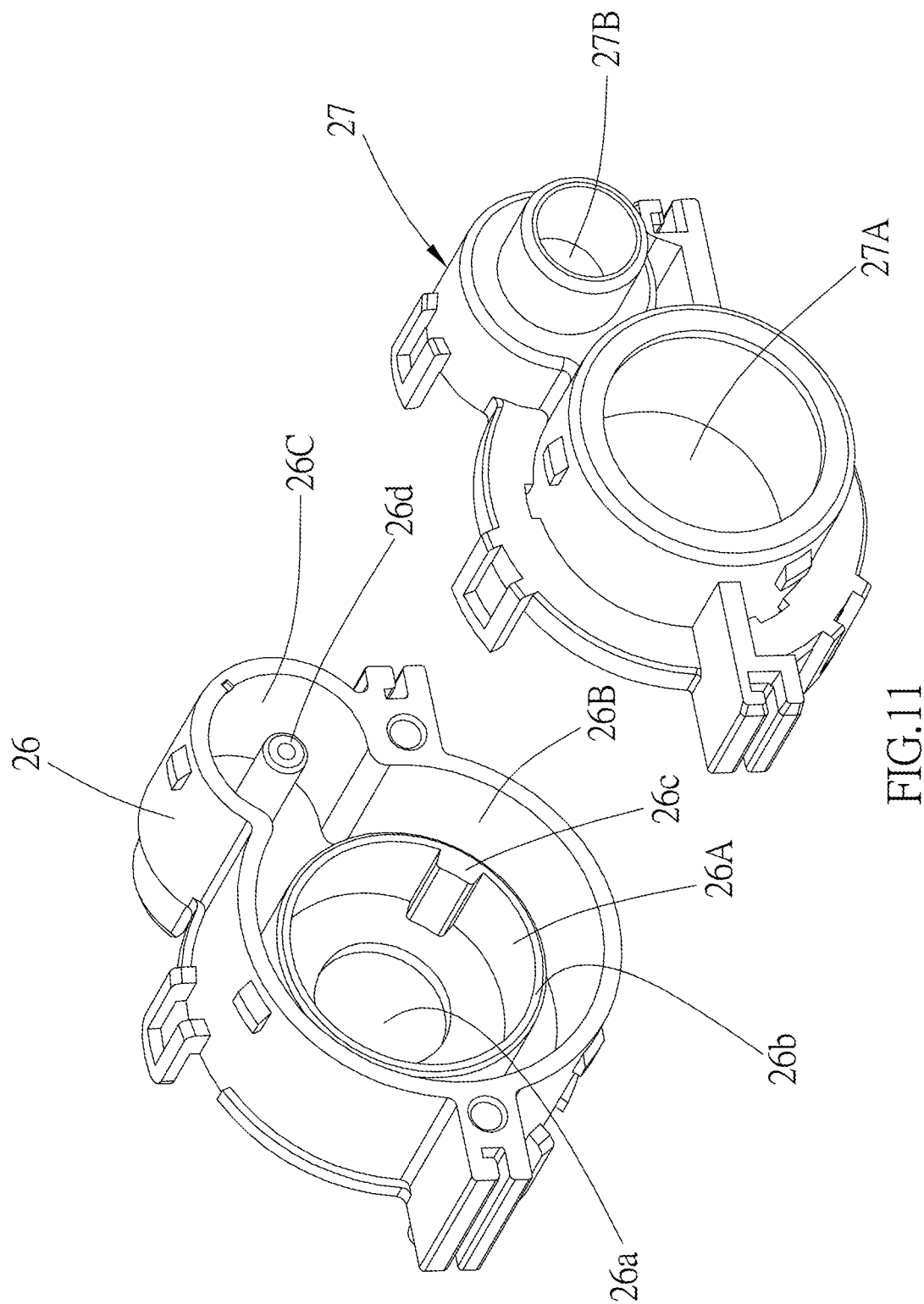
FIG. 11 is a perspective view, showing a first outer case and a second outer case of the window blind of the embodiment of the present disclosure.

As shown in FIG. 11 the adjustment output mechanism includes a first outer case 26, a second outer case 27, an adjustment output wheel 28, an adjustment clutch wheel 29, an adjustment clutch spring 30, an axial pipe 31, a first brake spring 32, and an adjustment driven wheel 33. The first outer case 26 is detachably engaged with the base case 22. The first outer case 26 has a round hole 26a provided on a lateral wall of the first outer case 26, and a circular frame 26b is projected from the lateral wall to divide an internal of the first outer case 26 into a first chamber 26A and a second chamber 26B, wherein the first chamber 26A communicates with the round hole 26a. A second coupling post 23d which has a non-circular contour is projected on another lateral surface of the rotary plate 23a of the transmission wheel 23, wherein the second coupling post 23d passes through the round hole 26a and extends into the first chamber 26A. Furthermore, the circular frame 26b has a stopper 26c provided on an inner wall of the circular frame 26b, projecting toward the first chamber 26A. A third chamber 26C is further formed in the internal of the first outer case 26, wherein the third chamber 26C communicates with the second chamber 26B, and a first supporting post 26d is provided in the third chamber 26C. The second outer case 27 of the adjustment output mechanism is also detachably engaged with the first outer case 26. The second outer case 27 has a fourth chamber 27A and a fifth chamber 27B provided in the second outer case 27, wherein the fourth chamber 27A communicates with the first chamber 26A, and the fifth chamber 27B corresponds to the third chamber 26C, in which the fifth chamber 27B and the third chamber 26C communicate with each other after being assembled. The aforementioned first outer case 26 and second outer case 27 constitute a case of the current embodiment in the present disclosure.

Figure 12:
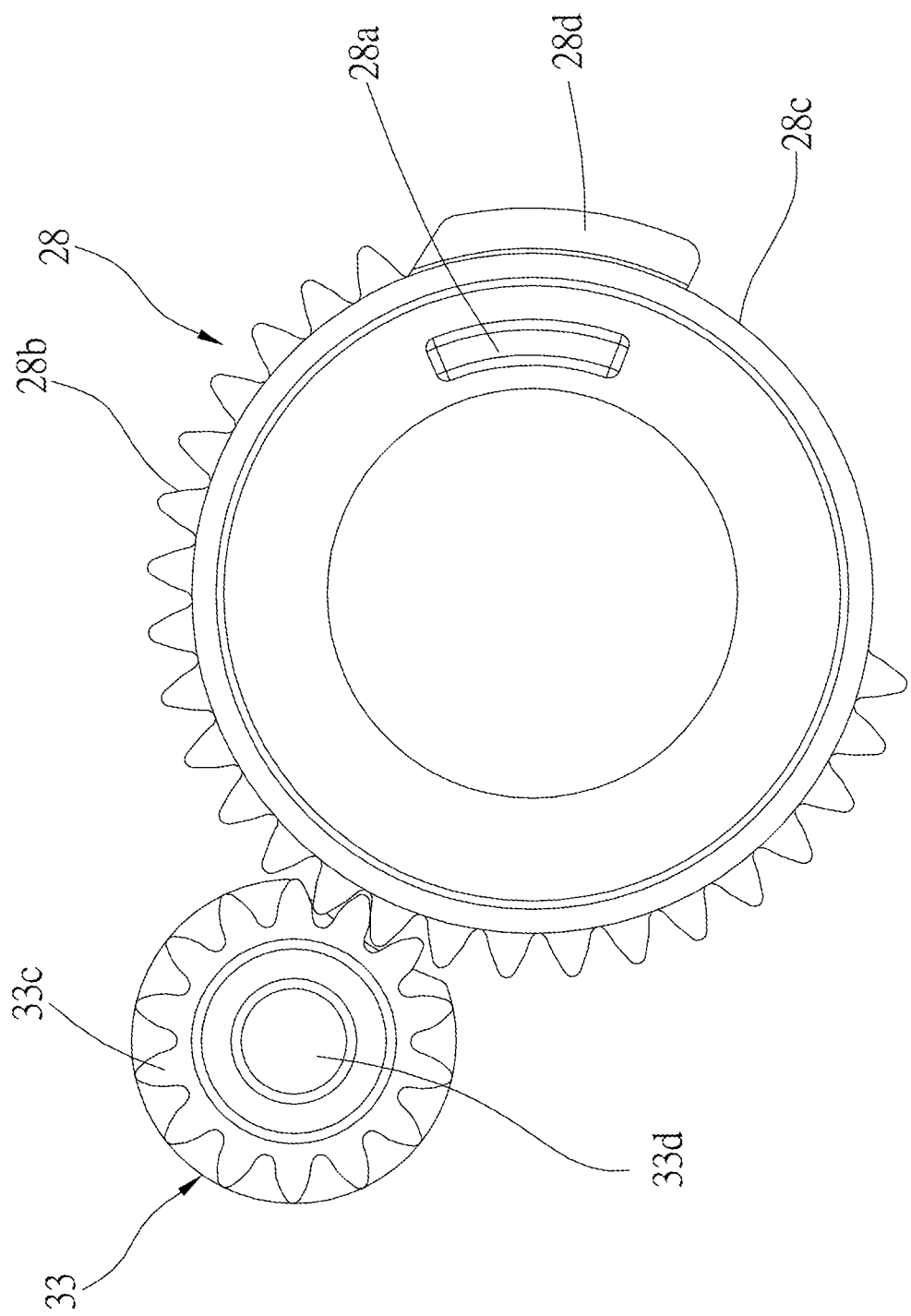
FIG. 12 is a side view, showing a meshing relation between an adjustment output wheel and an adjustment driven wheel of the window blind of the embodiment of the present disclosure.
Figure 13:
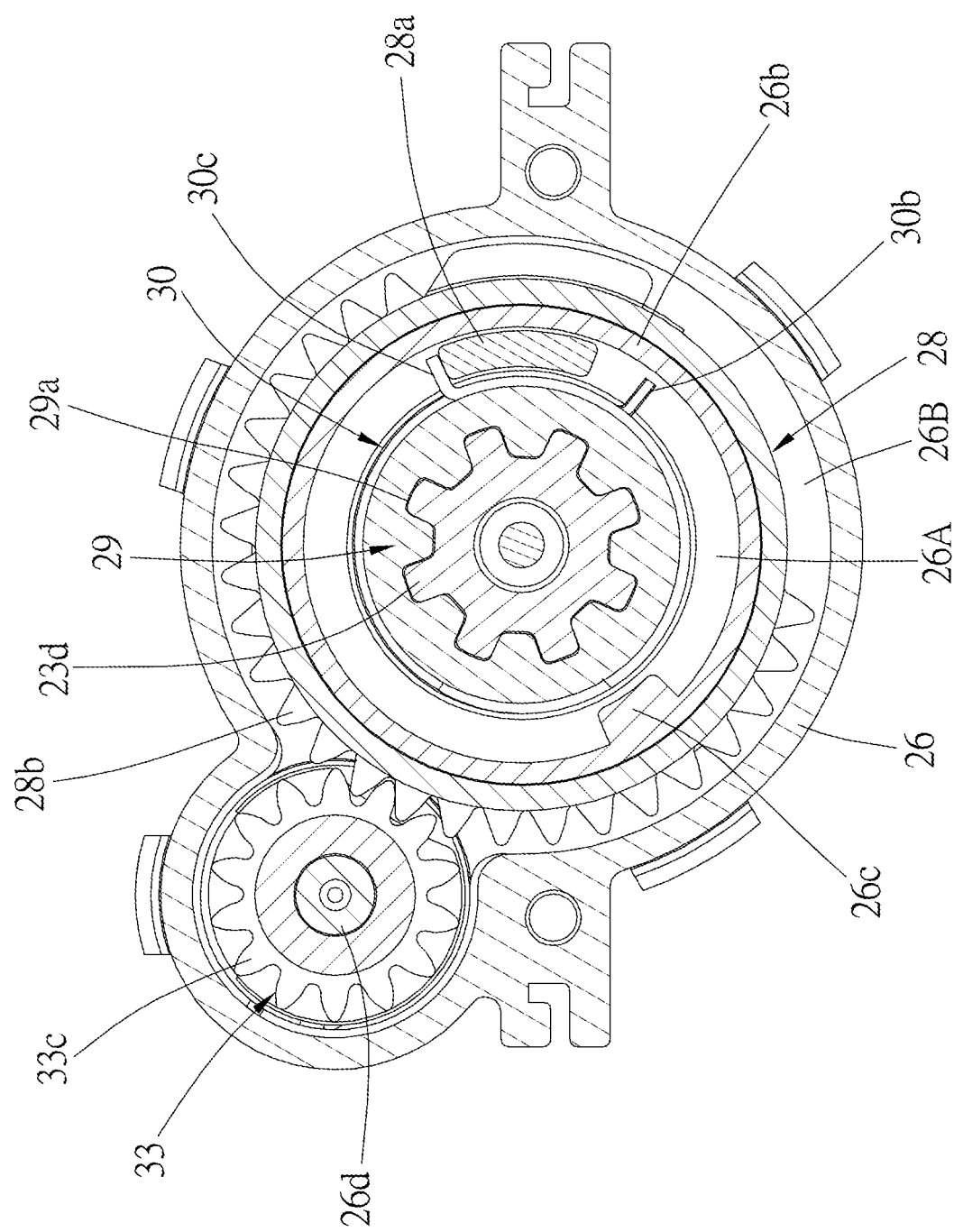
FIG. 13 is a sectional view along the 13-13 line in FIG. 9.

The adjustment output mechanism further includes an adjustment output wheel 28, an adjustment clutch wheel 29, and an adjustment clutch spring 30. As shown in FIG. 12 and FIG. 13, the adjustment output wheel 28 has a first block 28a, which is apart from an inner wall of the adjustment output wheel 28 by a distance. The adjustment output wheel 28 rotatably fits around the circular frame 26b of the first outer case 26, and when the adjustment output wheel 28 is located in the second chamber 26B, the first block 28a extends into the first chamber 26A. In addition, the adjustment output wheel 28 has a toothed structure 28b provided on an outer surface of the adjustment output wheel 28. In the current embodiment, the toothed structure 28b is merely provided along a part of the outer surface of the adjustment output wheel 28, and another part of the outer surface of the adjustment output wheel 28 not provided with the toothed structure 28b is defined as a bare section 28c.

Figure 7:
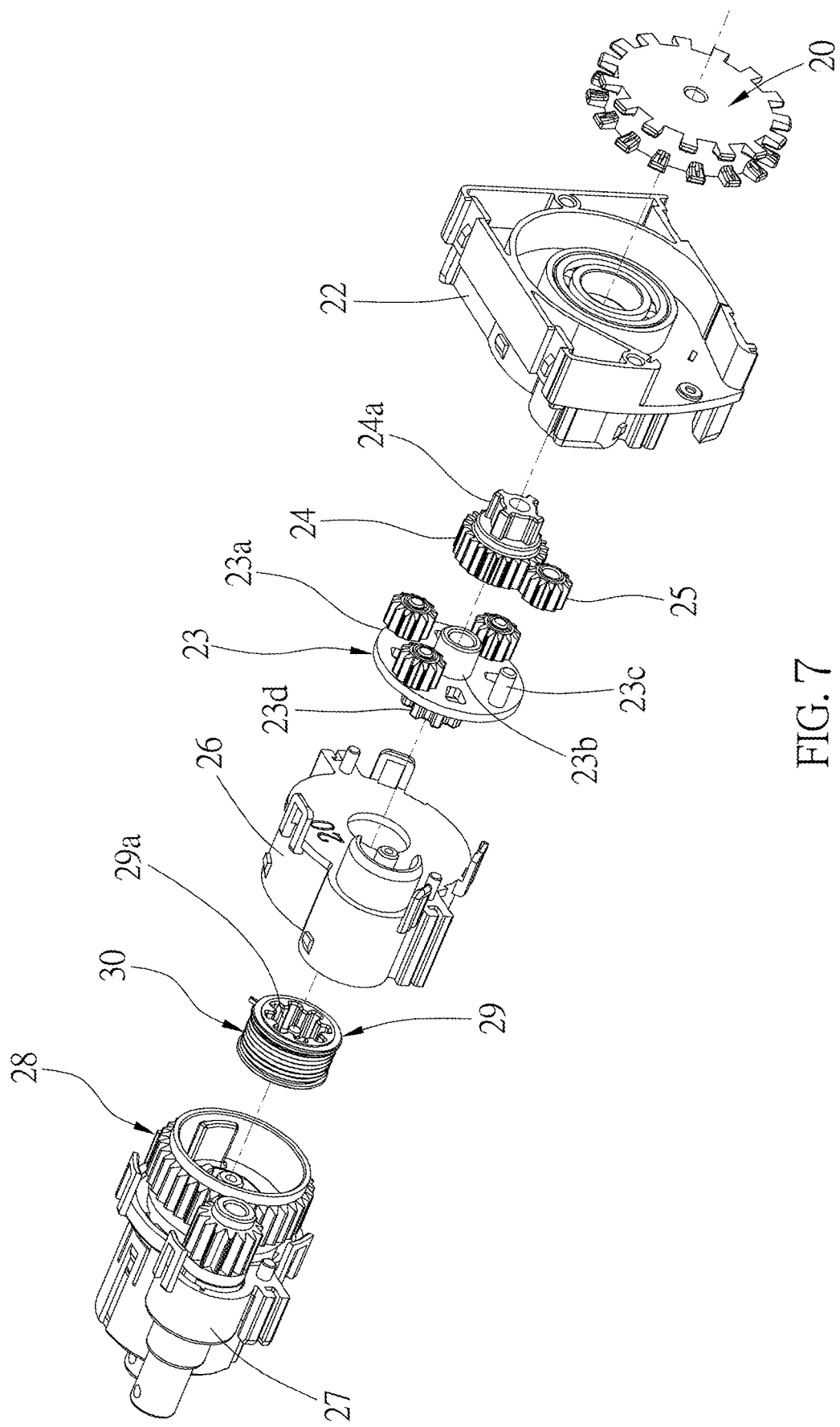
FIGS. 7 and 8 are exploded perspective views, showing the control mechanism of the window blind of the embodiment of the present disclosure.
Figure 8:
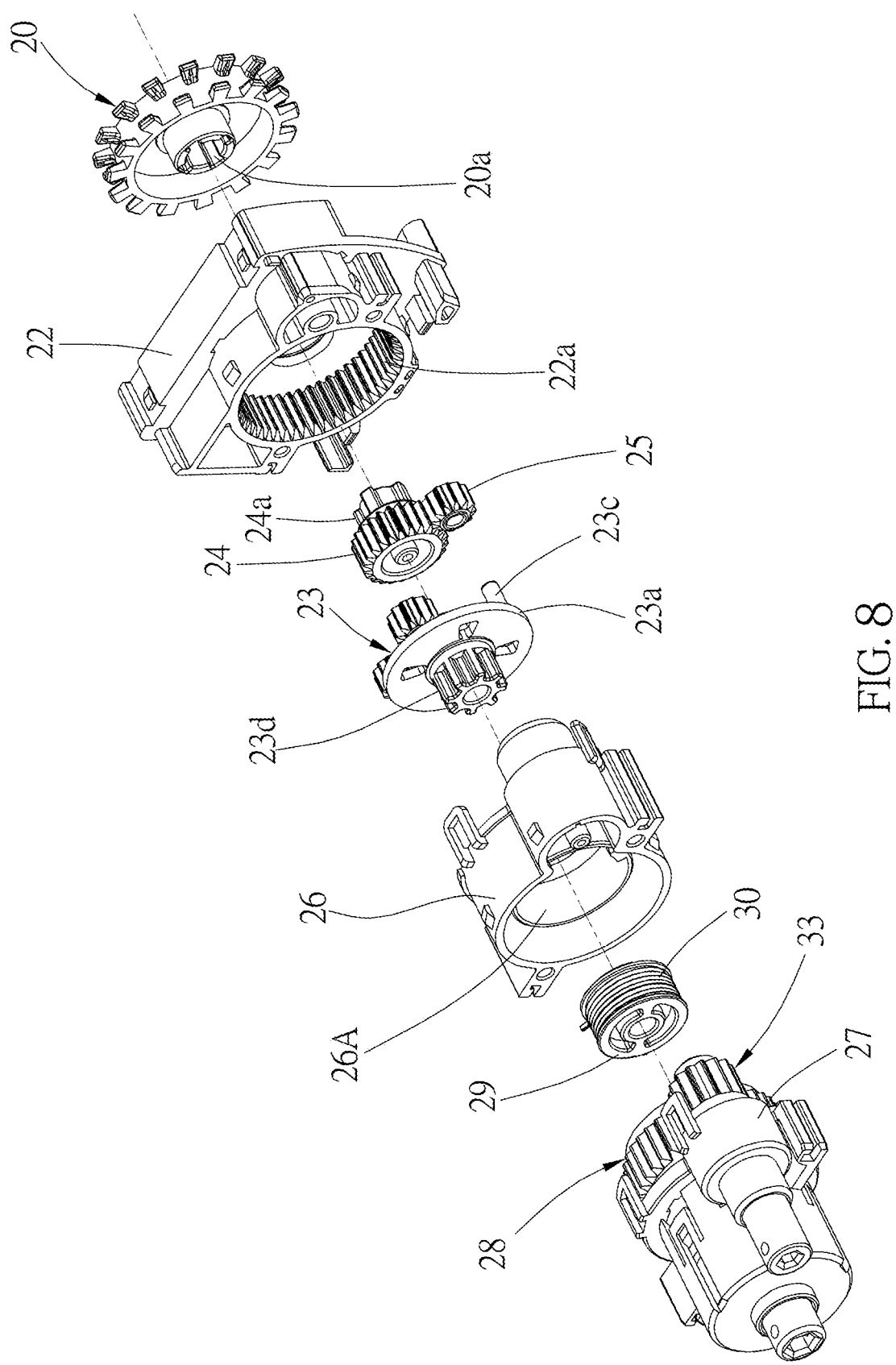
Figure 9:
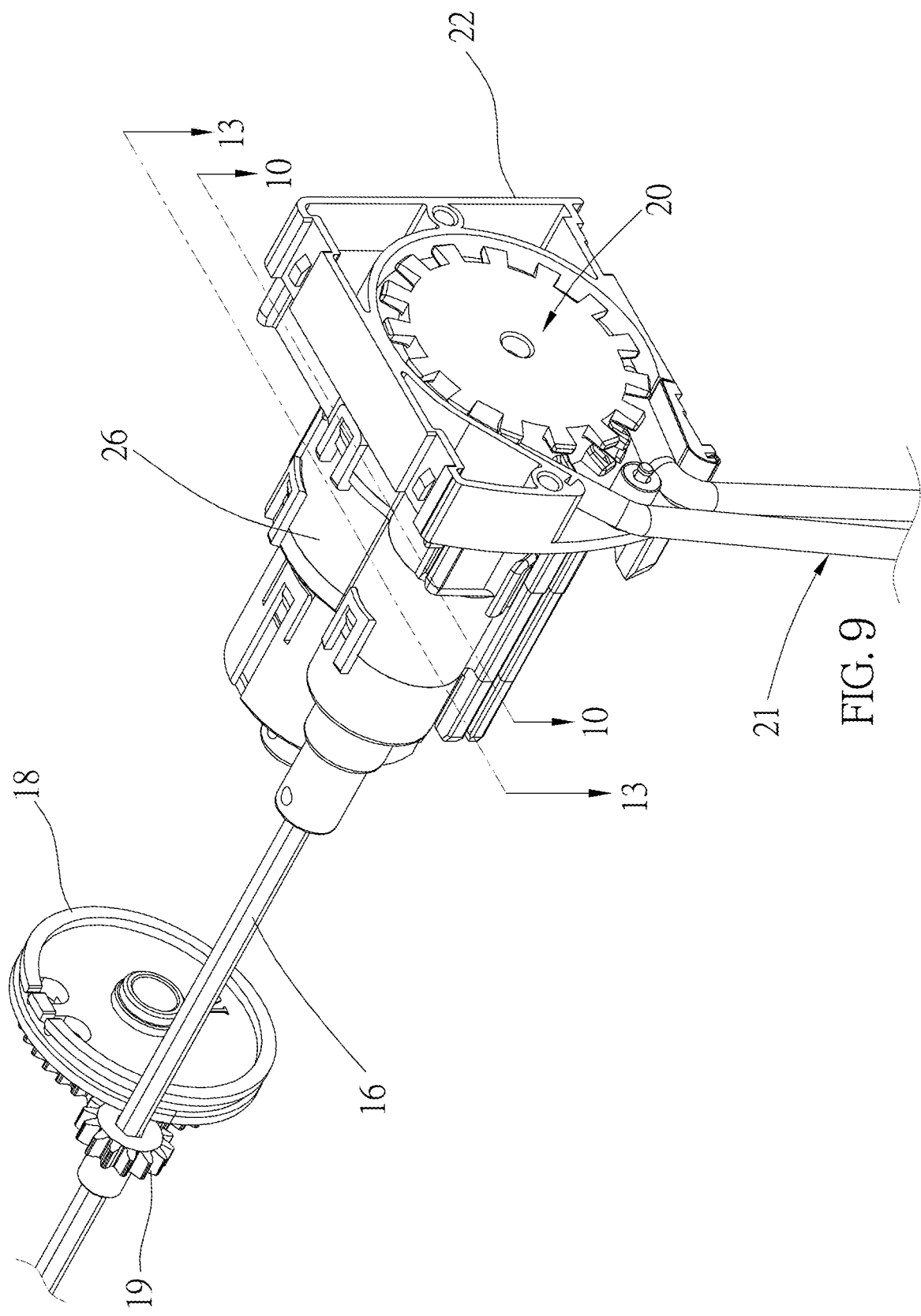
FIG. 9 is an assembled perspective view, showing the control mechanism of the window blind of the embodiment of the present disclosure.
Figure 14:
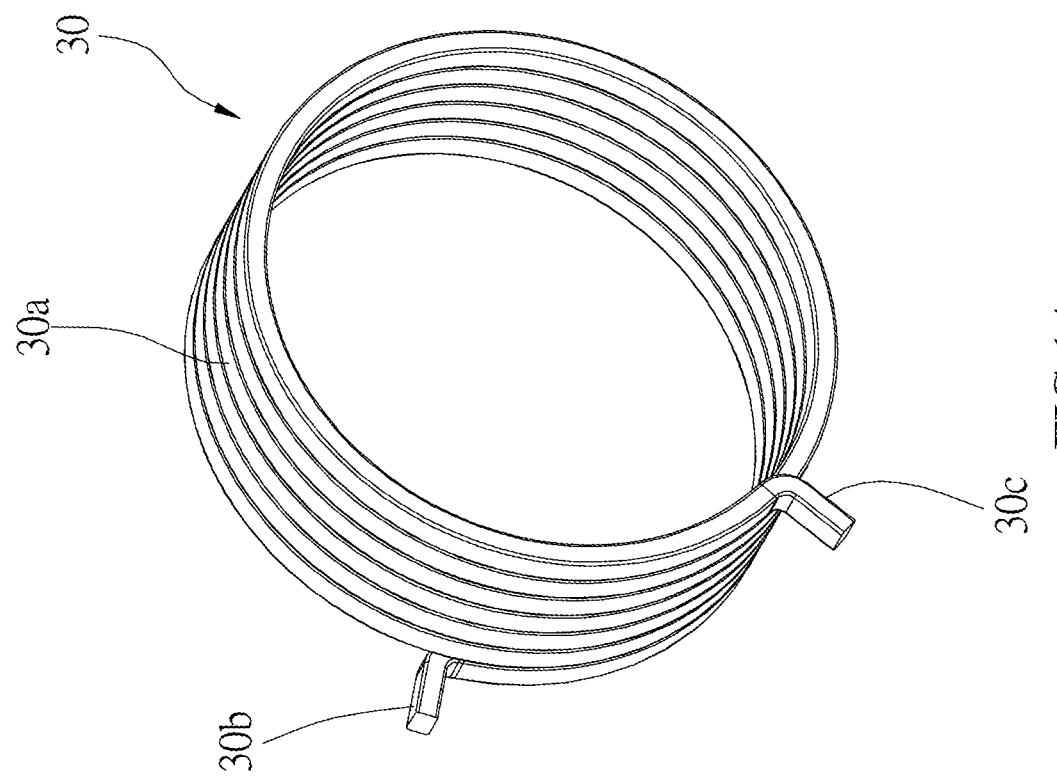
FIG. 14 is a perspective view of an adjustment clutch spring of the window blind of the embodiment of the present disclosure.
Figure 15:
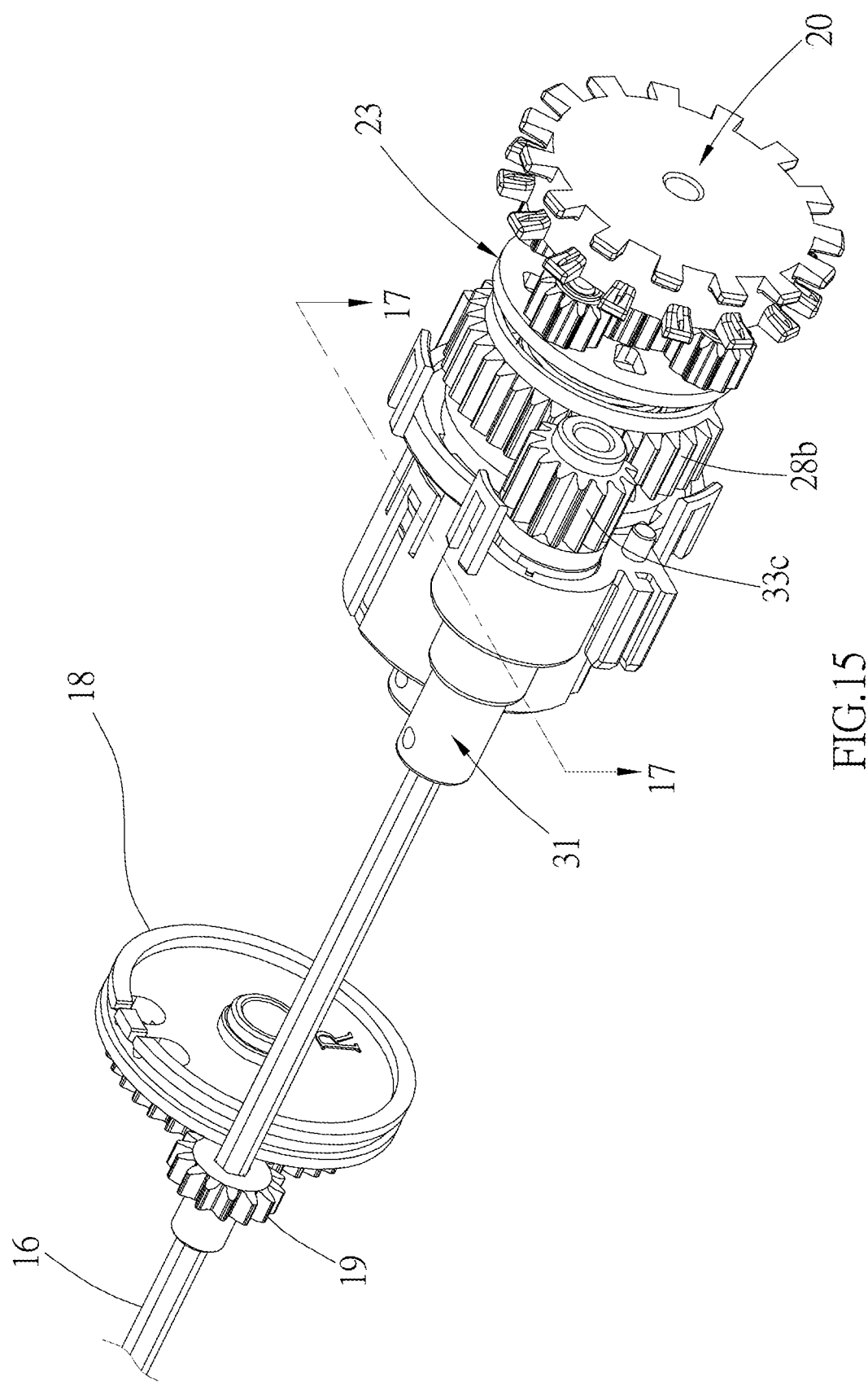
FIG. 15 is a perspective view of the control mechanism of the window blind.
Figure 16:
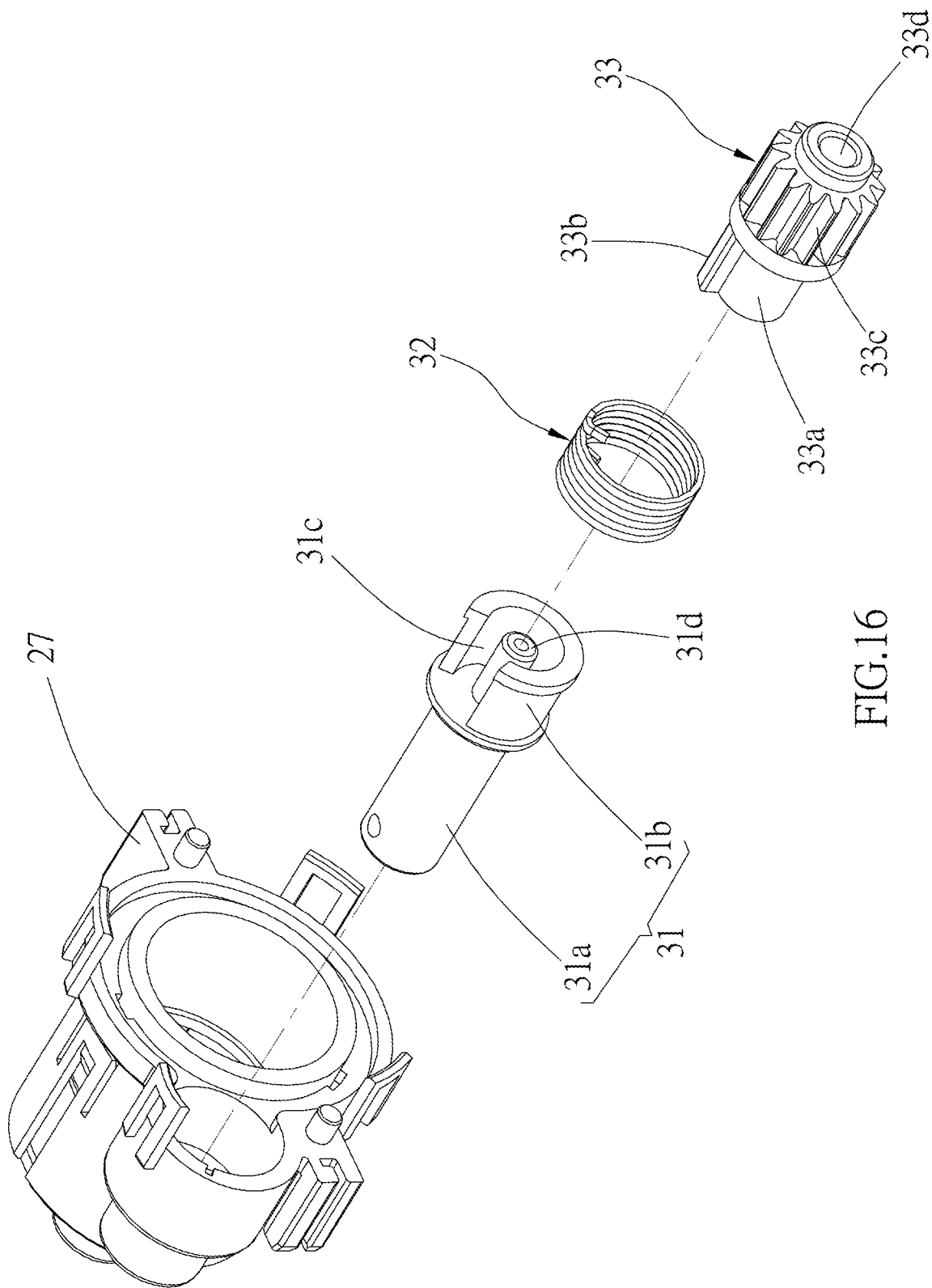
FIG. 16 is a perspective view of part of the components shown in FIG. 15.
Figure 17:
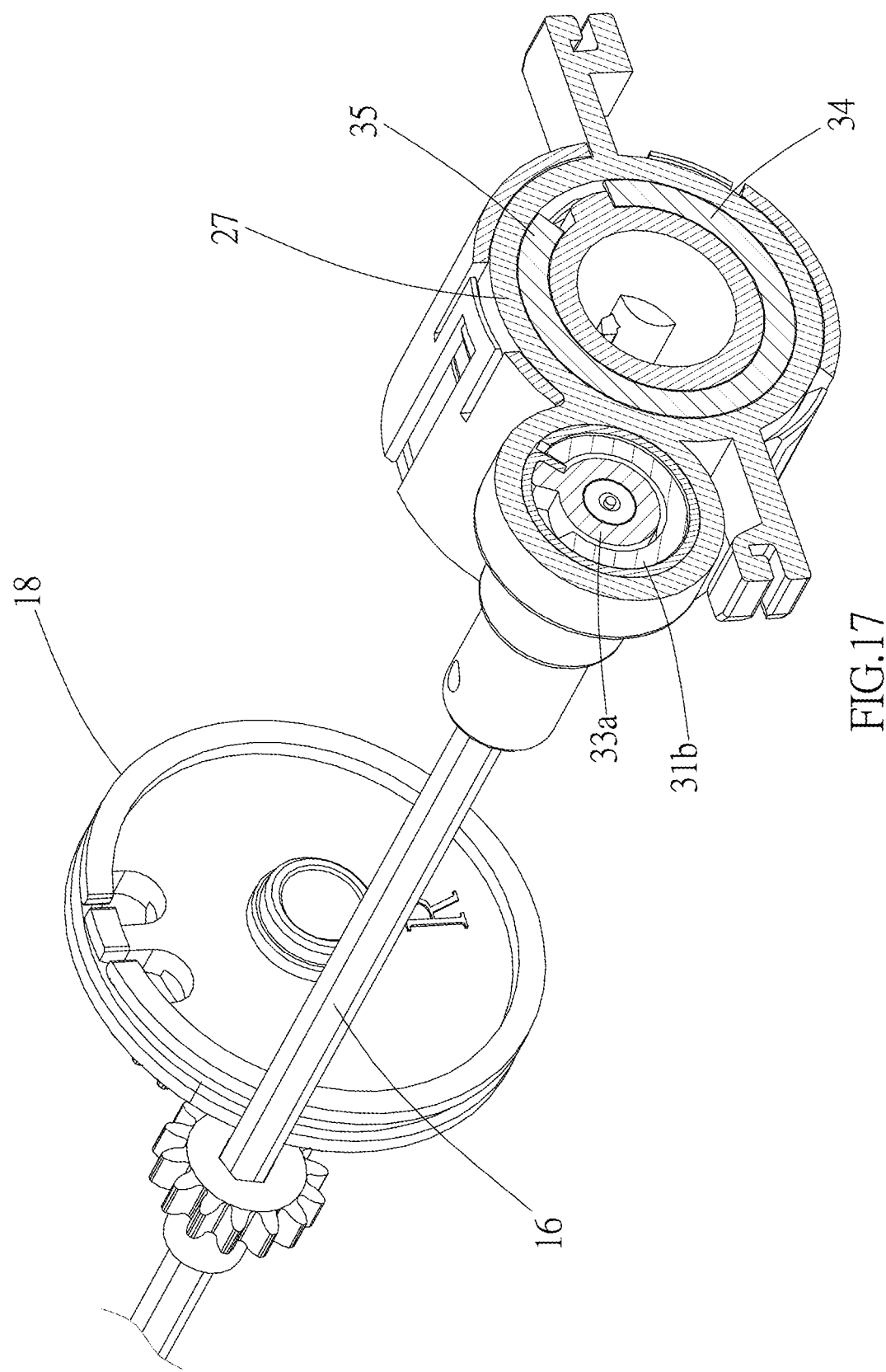
FIG. 17 is a sectional view along the 17-17 line in FIG. 15.
Figure 18:
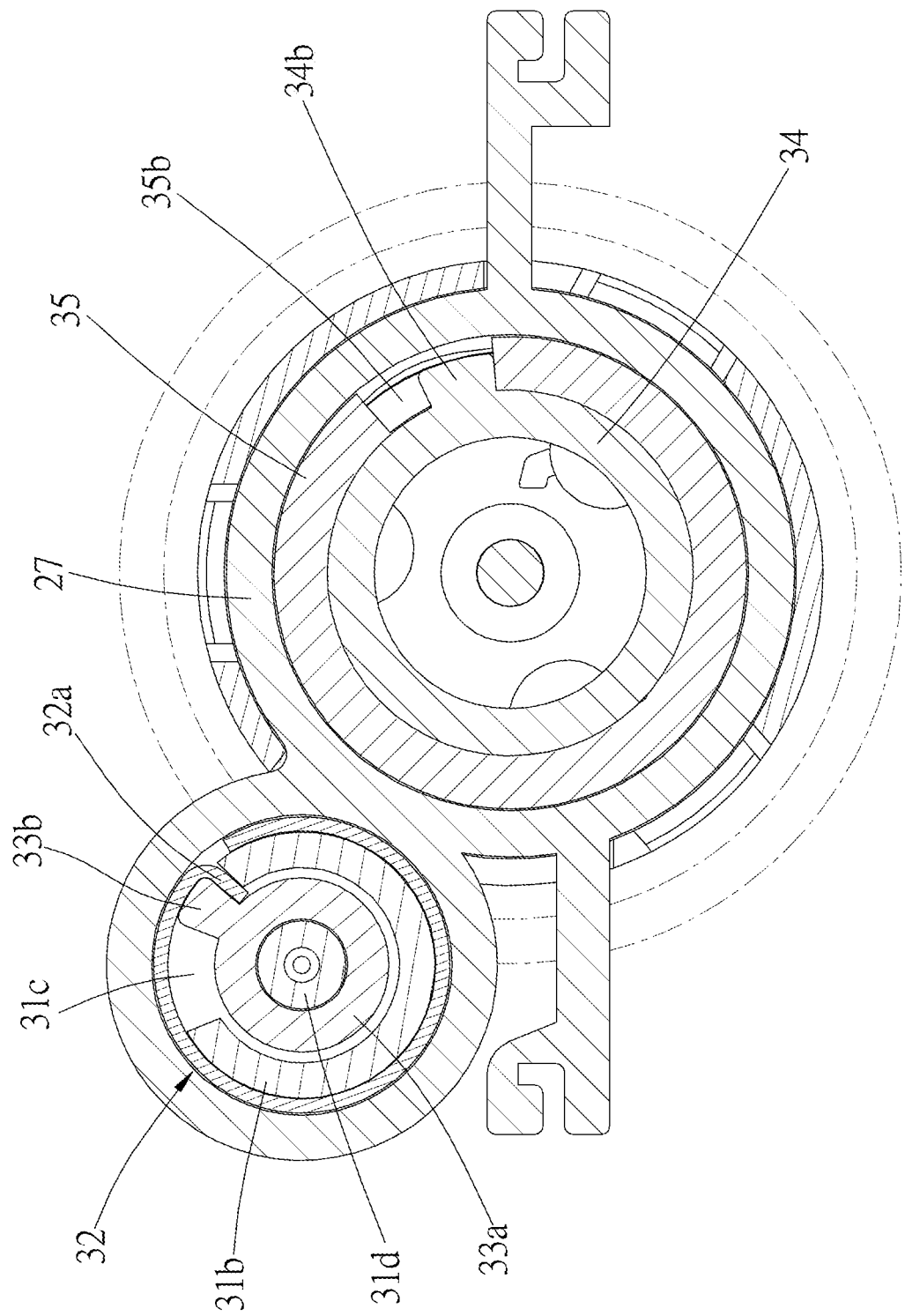
FIG. 18 is a side view of the control mechanism of the window blind in FIG. 17.

The adjustment clutch wheel 29 of the adjustment output mechanism is provided in the first chamber 26A of the first outer case 26, and is located in the adjustment output wheel 28. The adjustment clutch wheel 29 has a second coupling hole 29a provided at a center on a side of the adjustment clutch wheel 29, as shown in FIG. 7, wherein the second coupling hole 29a matches the second coupling post 23d of the transmission wheel 23, and is inserted by the second coupling post 23d, so that the adjustment clutch wheel 29 would be rotated in the same direction as the rotary wheel 20 rotating, through the transmission wheel 23 in an indirect way. As shown in FIG. 13 and FIG. 14, the adjustment clutch spring 30 has a main body 30a and two end legs 30b, 30c respectively connected to a front side and a rear side of the main body 30a in a staggered manner, wherein the main body 30a fits around the adjustment clutch wheel 29, and, when in a normal condition, the main body 30a would fit around the adjustment clutch wheel 29 tightly, so that the adjustment clutch spring 30 could rotate synchronously with the adjustment clutch wheel 29. The first block 28a is provided between the end legs 30b, 30c. When the adjustment clutch wheel 29 is rotated, and the adjustment clutch spring 30 is in the tightly-fitting state, one of the end legs of the adjustment clutch spring 30 contacts with the first block 28a, whereby to abut against the adjustment output wheel 28 to rotate.

As shown in FIG. 15 to FIG. 18, the adjustment output mechanism further includes the axial pipe 31, the first brake spring 32, and the adjustment driven wheel 33. The axial pipe 31 is rotatably provided in the fifth chamber 27B of the second outer case 27. A front half portion 31a of the axial pipe 31 extends out of the second outer case 27 to connect to the adjusting shaft 16, and a rear half portion 31b of the axial pipe 31 is tubular, and has a cut 31c and a second supporting post 31d. The first brake spring 32 fits around the rear half portion 31b of the axial pipe 31, and has a free end 32a extending into the cut 31c. When the slats 12 are at the first position, the first brake spring 32 would gently abut against an inner wall of the fifth chamber 27B of the second outer case 27 if the first brake spring 32 is in an allowed condition, wherein said allowed condition refers to the condition that, during the process of tilting the slats 12 from the first position to the second position, the first brake spring 32 does not excessively friction against the inner wall of the second outer case 27 and affect the smoothness of tilting the slats 12.

The adjustment driven wheel 33 of the adjustment output mechanism has a cylindrical extension shaft 33a, which has a second block 33b projected thereon in a radial direction. An end of the extension shaft 33a is connected to a gear 33c. An axial hole 33d goes through the extension shaft 33a and the gear 33c. The adjustment driven wheel 33 is respectively inserted by the first supporting post 26d and the second supporting post 31d with two ends of the axial hole 33d, so that the extension shaft 33a is inserted into the rear half portion 31b of the axial pipe 31 from another end of the extension shaft 33a, with the second block 33b located in the cut 31c, and the gear 33c located in the third chamber 26C, meshing with the toothed structure 28b of the adjustment output wheel 28. Whereby, the adjustment driven wheel 33 could be driven to rotate by the adjustment output wheel 28.

Figure 19:
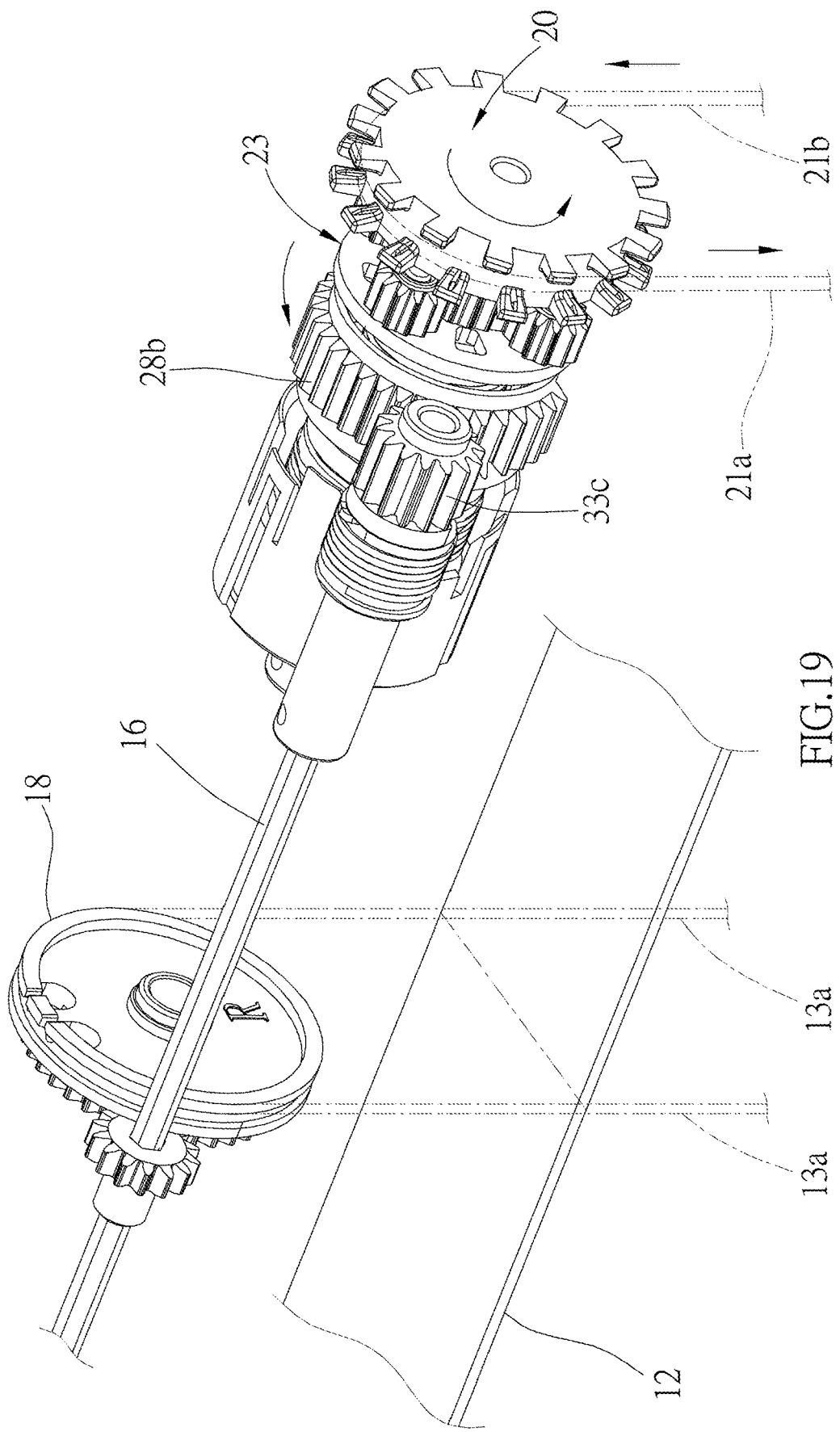
FIG. 19 is a perspective view, showing the slats of the window blind of the embodiment of the present disclosure are arranged horizontally.
Figure 20:
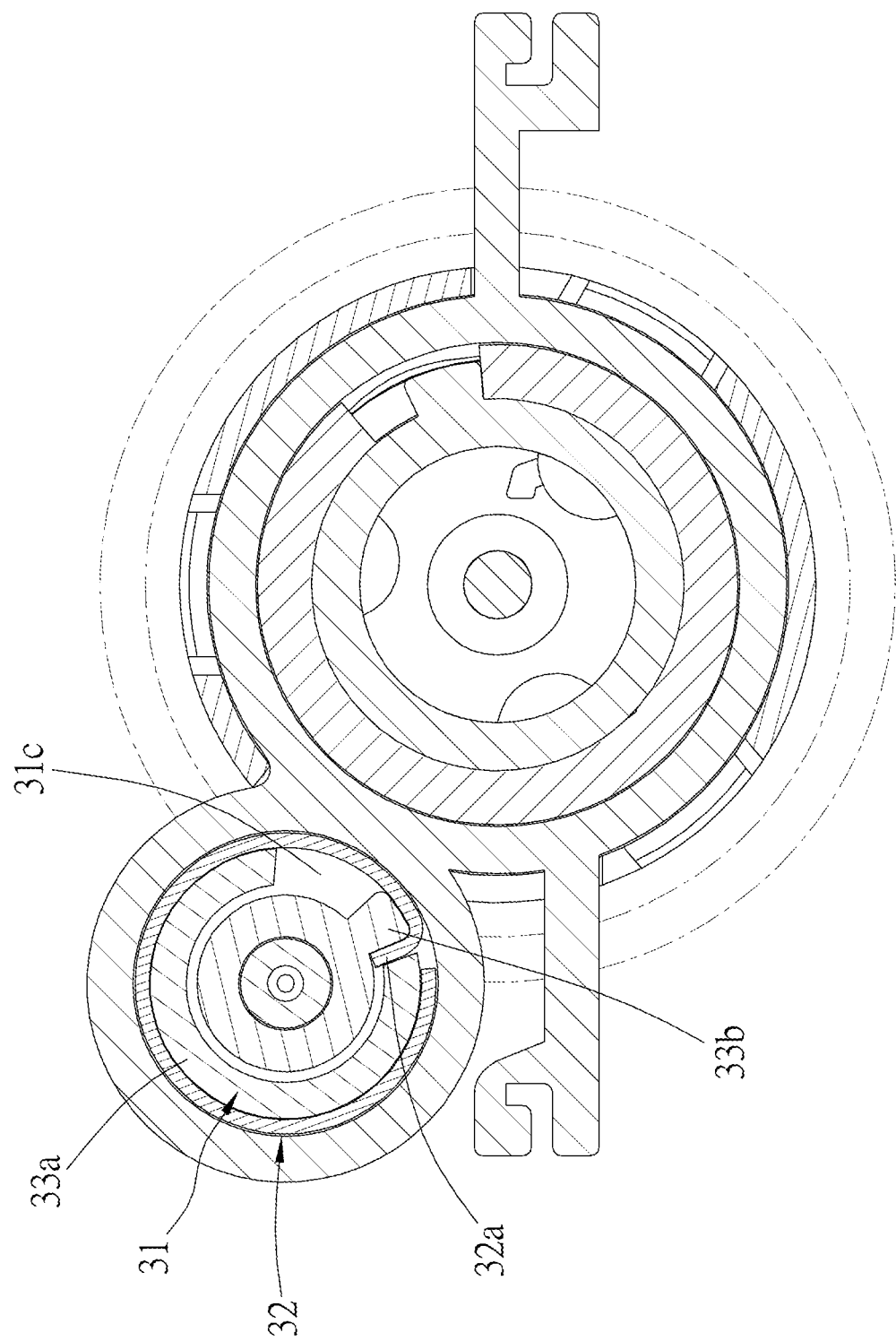
FIG. 20 is similar to FIG. 18, showing the rotation state of the adjustment driven wheel of the window blind.
Figure 21:
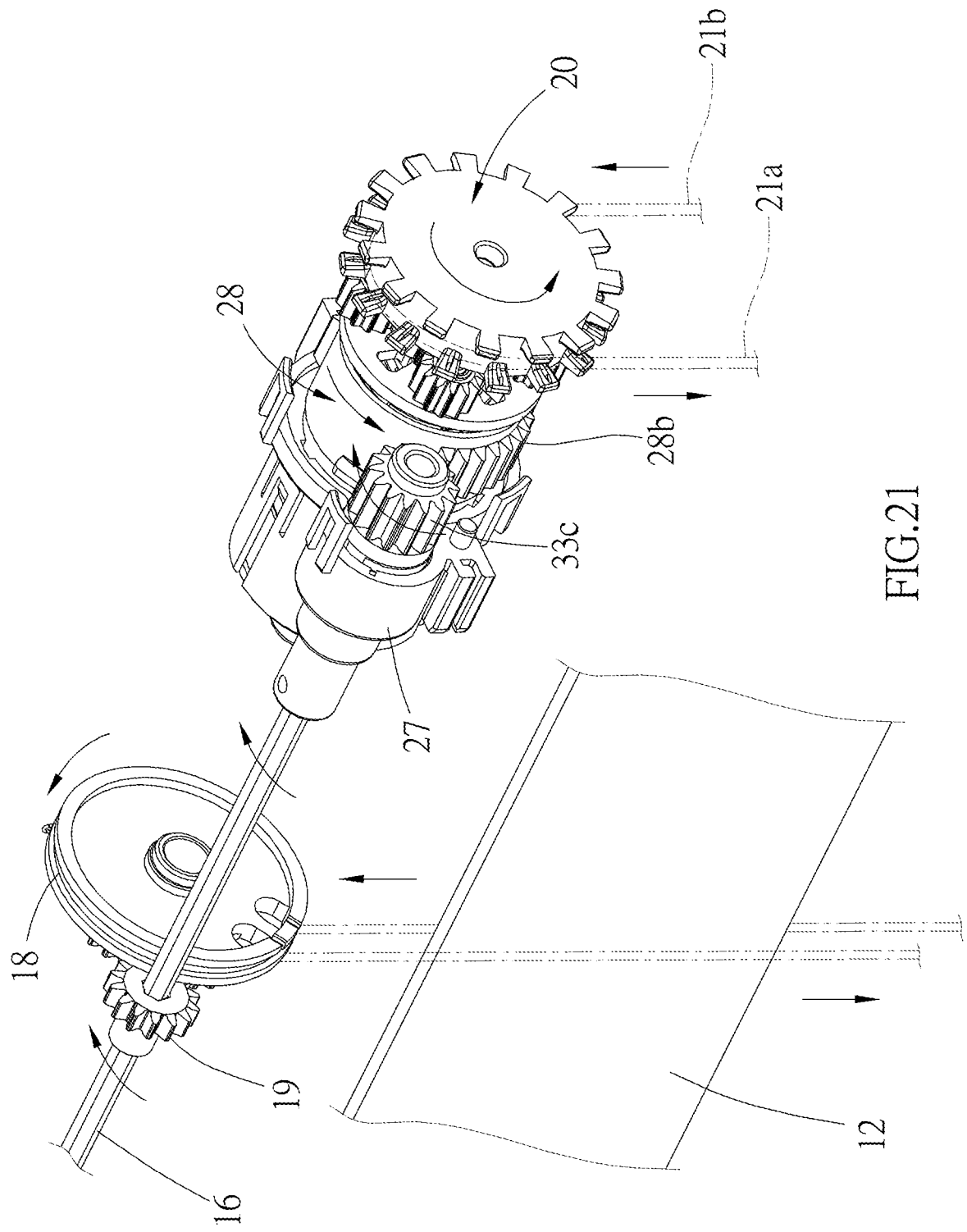
FIG. 21 is a perspective view, showing the slats of the window blind of the embodiment of the present disclosure are arranged nearly vertically.

From the aforementioned structural relation between the components of the input mechanism and the adjustment output mechanism, it can be easily understood that, when the bottom rail 11 of the window blind 1 is located at the low position and the front side 21a of the band 21 is pulled downward as illustrated in FIG. 19, the rotary wheel 20 and the transmission wheel 23 would be driven to rotate in the first rotation direction synchronously. It can be seen in FIG. 13 that the rotated transmission wheel 23 would drive the adjustment clutch wheel 29 to rotate in the first rotation direction as well through the second coupling post 23d. Since the adjustment clutch spring 30 tightly fits around the adjustment clutch wheel 29 in the normal condition, one of the end legs (i.e., the end leg 30b) of the adjustment clutch spring 30 would contact with the first block 28a to also rotate the adjustment output wheel 28 in the first rotation direction. After that, the rotated adjustment output wheel 28 would rotate the adjustment driven wheel 33 in the second rotation direction through the meshing relation of the toothed structure 28b. As shown in FIG. 20, the second block 33b of the adjustment driven wheel 33 would push against the free end 32a of the first brake spring 32 and a wall of the cut 31c, so that the axial pipe 31 is operated to rotate with the adjustment driven wheel 33 as well, whereby to drive the adjusting shaft 16 to rotate. Due to the meshing relation between the gears 19 and the outer toothed rings 18a, the ladder drums 18 would be rotated in the first rotation direction, so as to gradually changes the slats 12 into the nearly vertical state illustrated in FIG. 21, wherein the front side of each of the slats is located low and the rear side of the same slat is located high. During the aforementioned process, the first brake spring 32 would be slightly contracted and remain to gently push against the inner wall of the second outer case 27, which would not generate excessive friction.

By continuously pulling the front side 21a of the band 21, the rotary wheel 20 and the adjustment output wheel 28 would be rotated synchronously, and therefore the adjustment driven wheel 33 would also be driven to rotate, whereby to further drive the adjusting shaft 16 to rotate, which would easily tilt the slats 12 to a required inclination angle. In this way, the amount of light allowed to pass through the covering material could be adequately adjusted. According to most people's habit of using a window blind, the slats 12 are usually adjusted to the complete shielding state shown in FIG. 22B. It is worth mentioning that, while adjusting the inclination angle of the slats 12, the ladder drums 18 might rotate reversely due to inconsistent weight born on the two warps 13a of each of the ladder tapes 13. In this case, the adjusting shaft 16 would also drive the axial pipe 31 to rotate in a reversed direction. If this happens, the axial pipe 31 would directly push the free end 32a of the first brake spring 32 with one of the lateral walls of the cut 31c, and therefore the first brake spring 32 would expand outward to tightly abut against the inner wall of the fifth chamber 27B of the second outer case 27 immediately, whereby to generate a significant friction to ensure the slats to stay at their current locations. Because the first brake spring 32 is expanded outward in an extremely short time, and the expansion of the first brake spring is almost simultaneous to the rotation of the adjusting shaft 16, the user would not even notice the slight change in the locations of the slats 12.

Figure 23:
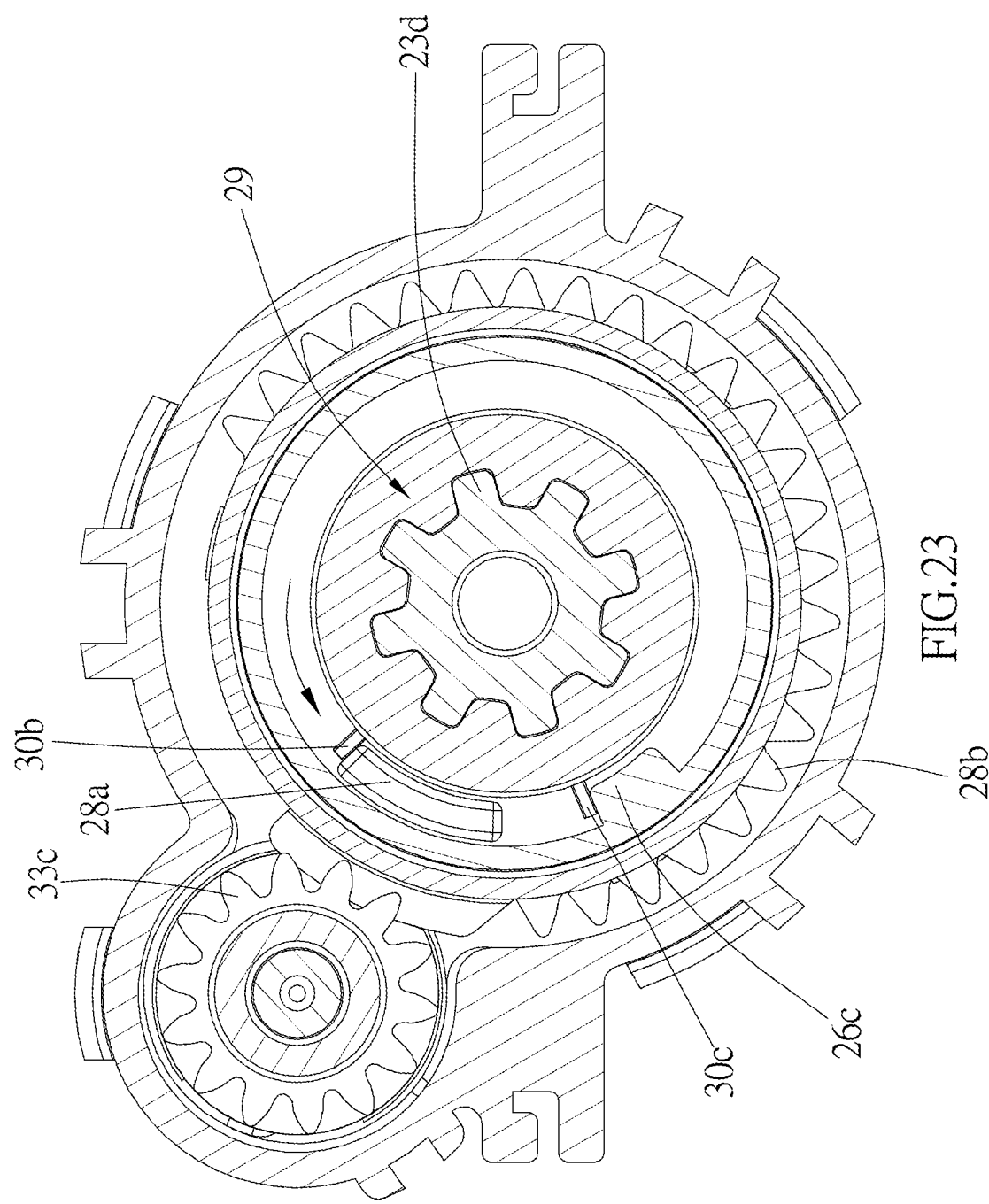
FIG. 23 is similar to FIG. 13, showing a toothed structure of the adjustment output wheel disengages from a gear of the adjustment driven wheel.
Figure 24:
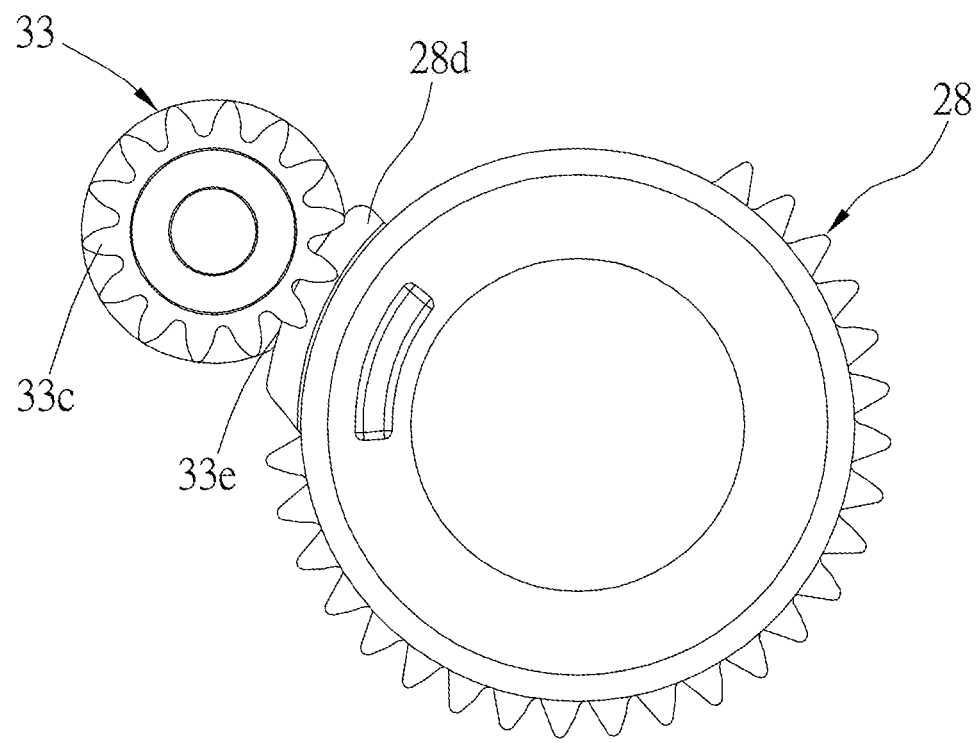
FIG. 24 is similar to FIG. 12, showing the adjustment output wheel and the adjustment driven wheel do not mesh together.
Figure 25:
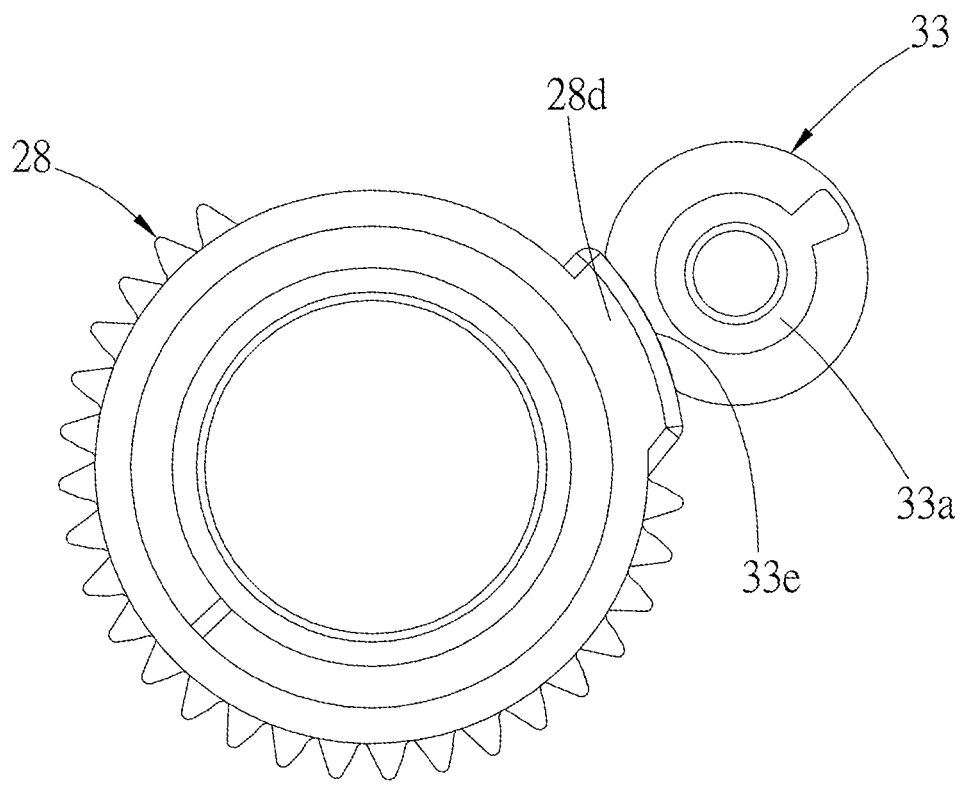
FIG. 25 is a rear view of the relations of the adjustment output wheel and the adjustment driven wheel in FIG. 24.

FIG. 23 shows the condition of the adjustment output wheel 28 when the slats 12 has reached the second position. At this time, one of the end legs (i.e., the end leg 30c) of the adjustment clutch spring 30 abuts against the stopper 26c of the first outer case 26, and the first block 28a of the adjustment output wheel 28 is still apart from the stopper 26c by a distance. As shown in FIG. 24 and FIG. 25, a curved block 28d is projected from an edge of the outer surface of the adjustment output wheel 28 in the current embodiment, and the adjustment driven wheel 33 has a curved surface 33e recessed at a junction of the extension shaft 33a and the gear 33c. A surface of the curved block 28d and the curved surface 33e have the same curvature. When the slats 12 are at the second position, the relative location between the curved block 28d of the adjustment output wheel 28 and the curved surface 33e of the adjustment driven wheel 33 is illustrated in FIG. 24 and FIG. 25. At this time, the toothed structure 28b of the adjustment output wheel 28 disengages from the gear 33c of the adjustment driven wheel 33.

Figure 26:
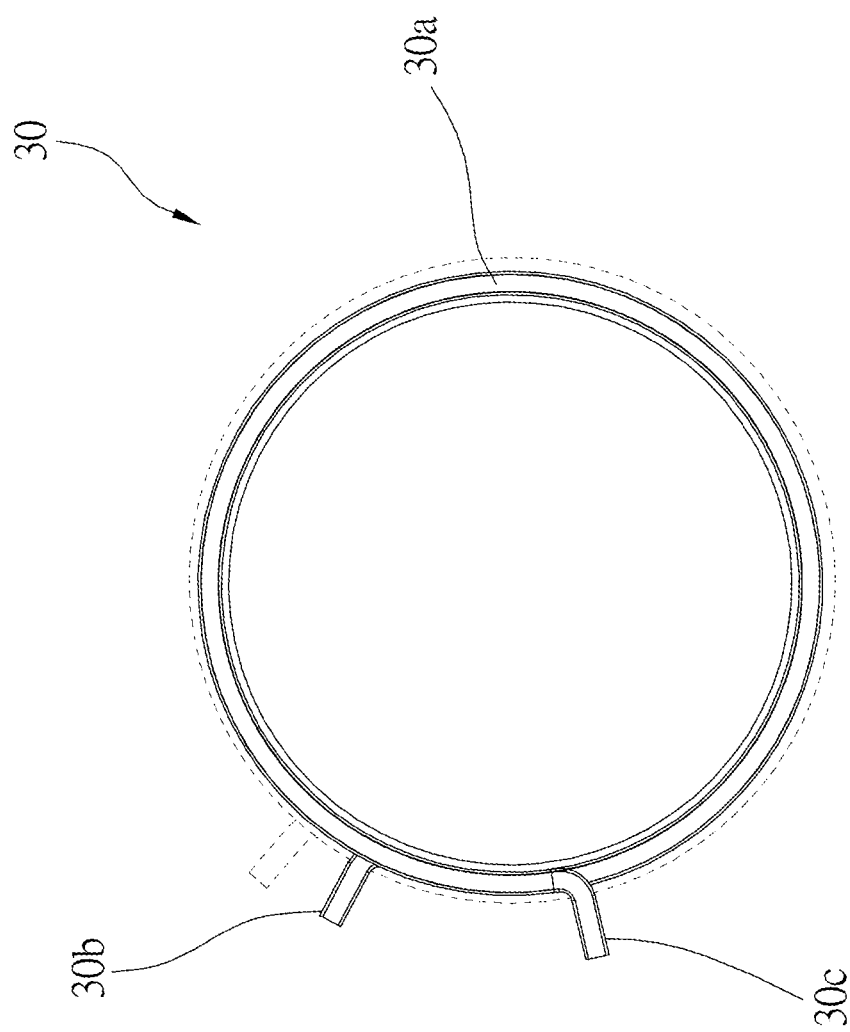
FIG. 26 is a side view, showing the inner diameter of the adjustment clutch spring in FIG. 23 is expanded.

If the front side 21a of the band 21 is further pulled downward, the end leg 30c of the adjustment clutch spring 30 would be stationary as being stopped by the stopper 26c of the first outer case 26. On the other hand, the end leg 30b would continuously push the first block 28a toward the stopper 26c along with the rotation of the adjustment clutch wheel 29, so that the distance between the end leg 30b and the end leg 30c would be shortened. Since the end leg 30b and the end leg 30c are staggered, an inner diameter of the main body 30a would be slightly expanded as illustrated by the imaginary lines in FIG. 26. As a result, the main body 30a would no longer tightly fit around the adjustment clutch wheel 29. Therefore, the adjustment clutch wheel 29 would no longer be able to move the adjustment clutch spring 30, so that the rotation of the adjustment output wheel 28 would be stopped. Whereby, the slats 12 would be stopped rotating as well, and would stay at the second position after adjusting the inclination angle of the slats 12.

The detailed components and their relative locations of the output clutch mechanism and the stroke delay mechanism are illustrated below. As shown in FIG. 27 to FIG. 30, the output clutch mechanism of the current embodiment includes an input end 34, a driving shaft 35, a driven shaft 36, a second brake spring 37, and a one-way clutch. The input end 34 is rotatably provided in the fourth chamber 27A of the second outer case 27, wherein the input end 34 has a plurality of coupling slots 34a distributed on an end of the input end 34 in radial directions thereof, and a fourth block 34b is projected on another end thereof in a radial direction thereof. Each of the coupling slots 34a has a curved bottom. The driving shaft 35 is a cylinder having a hollow portion, and fits around the input end 34. The driving shaft 35 has a plurality of openings 35a provided at an end thereof, and a notch 35h provided at another end thereof, wherein the openings 35 communicate with the hollow portion, and the number of the openings 35 equals the number of the coupling slots 34a. The one-way clutch includes a plurality of pawls 38 pivotally provided on the input end 34. In the current embodiment, an end of each of the pawls 38 is a root 38a with a curved surface, wherein each of the pawls 38 is engaged into one of the coupling slots 34a with the root 38a thereof. A top end of each of the pawls 38 extends into one of the openings 35a. The driven shaft 36 includes a tubular body 36a and an axial pipe 36b which are connected to each other, wherein the tubular body 36a fits around the driving shaft 35, and has a plurality of third blocks 36c projected from an inner wall thereof. The axial pipe 36b is adapted to be inserted by an end of the lifting shaft 15, and fixedly connects the lifting shaft 15. The second brake spring 37 fits around the driving shaft 35, with an end leg 37a of the second brake spring 37 extending into the notch 35b.

Figure 27:
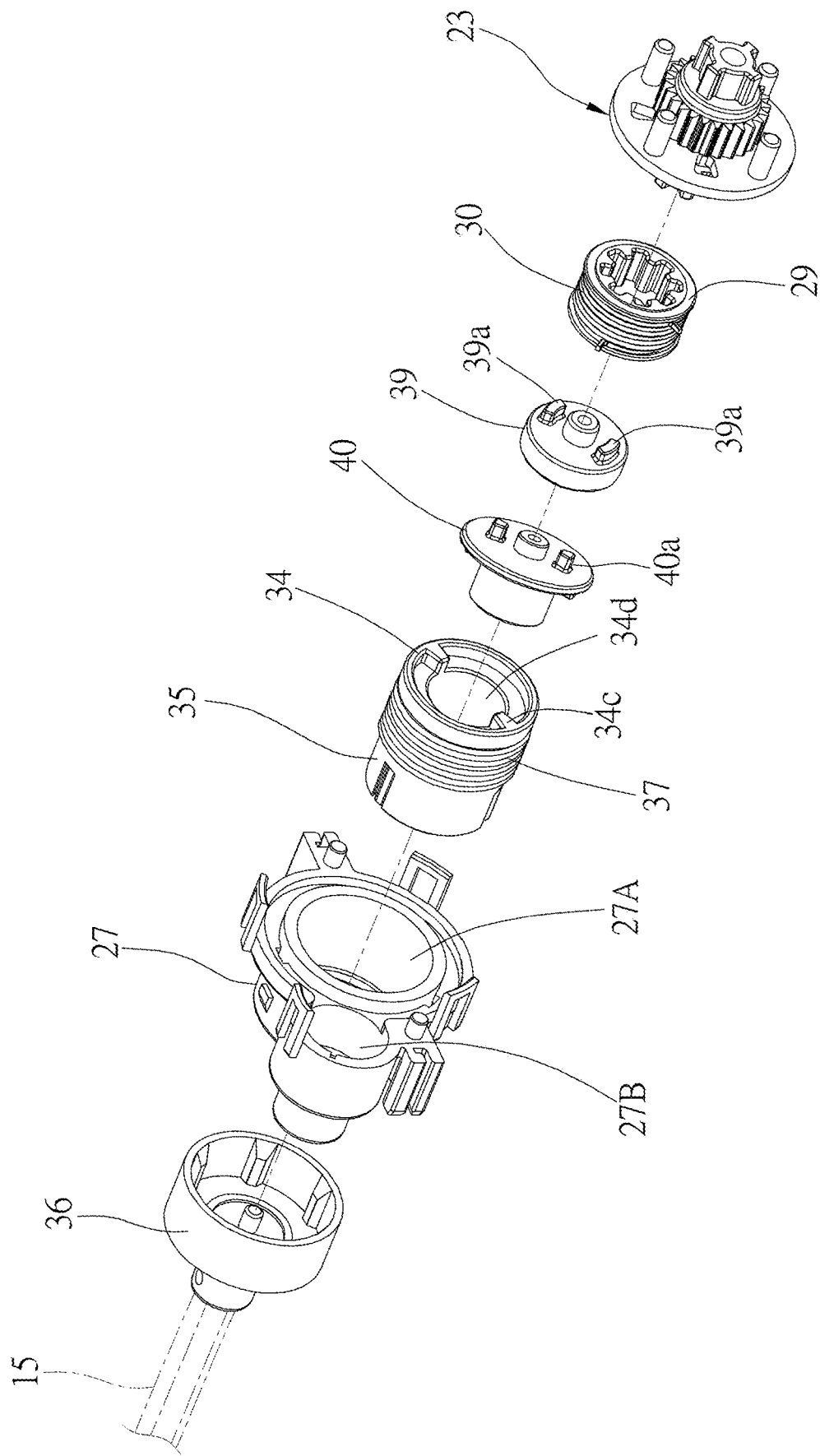
FIG. 27 and FIG. 28 are exploded perspective views, respectively showing an output clutch mechanism and a stroke delay mechanism of the window blind.
Figure 28:
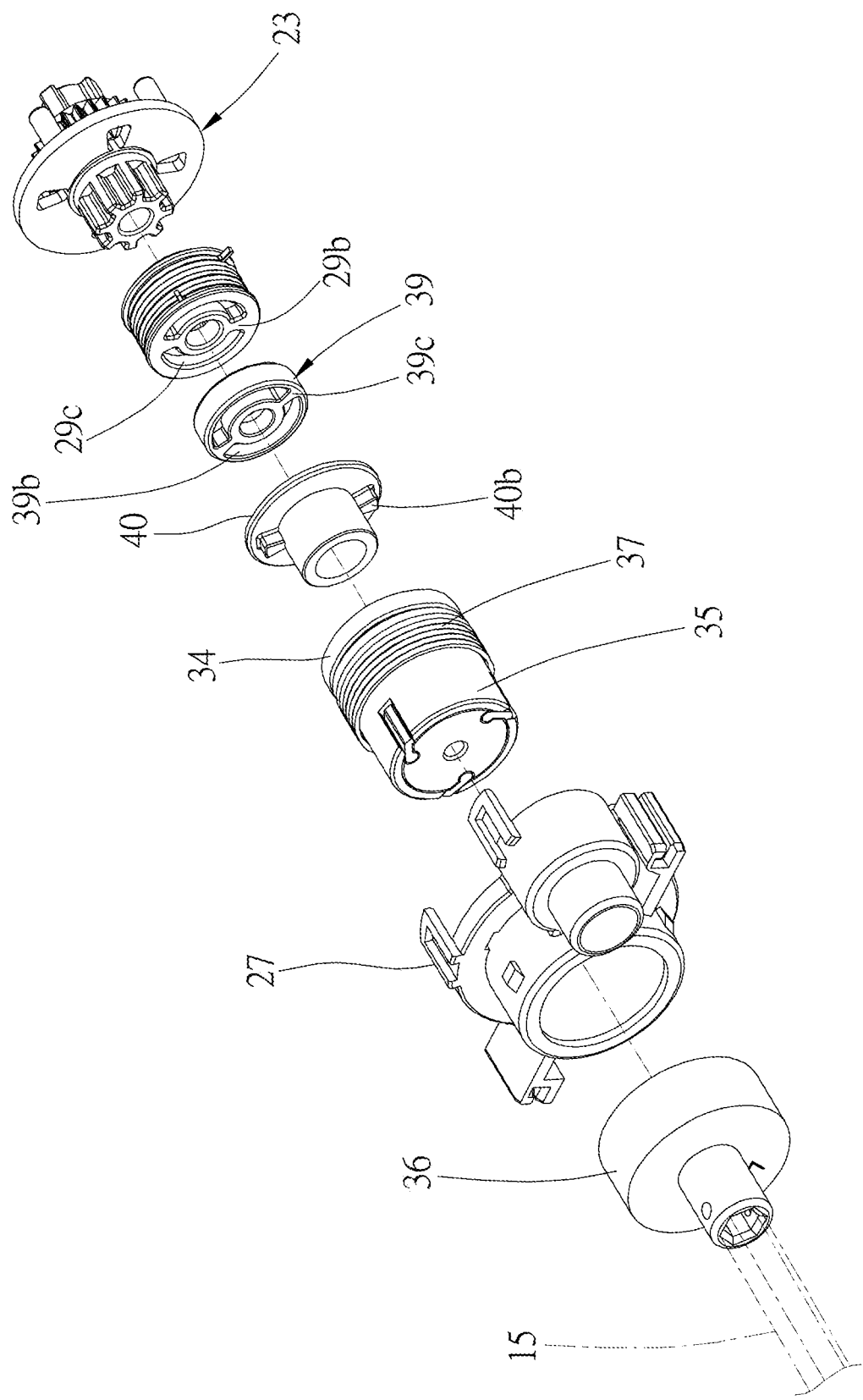
Figure 29:
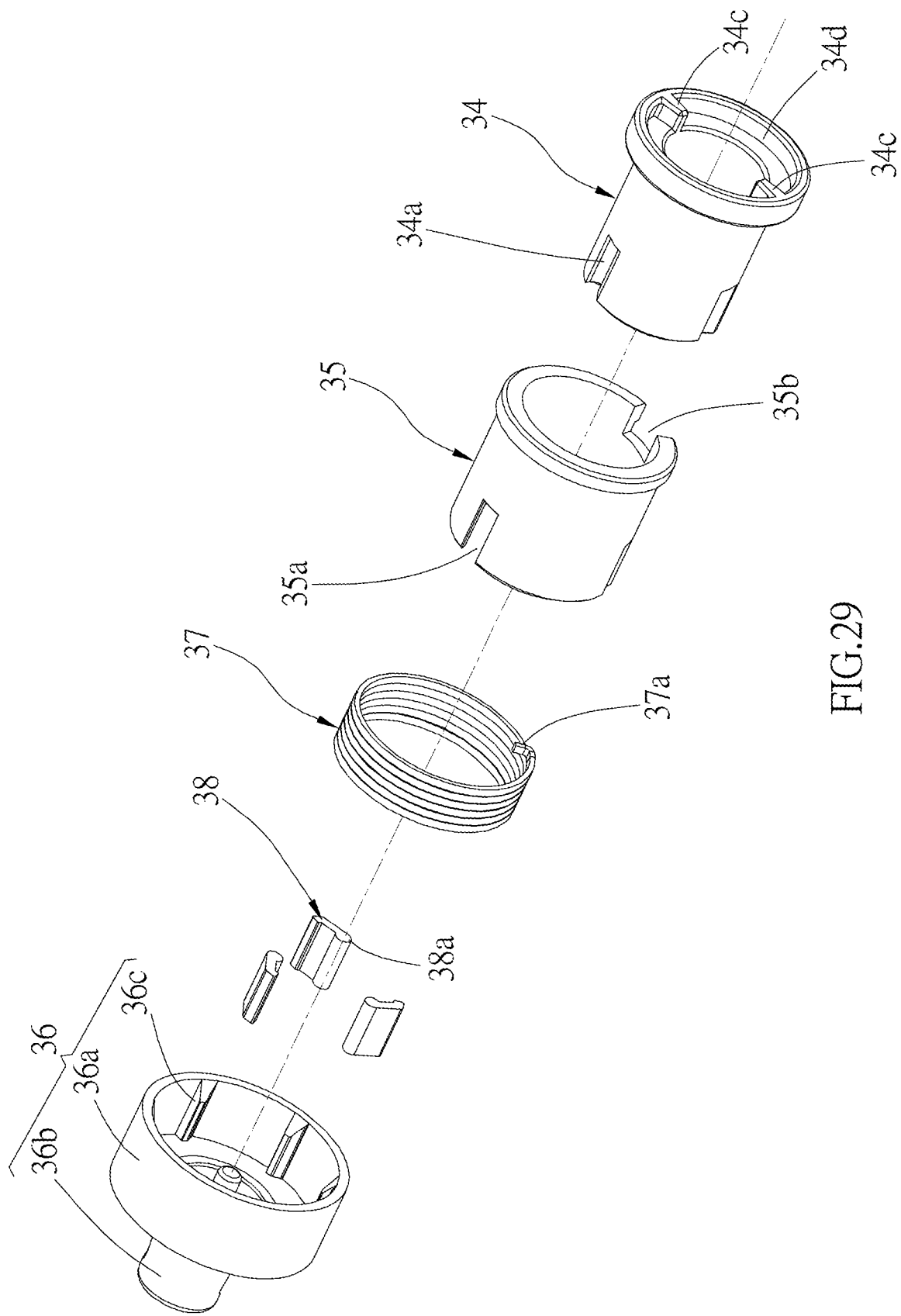
FIG. 29 and FIG. 30 are exploded perspective view, respectively showing the output clutch mechanism of the window blind.
Figure 30:
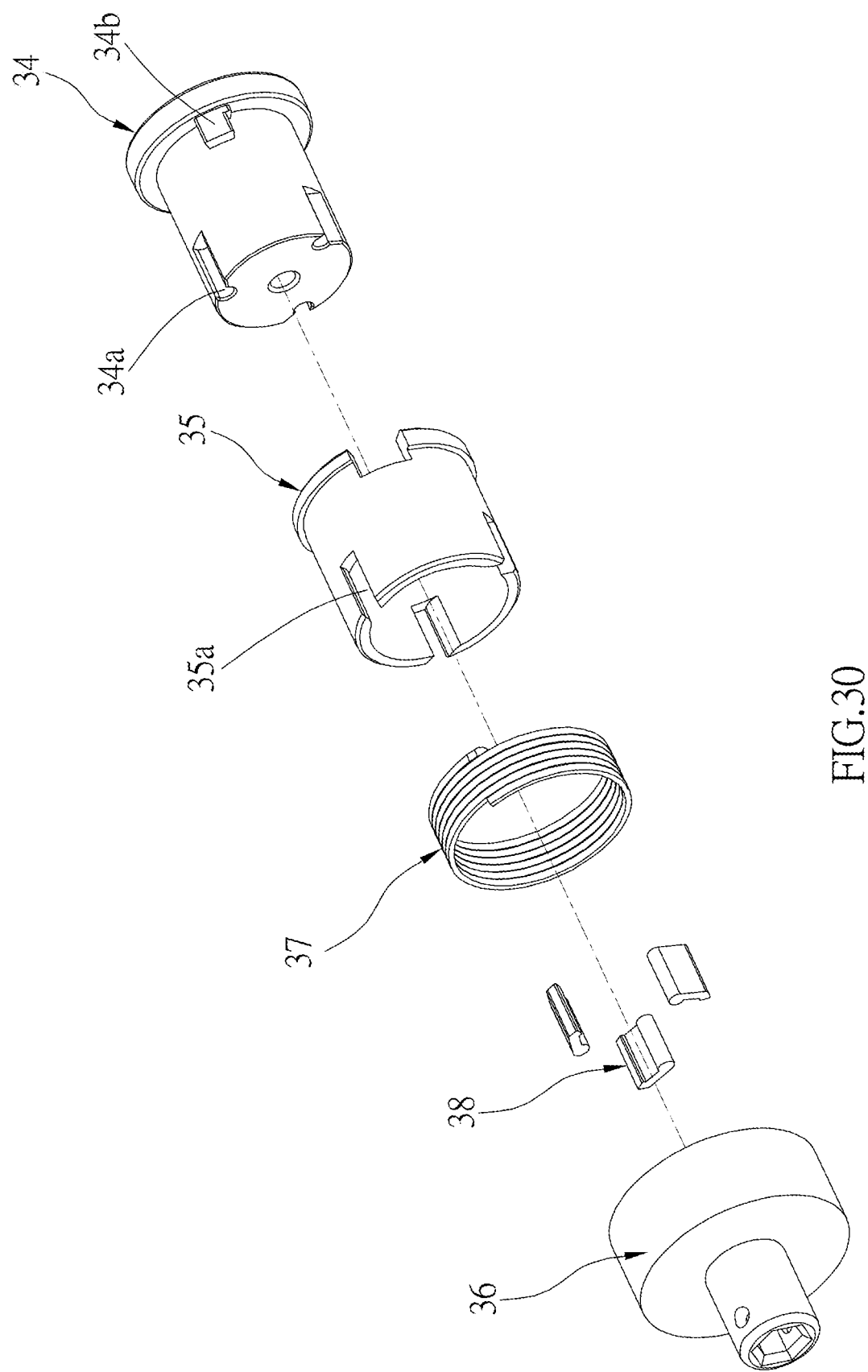
Figure 31:
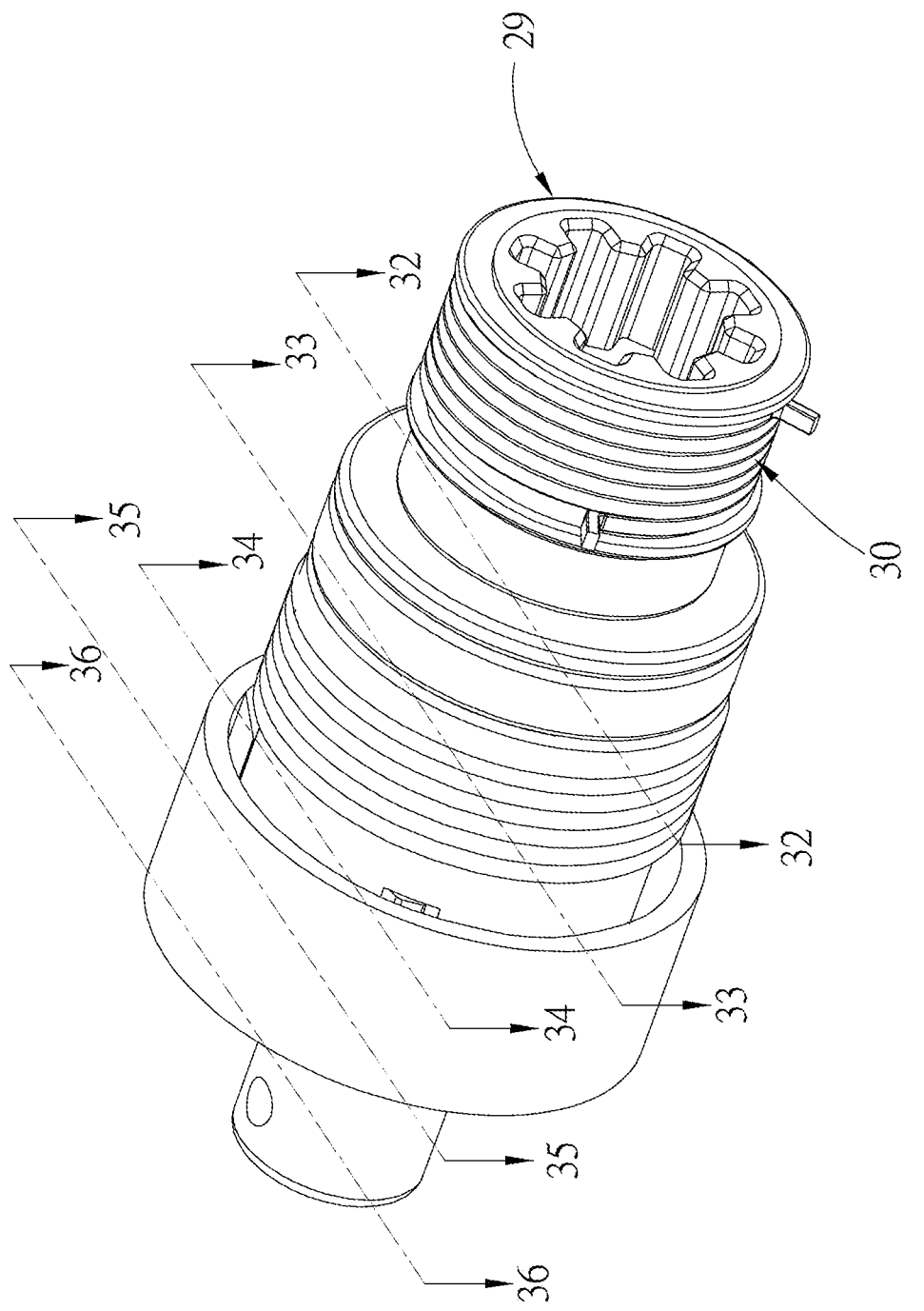
FIG. 31 is a perspective view, showing the output clutch mechanism of the window blind.
Figure 32:
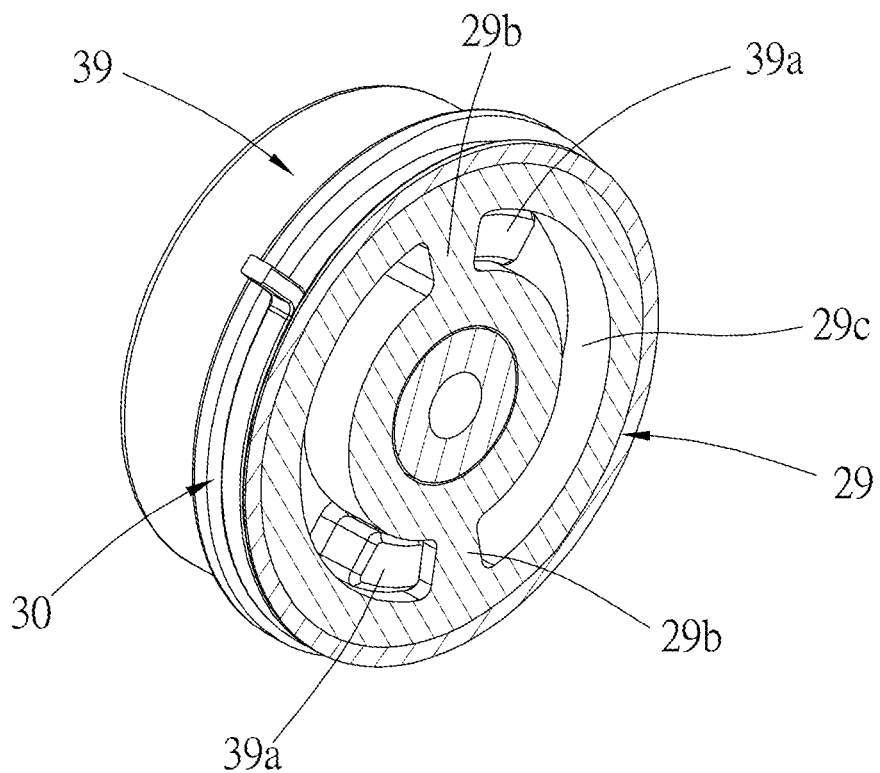
FIG. 32 is a sectional view along the 32-32 line in FIG. 31.
Figure 33:
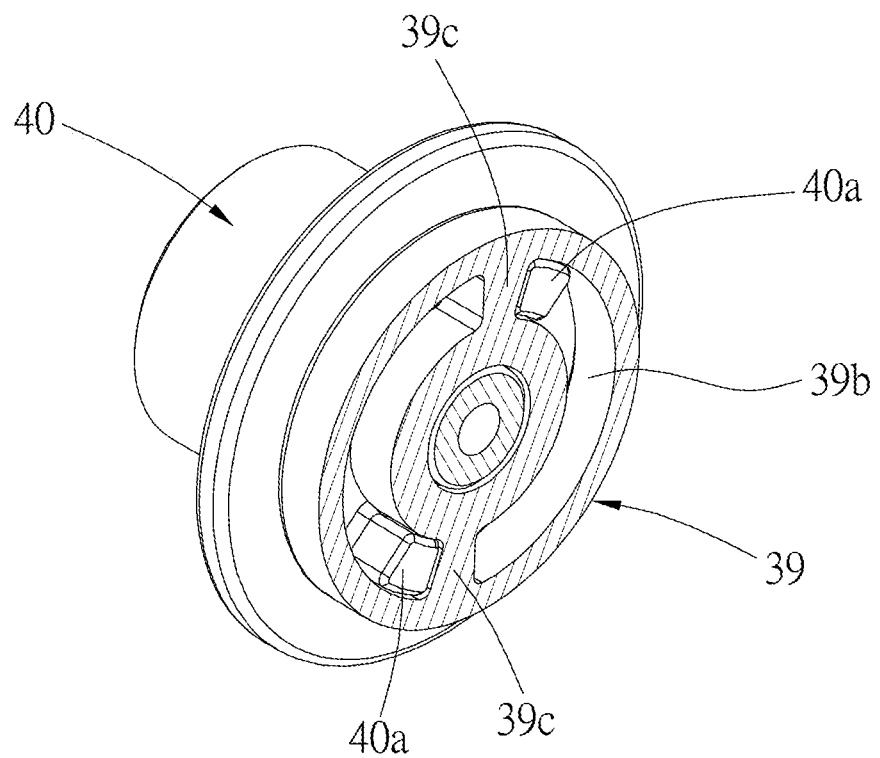
FIG. 33 is a sectional view along the 33-33 line in FIG. 31.
Figure 34:
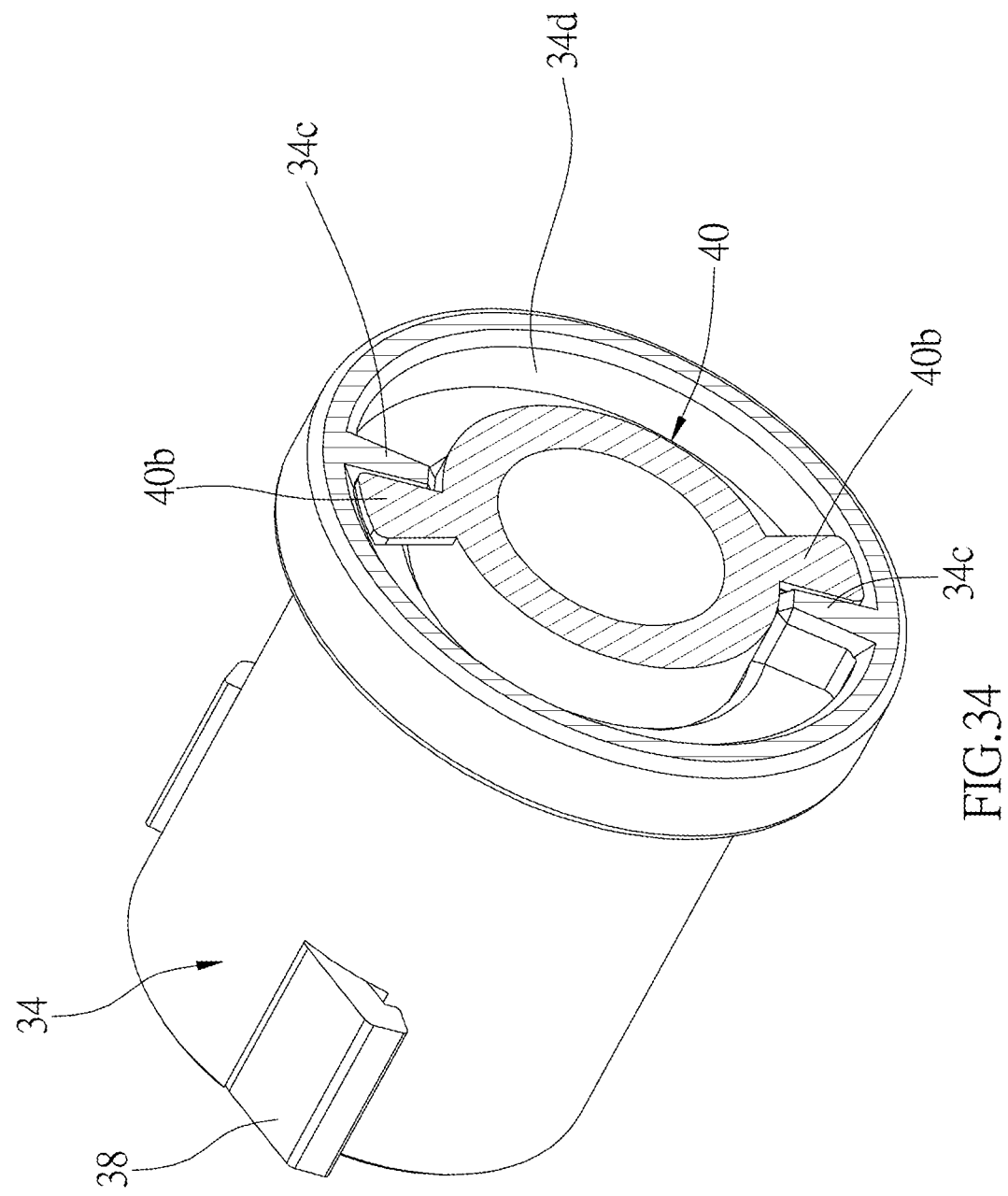
FIG. 34 is a sectional view along the 34-34 line in FIG. 31.
Figure 35:
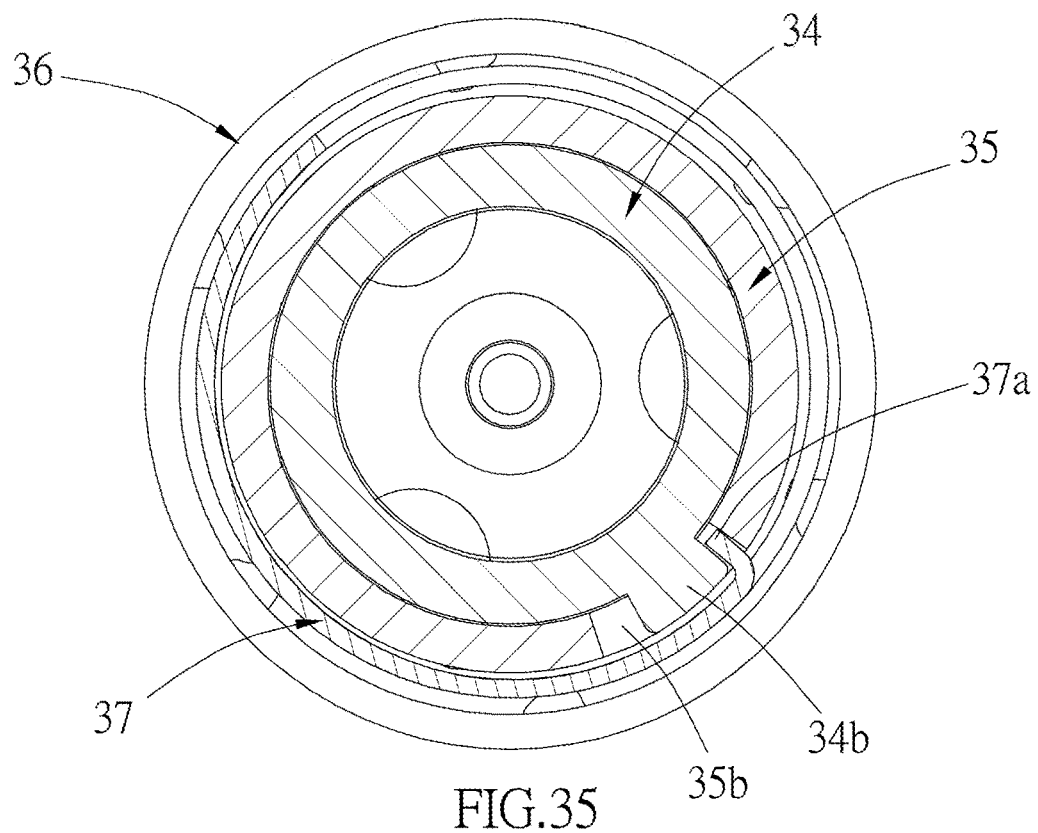
FIG. 35 is a sectional view along the 35-35 line in FIG. 31.
Figure 36:
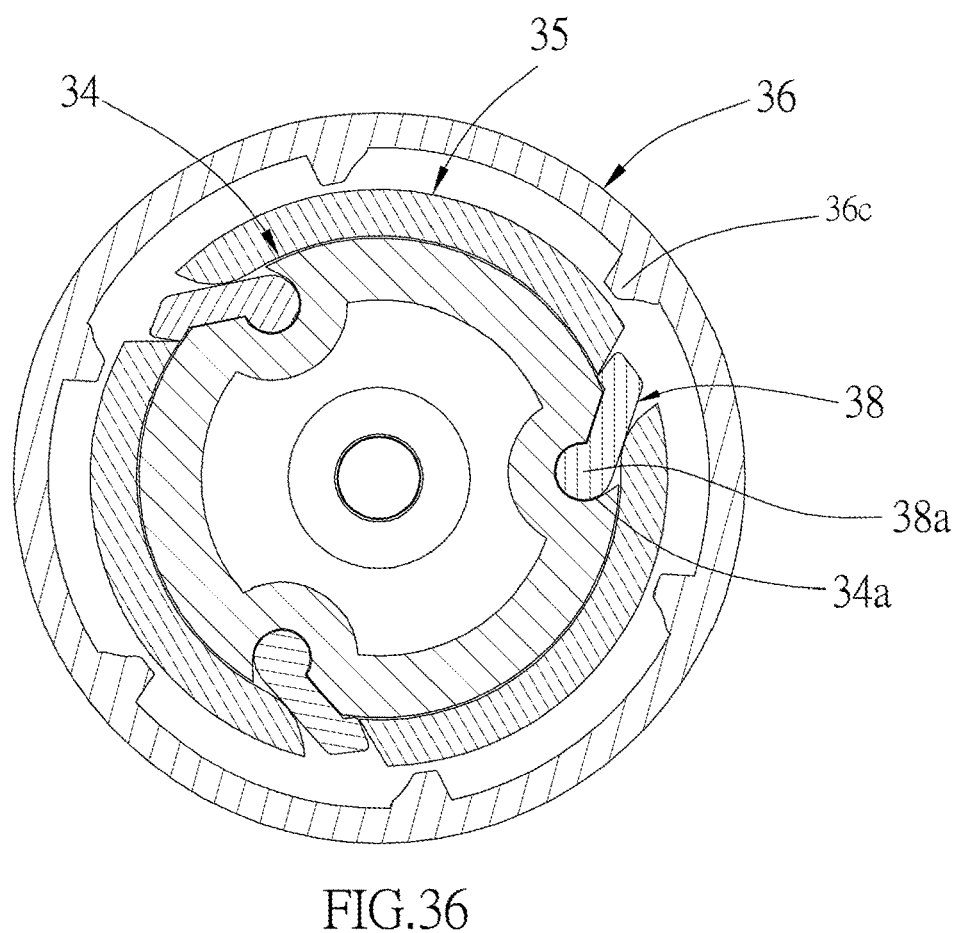
FIG. 36 is a sectional view along the 36-36 line in FIG. 31.

In addition, in the current embodiment, the stroke delay mechanism is located on the transmission path between the adjustment output mechanism and the output clutch mechanism, and is adapted to delay the affected time for transmission between the adjustment output mechanism and the output clutch mechanism. As shown in FIG. 27 and FIG. 28, the stroke delay mechanism includes at least one intermediate wheel provided between the adjustment clutch wheel 29 and the input end 34, two initial push blocks 29b provided on an end surface of the adjustment clutch wheel 29, and two final push blocks 34c provided on an end surface of the input end 34. The intermediate wheel includes two intermediate wheels in the current embodiment, which are the intermediate wheel 39 and the intermediate wheel 40, respectively. The adjustment clutch wheel 29 has two curved slots 29c recessed on another side of the adjustment clutch wheel 29 opposite to the side provided with the second coupling hole 29a, wherein each of the initial push blocks 29b is respectively formed between each two adjacent ends of the curved slots 29c. The final push blocks 34c of the input end 34 are located in a recessed hole 34d near the fourth block 34b. Two blocks 39a are projected from a lateral surface of the intermediate wheel 39, each of which is respectively inserted into one of the curved slots 29c of the adjustment clutch wheel 29. Two curved slots 39b are recessed into another lateral surface of the intermediate wheel 39 opposite to the lateral surface provided with the blocks 39a. A rib 39c is respectively formed between each two adjacent ends of the curved slot 39b (i.e., there are two ribs 39c in total). Two blocks 40a are projected from a lateral surface of the intermediate wheel 40, and each of the blocks 40a is respectively inserted one of the curved slots 39b of the intermediate wheel 39. Furthermore, two blocks 40b are projected from another lateral surface of the intermediate wheel 40, and are inserted into the recessed hole 34d of the input end 34.

The state when the stroke delay mechanism is not motivated is shown in FIG. 31 to FIG. 36. At this time, the end leg 37a of the second brake spring 37 of the output clutch mechanism is located between the fourth block 34b of the input end 34 and a lateral wall of the notch 35b. The pawls 38 are still confined by the driving shaft 35 to remain abutting against the input end 34, wherein the top end of each of the pawls 38 is not exposed out of the corresponding opening 35a.

Figure 37:
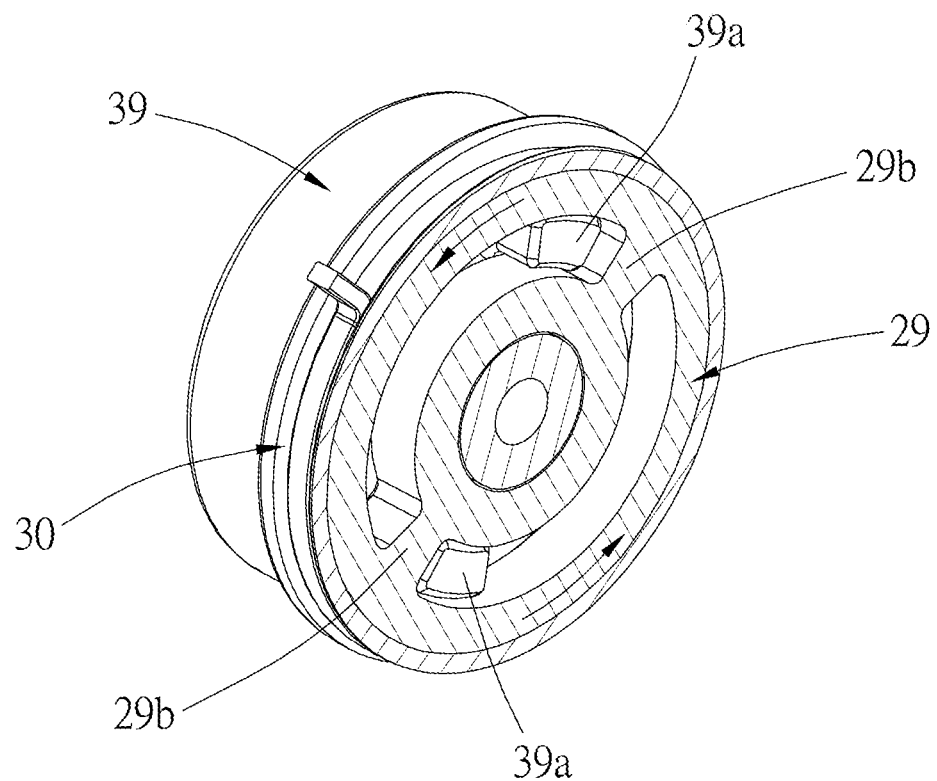
FIG. 37 is similar to FIG. 32, showing the adjustment clutch wheel rotates.
Figure 38:
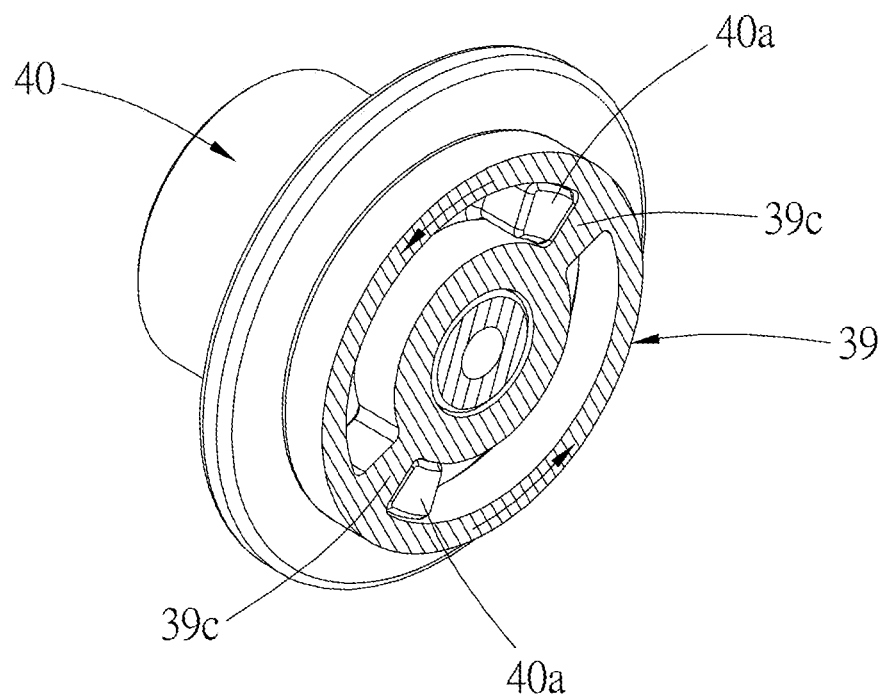
FIG. 38 is similar to FIG. 33, showing one of intermediate wheels rotates.
Figure 39:
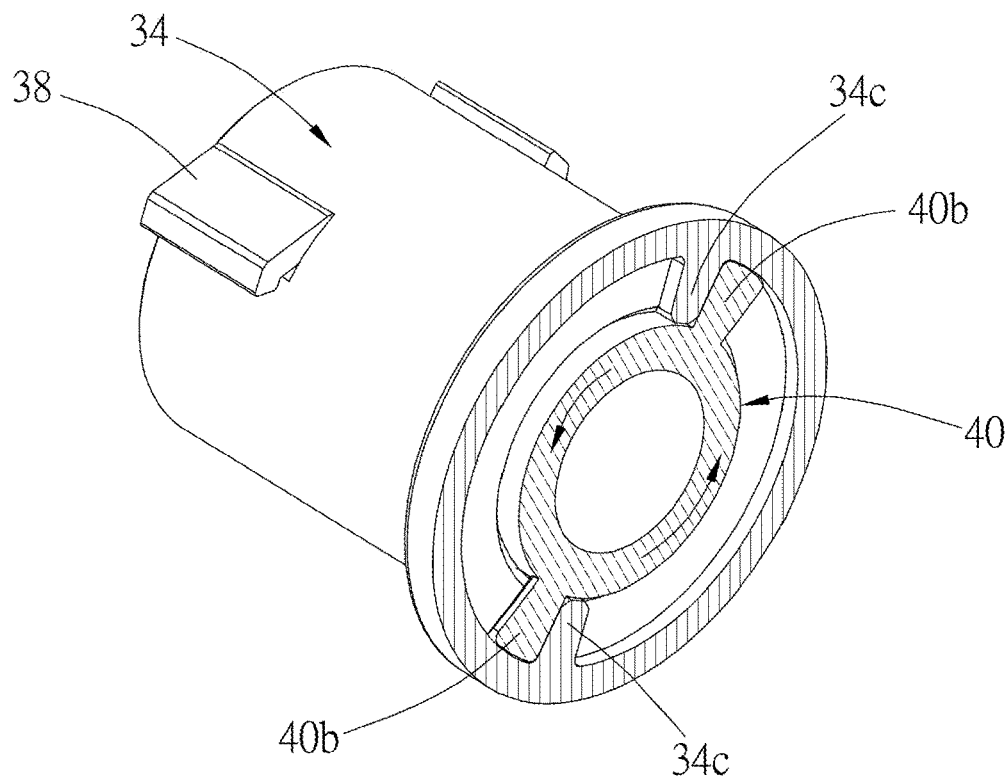
FIG. 39 is similar to FIG. 34, showing another one of the intermediate wheels rotates.

As shown in FIG. 37 to FIG. 39, during the process of adjusting the slats 12 from the nearly vertical and front-high and rear-low state to the nearly vertical and front-low and rear-high state, the rotary wheel 20 would drive the adjustment clutch wheel 29 to rotate in the first rotation direction for a short distance, and then the initial push blocks 29b would push the blocks 39a to rotate the intermediate wheel 39. If the front side 21a of the band 21 is continuously pulled in order to gradually tilt the slat 12s, the intermediate wheel 39 would be pushed and rotated for a short distance before ribs 39c of the intermediate wheel 39 touch and push the blocks 40a to drive the another intermediate wheel 40 to rotate. Similarly, the intermediate wheel 40 would be rotated for a short distance before blocks 40b of the intermediate wheel 40 touch and push the final push blocks 34c of the input end 34. At this time, the slats 12 are exactly tilted to the second position, and the stroke delay mechanism also finishes its stroke. Meanwhile, the curved block 28d of the adjustment output wheel 28 and the curved surface 33e of the adjustment driven wheel 33 are in a mutually complementary state illustrated in FIG. 24 and FIG. 25.

Figure 40:
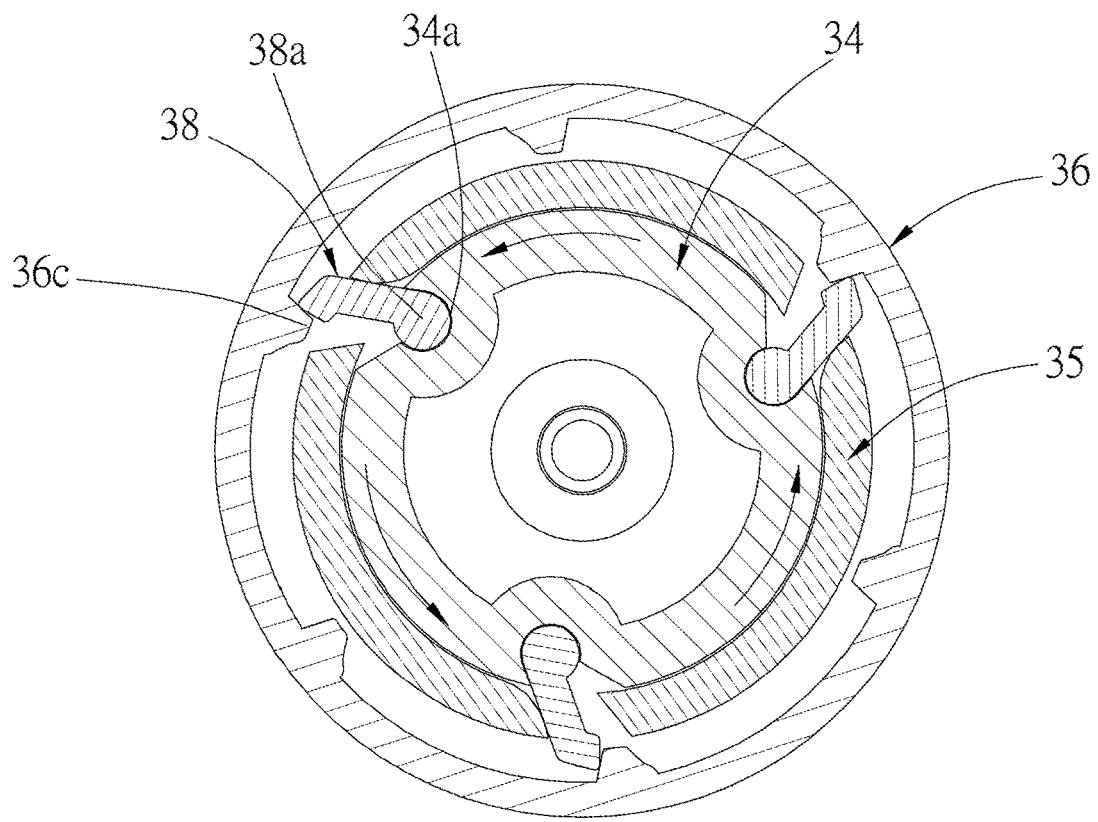
FIG. 40 is similar to FIG. 36, showing the input end rotates.

After the aforementioned stage, if the front side of the band 21a is continuously pulled downward, the input end 34 would be driven to start rotating. As shown in FIG. 40, the rotated input end 34 would force the pawls 38 to pivot, and the top end of each of the pawls 38 would extend out of the corresponding opening 35a to abut against the corresponding third block 36c, whereby the driven shaft 36 and the lifting shaft 15 would be driven together to rotate in the first rotation direction, which would eventually drives the spools 17 to roll up the lifting cords 14. As a result, the bottom rail 11 would be pulled toward the headrail 10 to gradually collect the window blind 1. It can be seen from the above descriptions that, the input end 34 would motivate the one-way clutch to rotate the driven shaft 36 along with the rotation of the rotary wheel 20 in the first rotation direction. In other words, by simply pulling the front side 21a of the band 21, the slats 12 could be tilted, and the window blind 1 could be collected as well. Therefore, such design of the window blind 1 of the current embodiment would be easy to use.

It is worth mentioning that, during the process of moving the bottom rail 11 toward the high position, if the pulling force is no longer exerted on the front side 21a of the band 21 at any time point, the bottom rail 11, which bears the weight of the slats 12, would drive the lifting shaft 15 to rotate in a reversed direction (i.e., in the second rotation direction) through the lifting cords 14, which would subsequently rotate the driven shaft 36 and the driving shaft 35 in the reversed direction. Furthermore, the reversely rotated driving shaft 35 would push against the end leg 37a of the second brake spring 37 with the lateral wall of the notch 35b, so as to expand the second brake spring 37 outward to tightly abut against the inner wall of the fourth chamber 27A of the second outer case 27 immediately, whereby to generate a significant friction to stop the rotation of the driving shaft 35. Indirectly, the bottom rail 11 would stay at the current location without drooping any further as a result. Because the second brake spring 37 is expanded outward in an extremely short time, and the expansion of the second brake spring 37 is almost simultaneous to the rotation of the lifting shaft 15, the user would not even notice the slight downward movement of the bottom rail 11.

It is also worth mentioning that, before the bottom rail 11 is moved upward, since the toothed structure 28b of the adjustment output wheel 28 of the adjustment output mechanism disengages from the gear 33c of the adjustment driven wheel 33, the gear 33c would directly align with the bare section 28c. In this way, while the bottom rail 11 is moved upward, though the adjustment driven wheel 33 indirectly bears the weight of the slats 12 suspended on the ladder tapes 13, it would have no effect on the adjustment output wheel 28 due to the meshing relation between the gear 33c and the toothed structure 28b no longer exists. Whereby, the operation of the bottom rail 11 would be smooth.

Figure 41:
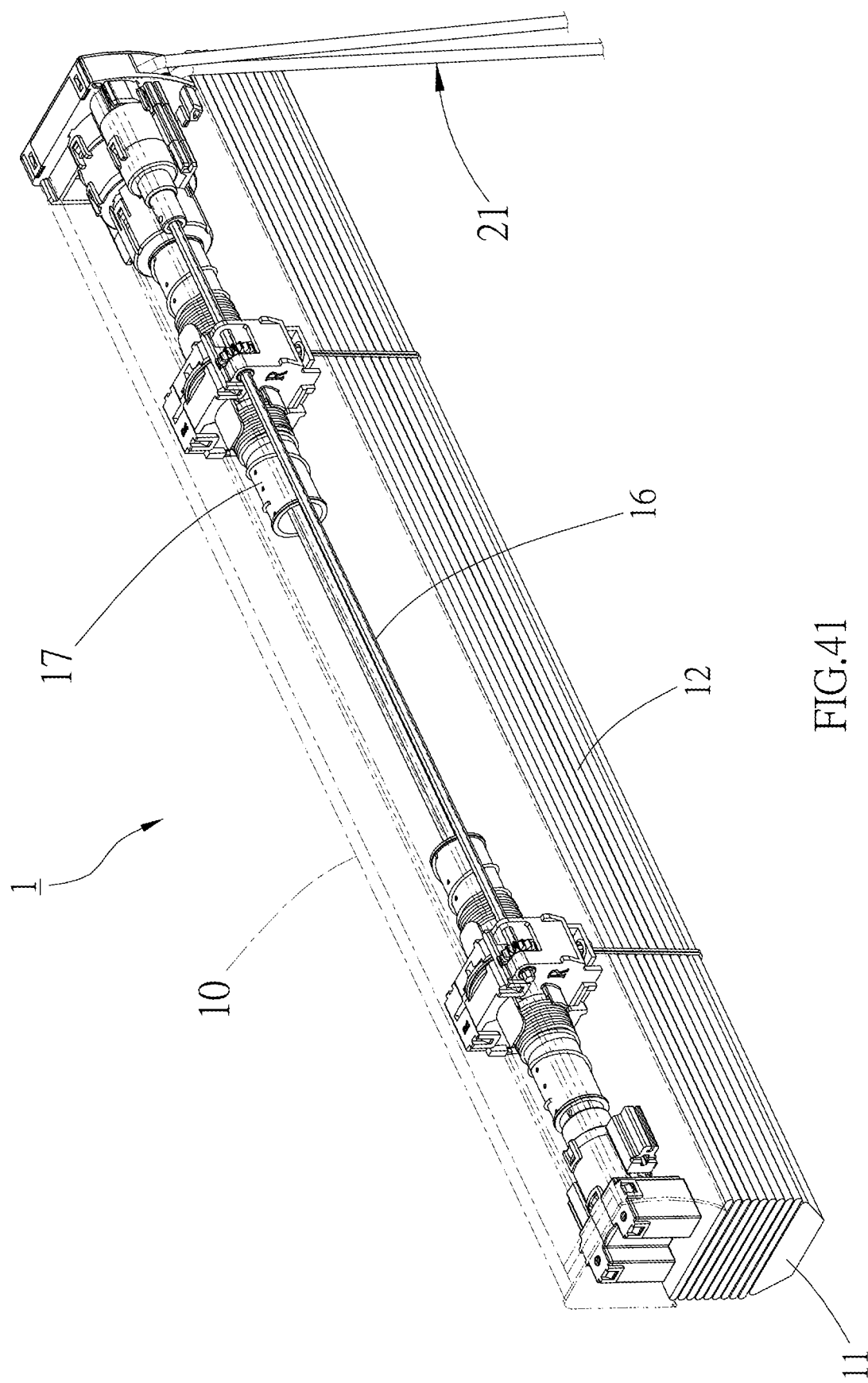
FIG. 41 is a perspective view, showing the window blind of the present disclosure is completely collected.
Figure 42:
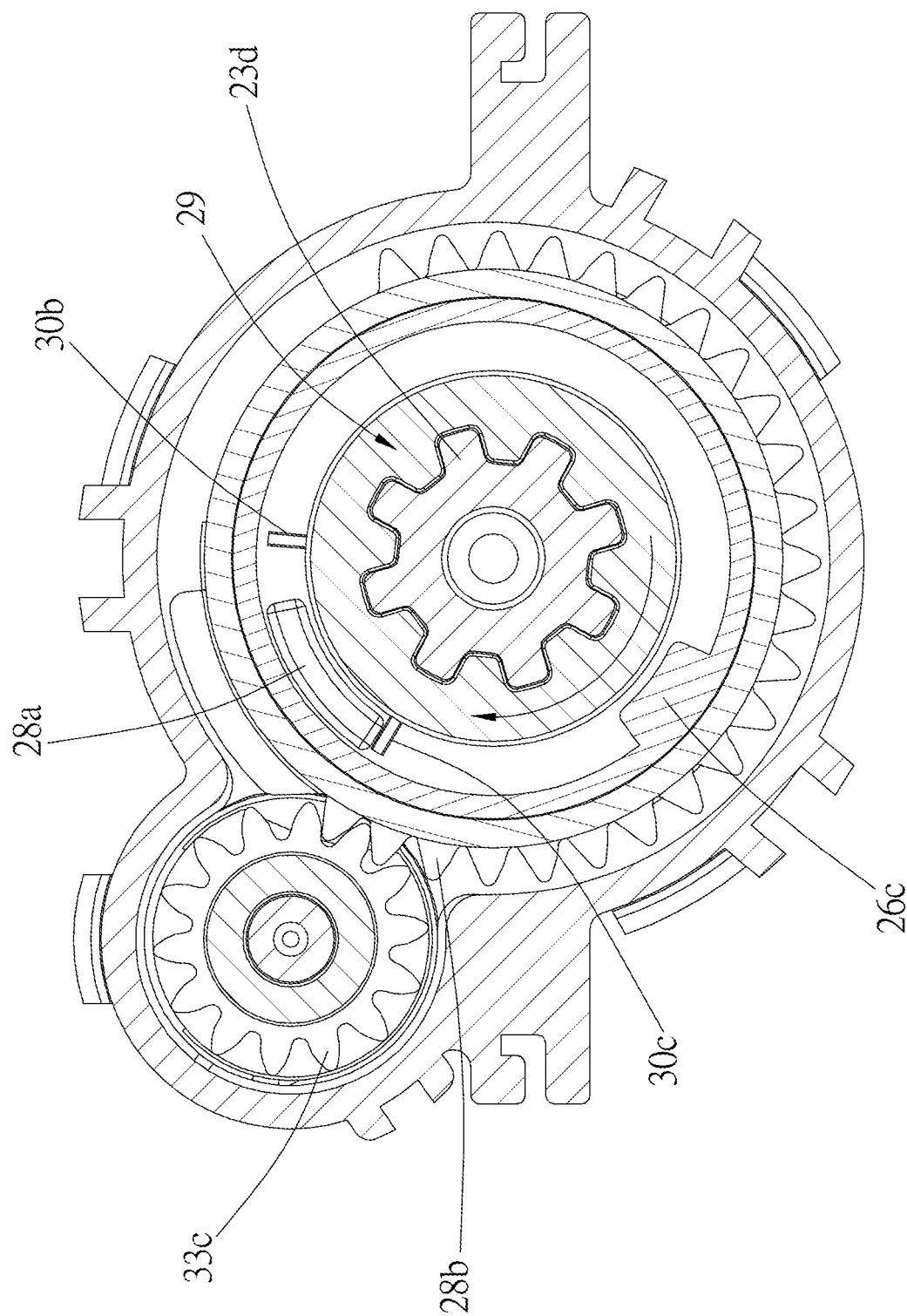
FIG. 42 is similar to FIG. 13, showing the toothed structure of the adjustment output wheel meshes with the gear of the adjustment driven wheel again.

FIG. 41 shows the condition when the bottom rail 11 is moved to the high position, i.e., when the window blind 1 is completely collected. The mechanisms used for expanding the window blind 1 and the detailed components, including their relative locations and ways of interacting, are described below. As shown in FIG. 42, when the rear side 21b of the band 21 is pulled downward to drive the rotary wheel 20 to rotate in the second rotation direction (i.e., the clockwise direction), the adjustment clutch wheel 29 of the output clutch mechanism would push the adjustment output wheel 28 to rotate in the second rotation direction through the adjustment clutch spring 30. Thanks to the complementary relation between the curved block 28d of the adjustment output wheel 28 and the curved surface 33e of the adjustment driven wheel 33, and therefore the complementary relation could provide a good positioning and guiding effect, the toothed structure 28b of the adjustment output wheel 28 would successfully mesh with the gear 33c of the adjustment driven wheel 33 again. Therefore, during the process when the ladder drums 18 is being driven to reversely rotate by the adjusting shaft 16, the stroke delay mechanism in the current embodiment could also finish its predetermined distance. Said complementary relation between the curved block 28d and the curved surface 33e could prevent the collision between the peaks of the teeth of each component which might hinder the re-meshing between the disengaged toothed structure 28b and gear 33c.

Figure 43:
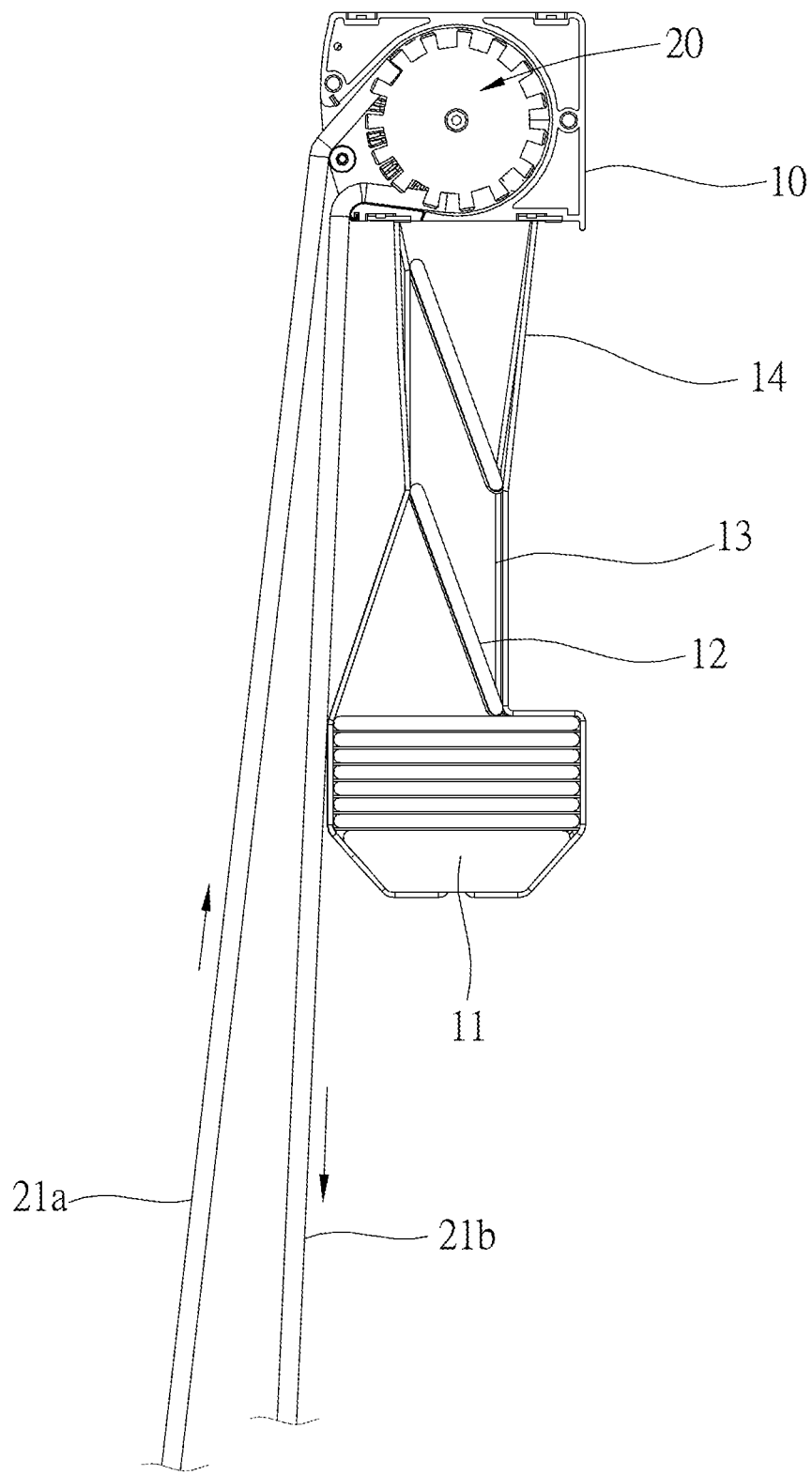
FIG. 43 is a sectional view, showing the bottom rail moves downward, and the slats rotate from top down one by one.

By further pulling the rear side 21b of the band 21 downward for a short distance, the input end 34 would be driven to rotate in the second rotation direction. At this time, the input end 34 would quickly pull the pawls 38 back into the openings 35a of the driving shaft 35, whereby the top end of each of the pawls 38 no longer abuts against the corresponding third block 36c of the driven shaft 36. Meanwhile, the lifting shaft 15, which bears the weight of the bottom rail 11 and the slats 12, would drive the driven shaft 36 to rotate on free relative to the input end 34, and the lifting cords 14 would be released from the spools 17, whereby the bottom rail 11 and the slats 12 would automatically drop. During the process of moving downward, the slats 12 would be automatically tilted from top down one by one, as shown in FIG. 43. When the bottom rail 11 arrives at the low position, the slats 12 would automatically return to the first position illustrated in FIG. 22A, i.e., the nearly vertical and front-high and rear-low state. It can be seen from the above descriptions, the input end 34 would rotate in the second rotation direction along with the rotary wheel 20, so that the one-way clutch would disengage from the driven shaft 36. In this way, the bottom rail 11 could be operated to move downward automatically, expanding the window blind 1. On the other hand, the inclination angle of the slats 12 could be adjusted by further pulling the front side 21a of the band 21.

During the aforementioned process of lowering the bottom rail 11, the pawls 38 could be restored to the state of abutting against the third blocks 36c of the driven shaft 36 by simply pulling the front side of the band 21a for a short distance. As a result, the bottom rail 11 would immediately stop lowering once the front side 21a of the band 21 is pulled. Whereby, the space below the bottom rail 11 could allow light to pass through.

In summary, the window blind 1 of the current embodiment has one single control module capable of adjusting the inclination angle of the slats 12 and collecting and expanding the covering material, which would be easy to install and easy to use. Furthermore, the number of exposed cords could be decreased, so as to improve the safety in use. In addition, while adjusting the inclination angle of the slats, the first brake spring 32 applied in the current embodiment could provide a braking effect when needed, and therefore the first brake spring 32 could ensure the slats 12 to stay at their current location. Furthermore, during the process of moving the bottom rail 11 upward, once the downward pulling force is dismissed, the second brake spring 37 would immediately provide a braking effect to stop the bottom rail 11. The aforementioned brake spring would precisely locate the window blind 1 of the current embodiment. In addition, the delay effect of the stroke delay mechanism provided in the current embodiment could ensure that, when the bottom rail 11 reaches the low position, the bottom rail 11 would not be unintentionally moved upward by continuously pulling the front side 21a of the band 21.

Figure 44:
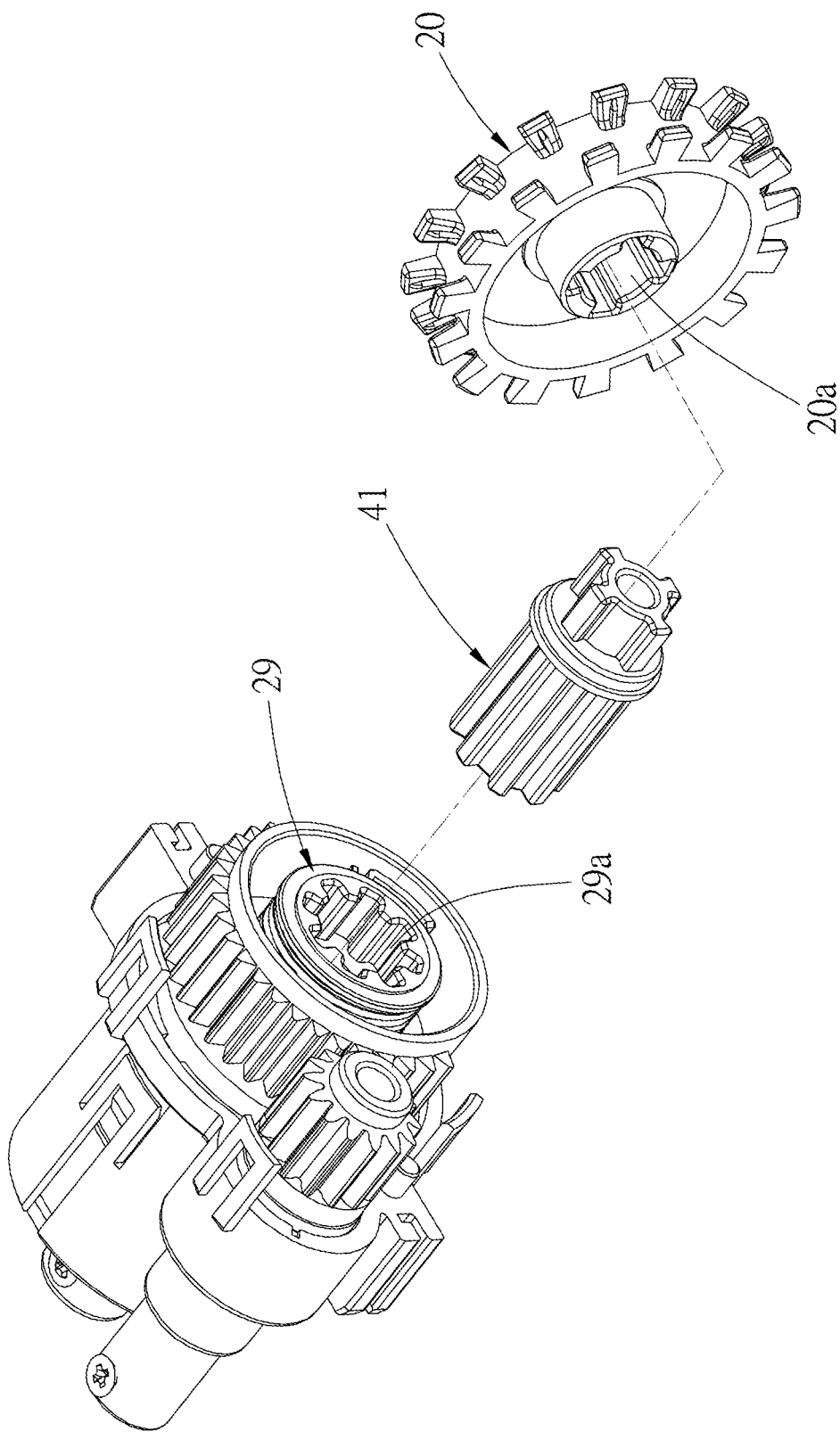
FIG. 44 is an exploded perspective view, showing a transmission wheel of another embodiment is installed between the transmission member and the adjustment clutch wheel.

In the aforementioned embodiment, the rotary wheel 20 is adapted to drive the adjustment clutch wheel 29 through the transmission wheel 23, and the assembly of planet gears is further provided between the rotary wheel 20 and the transmission wheel 23, whereby to decelerate the transmission speed from the rotary wheel 20 to the transmission wheel 23. However, in practice, the assembly of planet gears is optional, which could be omitted to meet different requirements of products. Furthermore, the location of the assembly of planet gears is not limited by the above descriptions. For example, the assembly of planet gears could be also installed at any arbitrary locations between the adjustment clutch wheel 29 and the input end 34. A structure omitting the assembly of planet gears is further shown in FIG. 44, which has a transmission wheel 41 of another type installed between the rotary wheel 20 and the adjustment clutch wheel 29. Two ends of the transmission wheel 41 are non-circular coupling posts, which are respectively inserted into the first coupling hole 20a of the rotary wheel 20 and the second coupling hole 29a of the adjustment clutch wheel 29, whereby to provide a transmission effect as well. Also, in practice, the number of the intermediate wheels disclosed in the aforementioned embodiment could be increased or decreased in consideration of the actual required delay in distance. Or, the intermediate wheels could be even completely omitted. By merely rotating the initial push block for a distance to push the final push block, such an embodiment could still provide the delay stroke effect. In the aforementioned embodiment, the initial push block, the intermediate wheel, and the final push block of the stroke delay mechanism are arranged in an axial direction. However, in practice, these components could be also arranged in radial directions, so that the initial push block, the intermediate wheel, and the final push block could be driven and rotated on a same plane, which could also provide the effect of delaying the stroke.

Figure 45:
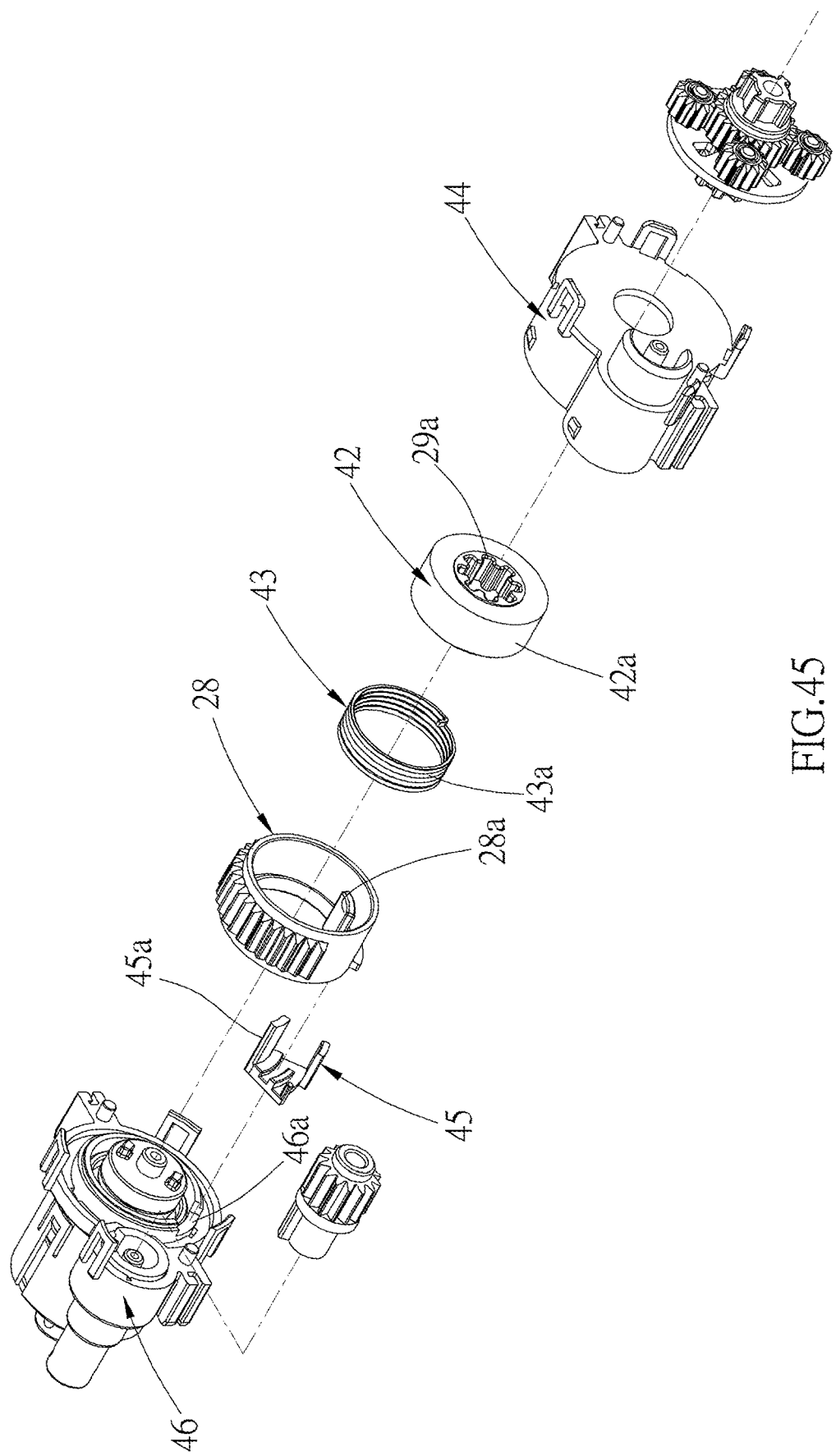
FIG. 45 is a partial exploded perspective view of the control mechanism of another embodiment.
Figure 46:
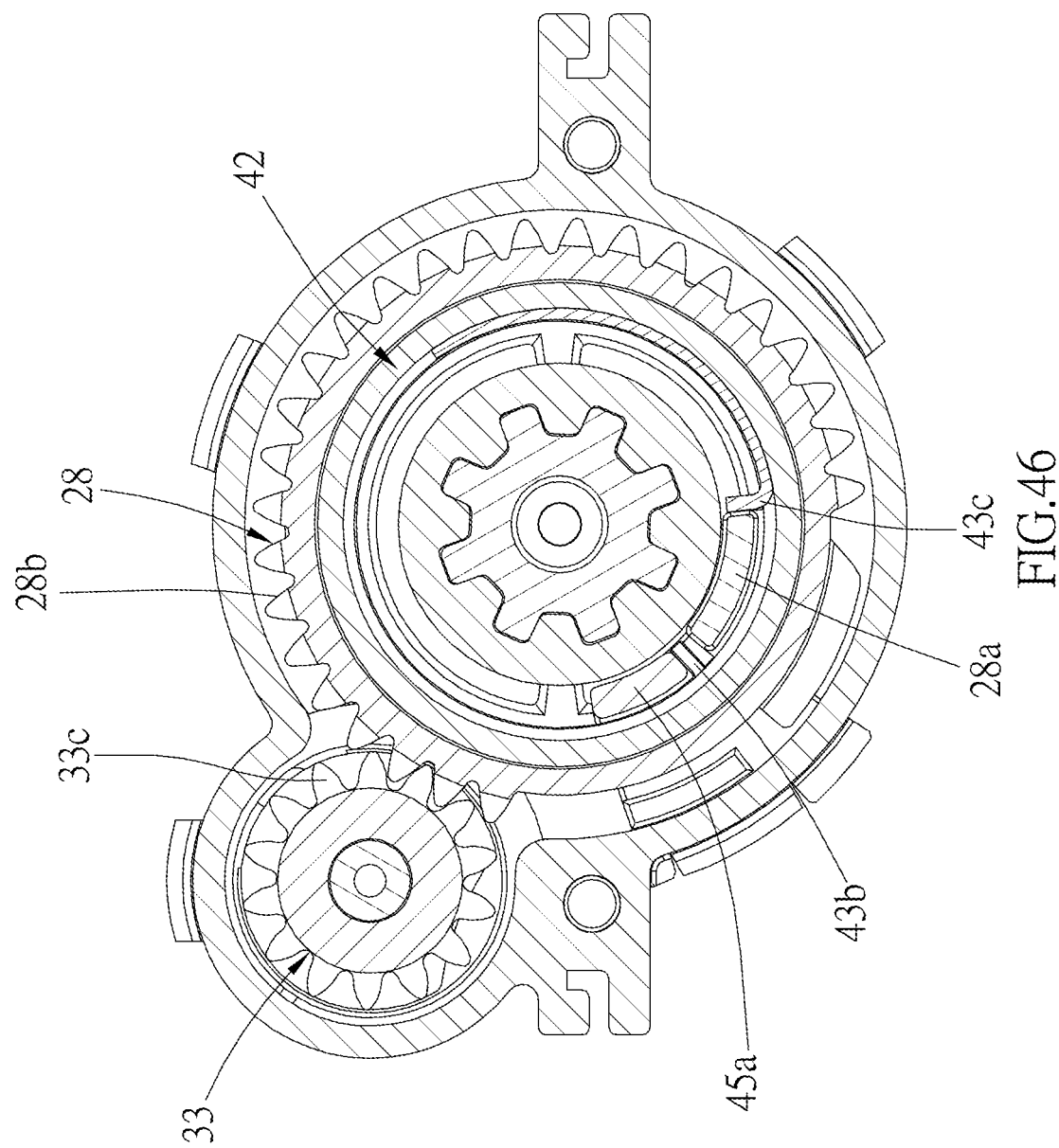
FIG. 46 is a sectional view, showing the toothed structure of the adjustment output wheel meshes with the gear of the adjustment driven wheel.

The adjustment clutch spring 30 in the aforementioned embodiment is designed to tightly fit around the adjustment clutch wheel 29 in the normal condition. However, in practice, an adjustment clutch spring which is expanded in the normal condition could be selected instead. Another embodiment is shown in FIG. 45 and FIG. 46, of which an adjustment clutch wheel 42 of the adjustment output mechanism is cylindrical, wherein the second coupling hole 29a disclosed in the previous embodiment is also provided on a side of the adjustment clutch wheel 42, and an adjustment clutch spring 43 is provided in the adjustment clutch wheel 42. The adjustment clutch spring 43 is expanded in the normal condition, and therefore a main body 43a of the adjustment clutch spring 43 abuts an inner wall of a tubular body 42a of the adjustment clutch wheel 42. The main body 43a is connected to end legs 43b, 43c, wherein the first block 28a of the adjustment output wheel 28 is also provided between the end legs 43b, 43c. In addition, a first outer case 44 of the current embodiment does not have an integrally projected stopper. Instead, a stopping member 45 is engaged into a slot 46a of a second outer case 46, whereby a stopper 45a of the stopping member 45, which extends toward an internal of the adjustment clutch wheel 42, would be fixedly provided relative to the case.

Figure 47:
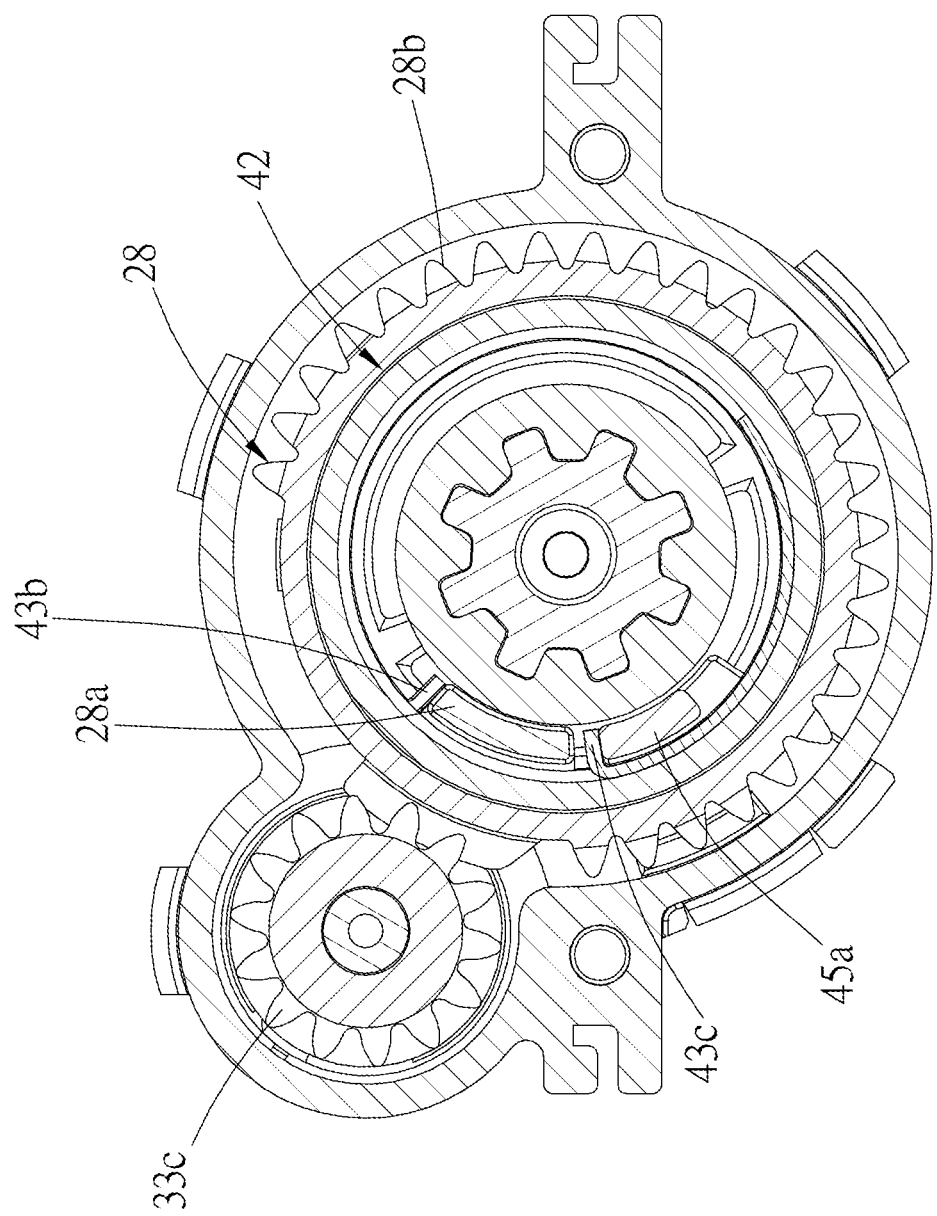
FIG. 47 is a sectional view, showing the toothed structure of the adjustment output wheel disengages from the gear of the adjustment driven wheel.

FIG. 46 shows the condition when the bottom rail 11 is located at the low position, wherein the adjustment clutch wheel 42 of the adjustment output mechanism is stationary, the toothed structure 28b of the adjustment output wheel 28 meshes with the gear 33c of the adjustment driven wheel 33, and the main body 43a of the adjustment clutch spring 43 abuts against the inner wall of the tubular body 42a of the adjustment clutch wheel 42, and therefore a friction force is generated between the adjustment clutch spring 43 and the adjustment clutch wheel 42. As further illustrated in FIG. 47, when the adjustment clutch wheel 42 is rotated, the adjustment clutch spring 43 would be driven to rotate synchronously. One of the end legs of the adjustment clutch spring 43 (i.e., the end leg 43b) would push against the first block 28a, so as to drive the adjustment output wheel 28 to rotate in the same direction as well. At the moment when the toothed structure 28b disengaged from the gear 33c, the inclination angle of the slats 12 would be changed. The other one of the end legs of the adjustment clutch spring 43 (i.e., the end leg 43c) would hook onto the stopper 45a, and the end leg 43b would be continuously moved toward the stopper 45a, so that the relative locations of the end legs 43b, 43c would change. As a result, an inner diameter of the main body 43a of the adjustment clutch spring 43 would be slightly reduced. Indirectly, the adjustment clutch wheel 42 would be moved relative to the adjustment clutch spring 43 and the adjustment output wheel 28. Therefore, when the rotary wheel 20 is operated to continuously rotate in the first rotation direction, the slats 12 would remain at the second position.

Figure 48:
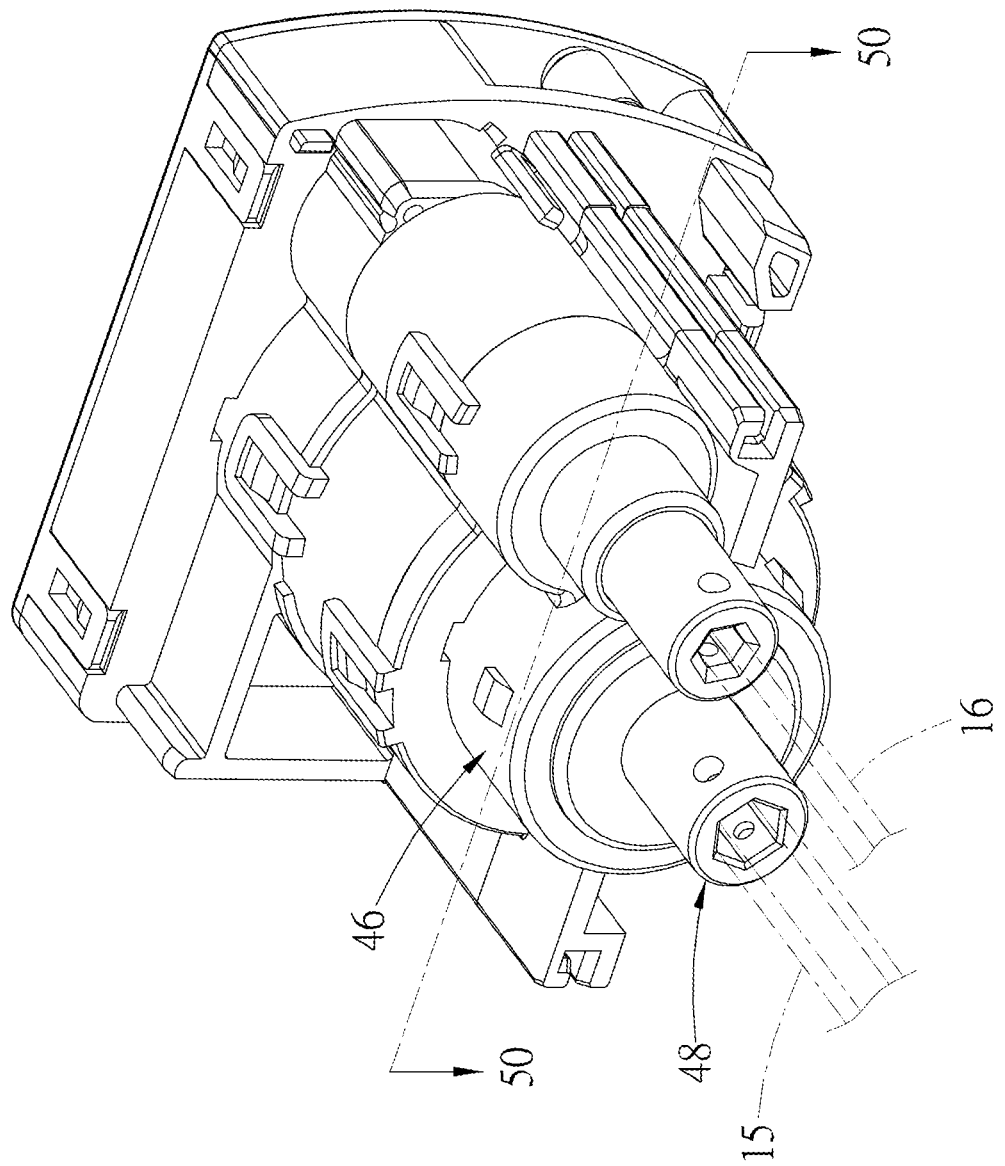
FIG. 48 is a perspective view of a control mechanism of yet another embodiment.
Figure 49:
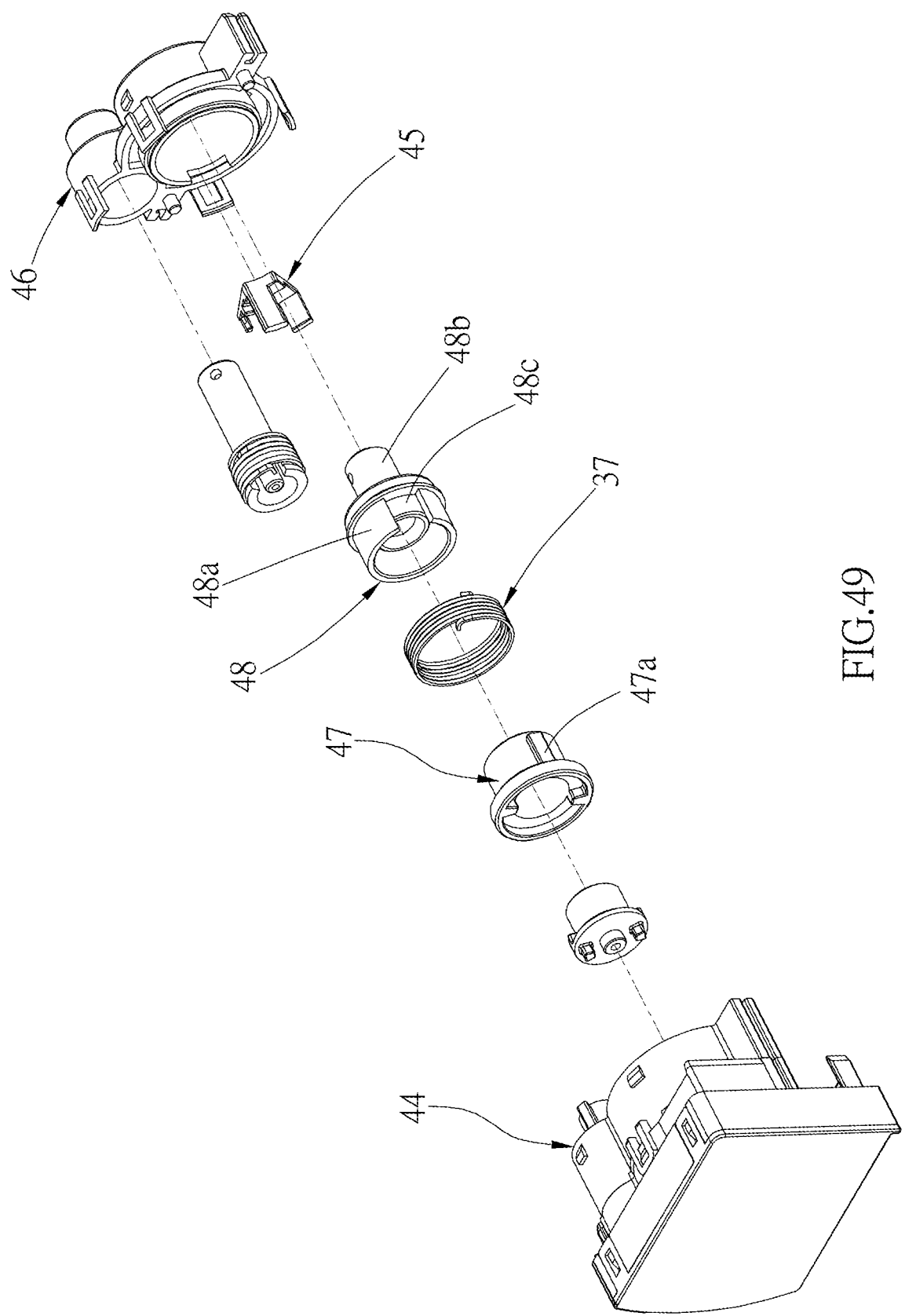
FIG. 49 is an exploded view of part of the components shown in FIG. 48.
Figure 50:
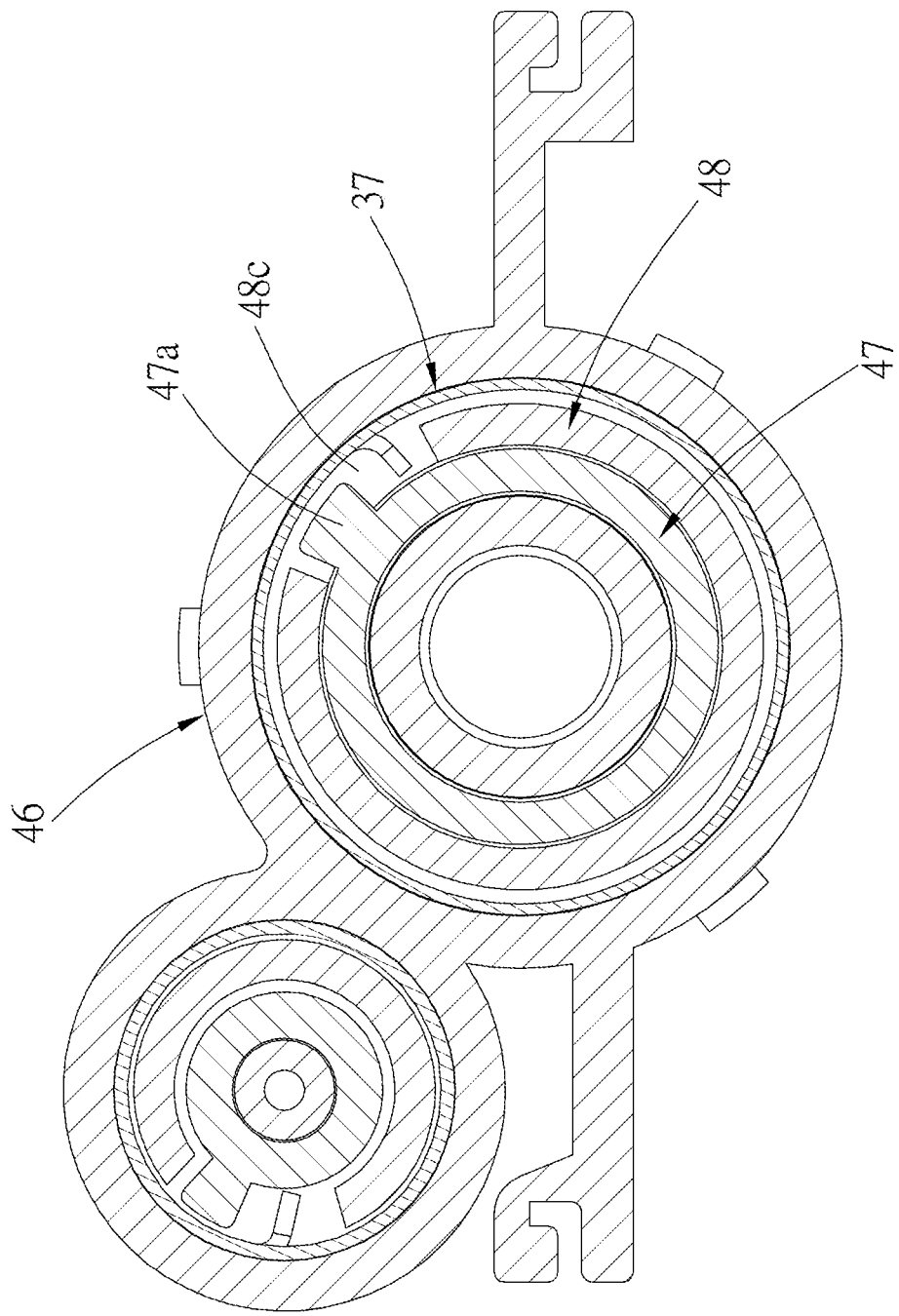
FIG. 50 is a sectional view along the 50-50 line in FIG. 48.

In the aforementioned embodiments, the driven shaft 36 is driven to rotate by the pawls 38 abutting against the third blocks 36c, whereby to drive the lifting shaft 15, rotating the spools 17 to roll up the lifting cords 14. The pawls 38 could be also operated to retreat into the openings 35a of the driving shaft 35, so as to automatically lower the bottom rail 11 and the slats 12 due to gravity. However, in practice, the structures related to the pawls 38 and the driving shaft 35 could be replaced by a structure of yet another embodiment shown in FIG. 48 to FIG. 50. An output clutch mechanism in the current embodiment only includes an input end 47 and a driven shaft 48. The input end 47 is adapted to be operated with the input mechanism simultaneously, and has no coupling slots having a curved bottom anymore. Instead, a pushing block 47a is projected thereon in a radial direction. The driven shaft 48 still has a tubular body 48a and an axial pipe 48b, wherein the tubular body 48a fits around the input end 47, and the driven shaft 48 further has a cut 48c to be inserted by the pushing block 47a. The axial pipe 48b is still connected to the lifting shaft 15, as mentioned in the previous embodiments. With such design of the current embodiment, when the input end 47 is driven by the input mechanism to rotate in one or the other directions, the driven shaft 48 would be driven to rotate synchronously, and then the spools 17 is driven to directly roll up or release the lifting cords 14, whereby to collect or expand the window blind.

It is worth mentioning that, the input mechanism in each of the aforementioned embodiments is adapted to operate the collecting and expanding of the window blind by pulling the band 21, but an electric motor could be also selected to directly operate the transmission member and the input end 47 to rotate in one or the other directions. In such an embodiment, the transmission member is not a rotary wheel driven by a band, but a drive shaft of an electric motor instead. In addition, the second brake spring 37 fits around the tubular body 48a of the driven shaft 48, and could be expanded outward immediately to stop the rotation of the driven shaft 48. Therefore, the second brake spring 37 could ensure the bottom rail 11 to stop at its current location without being moved downward any further.

In addition, in each of the above embodiments, the first position of the slats 12 is defined as a nearly vertical state which is front-high and rear-low, and the second position thereof is defined as a nearly vertical state which is front-low and rear-high, which respectively correspond to two extreme locations of the warps 13a of the ladder tapes 13 while pulling one down and lifting the other up. However, the rotation direction of each of the mechanisms could be adjusted to meet different requirements. In other words, the behavior of the slats 12 at the first position and the second position could be opposite to the above definitions, which are not the limitations of the present disclosure.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A window blind, comprising:
a headrail;
a bottom rail;
a plurality of slats suspended between the headrail and the bottom rail through a ladder tape, wherein the bottom rail is adapted to be operated by a lifting cord to move between a high position and a low position, whereby to collect or expand the window blind;
an input mechanism adapted to change a location of the bottom rail;
an adjustment output mechanism provided in the headrail, wherein the adjustment output mechanism is adapted to be operated with the input mechanism simultaneously;
an adjusting shaft, of which an end is connected to the adjustment output mechanism, wherein the adjustment output mechanism is adapted to be driven by the input mechanism to rotate the adjusting shaft, whereby to make two warps of the ladder tape have relative movement in a vertical direction, tilting the slats between a first position and a second position;
a lifting shaft adapted to be driven by the input mechanism, wherein, when the lifting shaft is continuously driven by the input mechanism to roll up the lifting cord, and the lifting cord moves the bottom rail toward the high position, the slats are located at the second position; when the lifting shaft is continuously driven by the input mechanism to release the lifting cord, and the lifting cord moves the bottom rail toward the low position, the slats are located at the first position; and
an output clutch mechanism provided in the headrail, wherein the output clutch mechanism is adapted to be moved along with the input mechanism; the lifting shaft is connected to the output clutch mechanism with an end thereof, so that the output clutch mechanism is adapted to be moved along with the lifting shaft;
wherein the output clutch mechanism comprises an input end, a driven shaft, and a one-way clutch provided between the input end and the driven shaft; the driven shaft is connected to the end of the lifting shaft; the input end is adapted to be rotated in a first rotation direction along with a transmission member of the input mechanism, whereby to motivate the one-way clutch to drive and rotate the driven shaft; the input end is also adapted to be rotated in a second rotation direction along with the transmission member, whereby to disengage the one-way clutch from the driven shaft.

2. The window blind of claim 1, wherein the input mechanism comprises the transmission member, and the transmission member is adapted to be operated to rotate in the first rotation direction or the second rotation direction opposite to the first rotation direction; the adjustment output mechanism comprises an adjustment output wheel and an adjustment driven wheel, wherein the adjustment output wheel is adapted to be rotated along with the transmission member, and to drive the adjustment driven wheel to rotate; the adjustment driven wheel is adapted to drive the adjusting shaft to rotate.

3. The window blind of claim 2, wherein the adjustment output mechanism comprises an adjustment clutch wheel and an adjustment clutch spring; the adjustment clutch spring has a main body and two end legs connected to the main body; the adjustment output wheel has a first block located between the end legs; the adjustment clutch wheel is adapted to be driven by the transmission member to rotate, so as to make the adjustment clutch spring to push the adjustment output wheel to rotate with one of the end legs thereof.

4. The window blind of claim 3, wherein the adjustment output mechanism comprises a case, and the case has a stopper provided therein; the stopper is fixedly provided relative to the case; the adjustment clutch wheel and the adjustment output wheel are rotatably provided in the case, wherein the adjustment clutch wheel, the adjustment output wheel, and the adjustment clutch spring are provided around a same axle, so that the first block and the end legs are on a same rotation path around the axle, and the stopper is located on the rotation path of the first block and the end legs.

5. The window blind of claim 4, wherein, when the transmission member of the input mechanism is driven to be rotated in the first rotation direction, one of the end legs of the adjustment clutch spring pushes the first block to drive the adjustment output wheel to rotate, and drives the slats to tilt; once the slats are tilted to the second position, the other one of the end legs of the adjustment clutch spring abuts against the stopper to change relative locations of the end legs of the adjustment clutch spring, so as to make the adjustment clutch wheel have a movement relative to the main body of the adjustment clutch spring and the adjustment output wheel; when the transmission member is operated to continuously rotated in the first rotation direction, the slats remain at the second position.

6. The window blind of claim 2, wherein the adjustment driven wheel has a gear provided in a radial direction thereof; the gear meshes with a toothed structure provided on an outer surface of the adjustment output wheel.

7. The window blind of claim 6, wherein the toothed structure is provided along a part of the outer surface of the adjustment output wheel, and another part of the outer surface of the adjustment output wheel not provided with the toothed structure is defined as a bare section; the adjustment output wheel is adapted to drive the adjustment driven wheel through the toothed structure and the gear, whereby to tilt the slats; when the slats are tilted to the second position, and when the bottom rail is operated to move, the gear of the adjustment driven wheel disengages from the toothed structure to align with the bare section.

8. The window blind of claim 7, wherein a curved block is projected from an edge of one of the adjustment output wheel and the adjustment driven wheel, and a curved surface is recessed into the edge of the other one of the adjustment output wheel and the adjustment driven wheel; when the gear of the adjustment driven wheel aligns with the bare section of the adjustment output wheel, the curved block matches the curved surface.

9. The window blind of claim 4, wherein the adjustment output mechanism comprises a rotatable axial pipe and a first brake spring; the axial pipe is connected to the adjusting shaft with a front half portion thereof, and is connected to the adjustment driven wheel with a rear half portion thereof; the first brake spring fits around the axial pipe, and is adapted to stop the axial pipe from rotating when the adjusting shaft is reversely rotated.

10. The window blind of claim 9, wherein the rear half portion of the axial pipe has a cut; the adjustment driven wheel has an extension shaft extending into the rear half portion of the axial pipe, wherein the extension shaft has a second block projected thereon in a radial direction; the second block is located in the cut; the first brake spring fits around the rear half portion of the axial pipe, and has a free end extending into the cut; when the adjusting shaft is reversely rotated, a lateral wall of the cut pushes the free end of the first brake spring.

11. The window blind of claim 3, further comprising a stroke delay mechanism adapted to drive the lifting shaft to rotate after the adjustment clutch wheel is rotated for a distance.

12. The window blind of claim 11, wherein the stroke delay mechanism comprises an initial push block and a final push block; the initial push block is provided corresponding to the adjustment clutch wheel, and is adapted to be moved correspondingly along with the adjustment clutch wheel; the final push block is provided corresponding to the lifting shaft, and is adapted to be moved correspondingly along with the lifting shaft; the adjustment clutch wheel is adapted to be rotated to drive and move the initial push block, and is adapted to push the final push block after the initial push block is moved for a distance, whereby to drive the lifting shaft to rotate.

13. The window blind of claim 12, wherein the stroke delay mechanism further comprises at least one intermediate wheel located between the initial push block and the final push block; the at least one intermediate wheel is adapted to be pushed and rotated by the initial push block, and is adapted to push and rotate the final push block after being rotated for a distance.

14. The window blind of claim 1, wherein the output clutch mechanism comprises a driving shaft; the driving shaft has a hollow portion, and fits around the input end; the driving shaft has at least one opening communicating with the hollow portion; the driven shaft has a tubular body fitting around the driving shaft, wherein the tubular body has at least one third block on an inner wall thereof; the one-way clutch comprises at least one pawl, wherein an end of each of the at least one pawl is pivotally provided on the input end, while another end thereof extends into one of the at least one opening; the input end has at least one coupling slot provided in a radial direction thereof; each of the at least one pawl has a root located in one of the at least one coupling slot, whereby each of the at least one pawl is pivotable in one of the at least one opening; when the slats are tilted to the second position, and when the transmission member is operated to continuously rotate in the first rotation direction, one of the ends of each of the at least one pawl passes through one of the at least one opening to abut against one of the at least one third block, whereby to push the driven shaft to rotate; when the transmission member is operated to rotate in the second rotation direction, each of the at least one pawl retreats into one of the at least one opening, and no longer abuts against the corresponding one of the at least one third block, whereby the lifting shaft drives the driven shaft to rotate on free relative to the input end.

15. The window blind of claim 14, wherein the driving shaft has a notch provided on an end thereof, and the input end has a fourth block provided thereon; the fourth block is located in the notch; when the input end is rotated, the fourth block abuts against one of two lateral walls of the notch.

16. The window blind of claim 15, wherein the output clutch mechanism further comprises a second brake spring fitting around the driving shaft; an end of the second brake spring extends into the notch; when the lifting shaft is reversely rotated, one of the lateral walls of the notch pushes the end of the second brake spring which extends into the notch, whereby the second brake spring stops the driving shaft from rotating.

17. The window blind of claim 1, further comprising a stroke delay mechanism adapted to drive the input end to rotate after the adjustment clutch wheel is rotated for a distance, whereby to drive and rotate the lifting shaft.

18. The window blind of claim 17, wherein the stroke delay mechanism comprises an initial push block and a final push block; the initial push block is provided corresponding to the adjustment clutch wheel, and is adapted to be moved correspondingly along with the adjustment clutch wheel; the final push block is provided corresponding to the input end, and is adapted to be moved correspondingly along with the input end; the adjustment clutch wheel is adapted to be rotated to drive and move the initial push block, and is adapted to push the final push block after the initial push block is moved for a distance, so as to drive the input end to rotate, whereby to drive the lifting shaft to rotate.

19. The window blind of claim 18, wherein the stroke delay mechanism further comprises at least one intermediate wheel located between the initial push block and the final push block; the at least one intermediate wheel is adapted to be pushed and rotated by the initial push block, and is adapted to push and rotate the final push block after being rotated for a distance.

20. The window blind of claim 2, wherein the input mechanism comprises a base case and a transmission wheel; the base case has a toothed ring provided on an inner wall thereof; the transmission wheel is adapted to be synchronously rotated along with the transmission member, and has a rotary plate; the rotary plate has a center gear and an outer gear provided on a side thereof; the outer gear meshes with the toothed ring and the center gear.

* * * * *